(12) United States Patent
Rahman et al.

(10) Patent No.: US 12,244,384 B2
(45) Date of Patent: Mar. 4, 2025

(54) METHOD AND APPARATUS FOR COMPRESSION-BASED CSI REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/464,005

(22) Filed: Sep. 8, 2023

(65) Prior Publication Data

US 2023/0421228 A1 Dec. 28, 2023

Related U.S. Application Data

(63) Continuation of application No. 17/812,136, filed on Jul. 12, 2022, now abandoned.
(Continued)

(51) Int. Cl.
*H04B 7/06* (2006.01)
*H04L 5/00* (2006.01)

(52) U.S. Cl.
CPC ......... *H04B 7/0634* (2013.01); *H04B 7/0626* (2013.01); *H04L 5/0048* (2013.01)

(58) Field of Classification Search
CPC .......... H04B 7/04; H04B 7/06; H04B 7/0413; H04B 7/0417; H04B 7/0456;
(Continued)

(56) References Cited

U.S. PATENT DOCUMENTS

| 2021/0099210 A1 | 4/2021 | Ramireddy et al. |
| 2021/0226674 A1 | 7/2021 | Ramireddy et al. |

(Continued)

FOREIGN PATENT DOCUMENTS

| WO | 2020182269 A1 | 9/2020 |
| WO | 2021035396 A1 | 3/2021 |
| WO | 2021102952 A1 | 6/2021 |

OTHER PUBLICATIONS

"3rd Generation Partnership Project; Technical Specification Group Radio Access Network; Evolved Universal Terrestrial Radio Access (E-UTRA); Physical channels and modulation (Release 17)", 3GPP TS 36.211 V17.0.0, Dec. 2021, 250 pages.
(Continued)

*Primary Examiner* — Shawkat M Ali

(57) ABSTRACT

A method for operating a user equipment (UE) comprises receiving a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple ($a_i$, $b_f$, $c_d$), $a_i$ from the first set, $b_f$ from the second set, and $c_d$ from the third set; determining, based on the configuration, the components; and transmitting the CSI report including: at least one basis vector indicator indicating all or a portion of the sets of basis vectors, and at least one coefficient indicator indicating all or a portion of the coefficients.

20 Claims, 15 Drawing Sheets

Related U.S. Application Data

(60) Provisional application No. 63/341,382, filed on May 12, 2022, provisional application No. 63/335,557, filed on Apr. 27, 2022, provisional application No. 63/225,234, filed on Jul. 23, 2021.

(58) Field of Classification Search
CPC ....... H04B 7/0626; H04B 7/0634; H04L 5/00; H04L 5/0048; H04W 4/00; H04W 24/10; H04W 72/04; H04W 76/27
USPC .......................... 375/219, 260, 267, 295, 316
See application file for complete search history.

(56) References Cited

U.S. PATENT DOCUMENTS

| | | | |
|---|---|---|---|
| 2022/0029676 A1 | 1/2022 | Ramireddy et al. | |
| 2022/0182120 A1 | 6/2022 | Sergeev | |
| 2022/0286261 A1* | 9/2022 | Wu | H04L 5/0057 |
| 2023/0131045 A1 | 4/2023 | Huang et al. | |

OTHER PUBLICATIONS

"3rd Generation Partnership Project; Technical Specification Group Radio Access Network; Evolved Universal Terrestrial Radio Access (E-UTRA); Multiplexing and channel coding (Release 17)", 3GPP TS 36.212 V17.0.0, Dec. 2021, 258 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.0.0, Dec. 2021, 582 pages.

"LTE; Evolved Universal Terrestrial Radio Access (E-UTRA); Medium Access Control (MAC) protocol specification (3GPP TS 36.321 version 16.6.0 Release 16)", ETSI TS 136 321 V16.6.0, Oct. 2021, 144 pages.

"LTE; Evolved Universal Terrestrial Radio Access (E-UTRA); Radio Resource Control (RRC); Protocol specification (3GPP TS 36.331 version 16.7.0 Release 16)", ETSI TS 136 331 V16.7.0, Jan. 2022, 1099 pages.

"3rd Generation Partnership Project; Technical Specification Group Services and System Aspects; Feasibility Study on New Services and Markets Technology Enablers; Stage 1 (Release 14)", 3GPP TR 22.891 V1.2.0, Nov. 2015, 96 pages.

"3rd Generation Partnership Project; Technical Specification Group Radio Access Network; NR; Multiplexing and channel coding (Release 17)", 3GPP TS 38.212 V17.0.0, Dec. 2021, 190 pages.

"3rd Generation Partnership Project; Technical Specification Group Radio Access Network; NR; Physical layer for procedures for data (Release 17)", 3GPP TS 38.214 V17.0.0, Dec. 2021, 217 pages.

Fraunhofer IIS et al., "Measurement results on Doppler spectrum for various UE mobility environments and related CSI enhancements", 3GPP TSG RAN WG#86, RP-192978, Dec. 2019, 13 pages.

"3rd Generation Partnership Project; Technical Specification Group Radio Access Network; NR; Physical channels and modulation (Release 17)", 3GPP TS 38.211 V17.0.0, Dec. 2021, 134 pages.

International Search Report and Written Opinion issued Oct. 28, 2022 regarding International Application No. PCT/KR2022/010721, 7 pages.

Fraunhofer IIS et al., "Email discussion summary for [RAN-R18-WS-eMBB-Fraunhofer]", 3GPP TSG RAN Rel-18 workshop, RWS-210523, Jun. 2021, 14 pages.

Extended European Search Report issued Oct. 9, 2024 regarding Application No. 22846271.9, 11 pages.

Fraunhofer IIS et al., "Further Enhancements on Type-II CSI Reporting: Doppler-domain Approach", 3GPP TSG RAN WG1 Meeting #96-Bis, R1-1904219, Apr. 2019, 6 pages.

Ericsson, "On CSI enhancements for MU-MIMO", 3GPP TSG RAN WG1 Meeting RAN1#98, R1-1909379, Aug. 2019, 27 pages.

Nec et al., "Discussion on MIMO enhancements in Rel-18", 3GPP TSG RAN Rel-18 workshop, RWS-210123, Jun. 2021, 10 pages.

\* cited by examiner

METHOD AND APPARATUS FOR COMPRESSION-BASED CSI REPORTING

CROSS-REFERENCE TO RELATED APPLICATIONS AND CLAIM OF PRIORITY

This application is a continuation of U.S. patent application Ser. No. 17/812,136, filed on Jul. 12, 2022, which claims priority to U.S. Provisional Patent Application No. 63/225,234, filed on Jul. 23, 2021, U.S. Provisional Patent Application No. 63/335,557, filed on Apr. 27, 2022, and U.S. Provisional Patent Application No. 63/341,382, filed on May 12, 2022. The content of the above-identified patent document is incorporated herein by reference.

TECHNICAL FIELD

The present disclosure relates generally to wireless communication systems and more specifically to compression-based CSI reporting.

BACKGROUND

Understanding and correctly estimating the channel between a user equipment (UE) and a base station (BS) (e.g., gNode B (gNB)) is important for efficient and effective wireless communication. In order to correctly estimate the DL channel conditions, the gNB may transmit a reference signal, e.g., CSI-RS, to the UE for DL channel measurement, and the UE may report (e.g., feedback) information about channel measurement, e.g., CSI, to the gNB. With this DL channel measurement, the gNB is able to select appropriate communication parameters to efficiently and effectively perform wireless data communication with the UE.

SUMMARY

Embodiments of the present disclosure provide methods and apparatuses for signaling on CSI format.

In one embodiment, a UE in a wireless communication system is provided. The UE includes a transceiver configured to: receive a configuration about a channel state information (CSI) report, the configuration including information about a codebook, the codebook comprising components: (i) sets of basis vectors including a first set of vectors each of length $P_{CSIRS} \times 1$ for a spatial domain (SD), a second set of vectors each of length $N_3 \times 1$ for a frequency domain (FD), and a third set of vectors each of length $N_4 \times 1$ for a Doppler domain (DD), and (ii) coefficients associated with each basis vector triple $(a_i, b_f, c_d)$, $a_i$ from the first set, $b_f$ from the second set, and $c_d$ from the third set. The UE further includes a processor operably coupled to the transceiver. The processor is configured to: determine, based on the configuration, the components. The transceiver is further configured to transmit the CSI report including: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

In another embodiment, a BS in a wireless communication system is provided. The BS includes a processor configured to: generate a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple $(a_i, b_f, c_d)$, $a_i$ from the first set, $b_f$ from the second set, and $c_d$ from the third set. The BS further includes a transceiver operably coupled to the processor. The transceiver is configured to: transmit the configuration; and receive the CSI report based on the configuration, wherein the CSI report includes: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

In yet another embodiment, a method for operating a UE is provided. The method comprises: receiving a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple $(a_i, b_f, c_d)$, $a_i$ from the first set, $b_f$ from the second set, and $c_d$ from the third set; determining, based on the configuration, the components; and transmitting the CSI report including: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
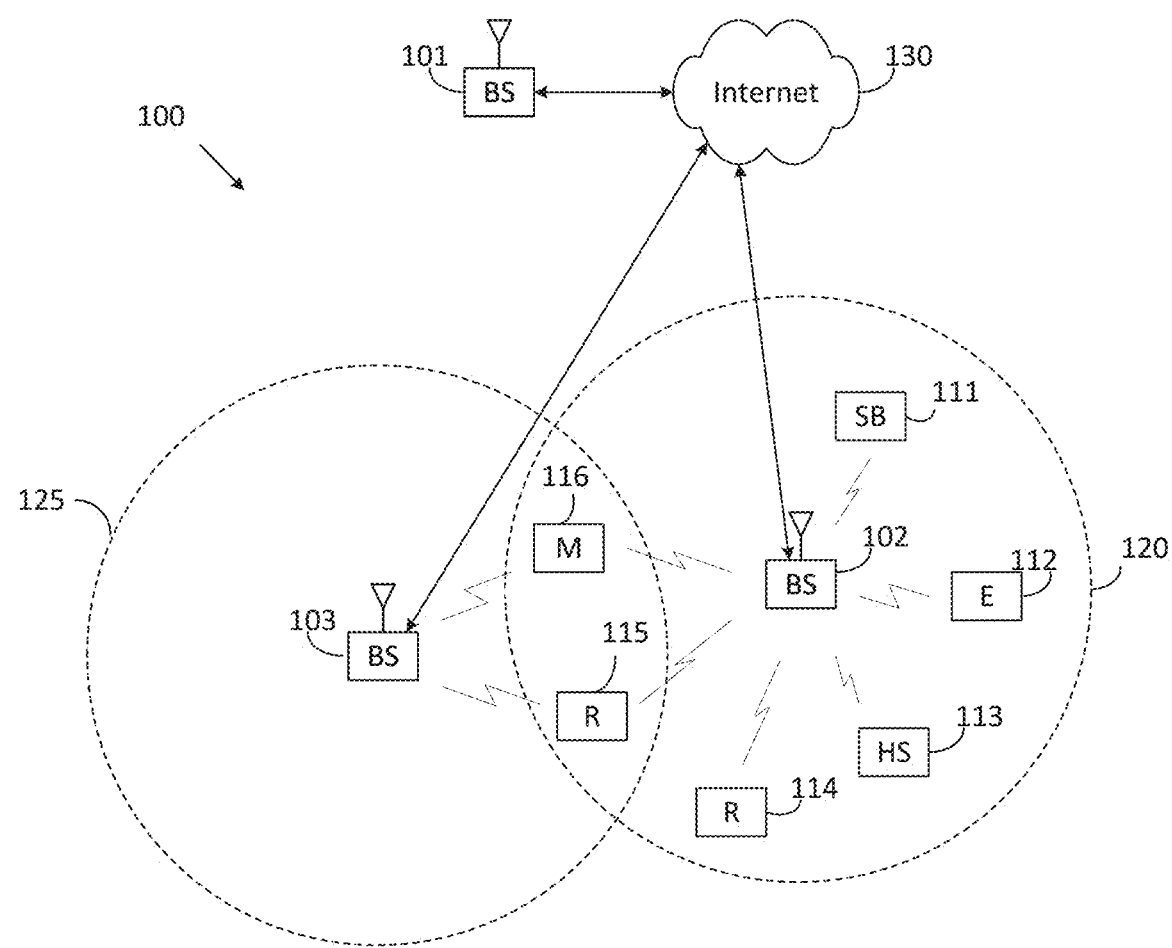
FIG. 1 illustrates an example wireless network according to embodiments of the present disclosure.

FIG. 1 through FIG. 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v17.0.0, "E-UTRA, Physical channels and modulation" (herein "REF 1"); 3GPP TS 36.212 v17.0.0, "E-UTRA, Multiplexing and Channel coding" (herein "REF 2"); 3GPP TS 36.213 v17.0.0, "E-UTRA, Physical Layer Procedures" (herein "REF 3"); 3GPP TS 36.321 v16.6.0, "E-UTRA, Medium Access Control (MAC) protocol specification" (herein "REF 4"); 3GPP TS 36.331 v16.7.0, "E-UTRA, Radio Resource Control (RRC) protocol specification" (herein "REF 5"); 3GPP TR 22.891 v1.2.0 (herein "REF 6"); 3GPP TS 38.212 v17.0.0, "E-UTRA, NR, Multiplexing and channel coding" (herein "REF 7"); 3GPP TS 38.214 v17.0.0, "E-UTRA, NR, Physical layer procedures for data" (herein "REF 8"); RP-192978, "Measurement results on Doppler spectrum for various UE mobility environments and related CSI enhancements," Fraunhofer IIS, Fraunhofer HHI, Deutsche Telekom (herein "REF 9"); and 3GPP TS 38.211 v17.0.0, "E-UTRA, NR, Physical channels and modulation (herein "REF 10").

Aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive. The disclosure is illustrated by way of example, and not by way of limitation, in the figures of the accompanying drawings.

In the following, for brevity, both FDD and TDD are considered as the duplex method for both DL and UL signaling.

Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates or in lower frequency bands, such as below 6 GHz, to enable robust coverage and mobility support. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
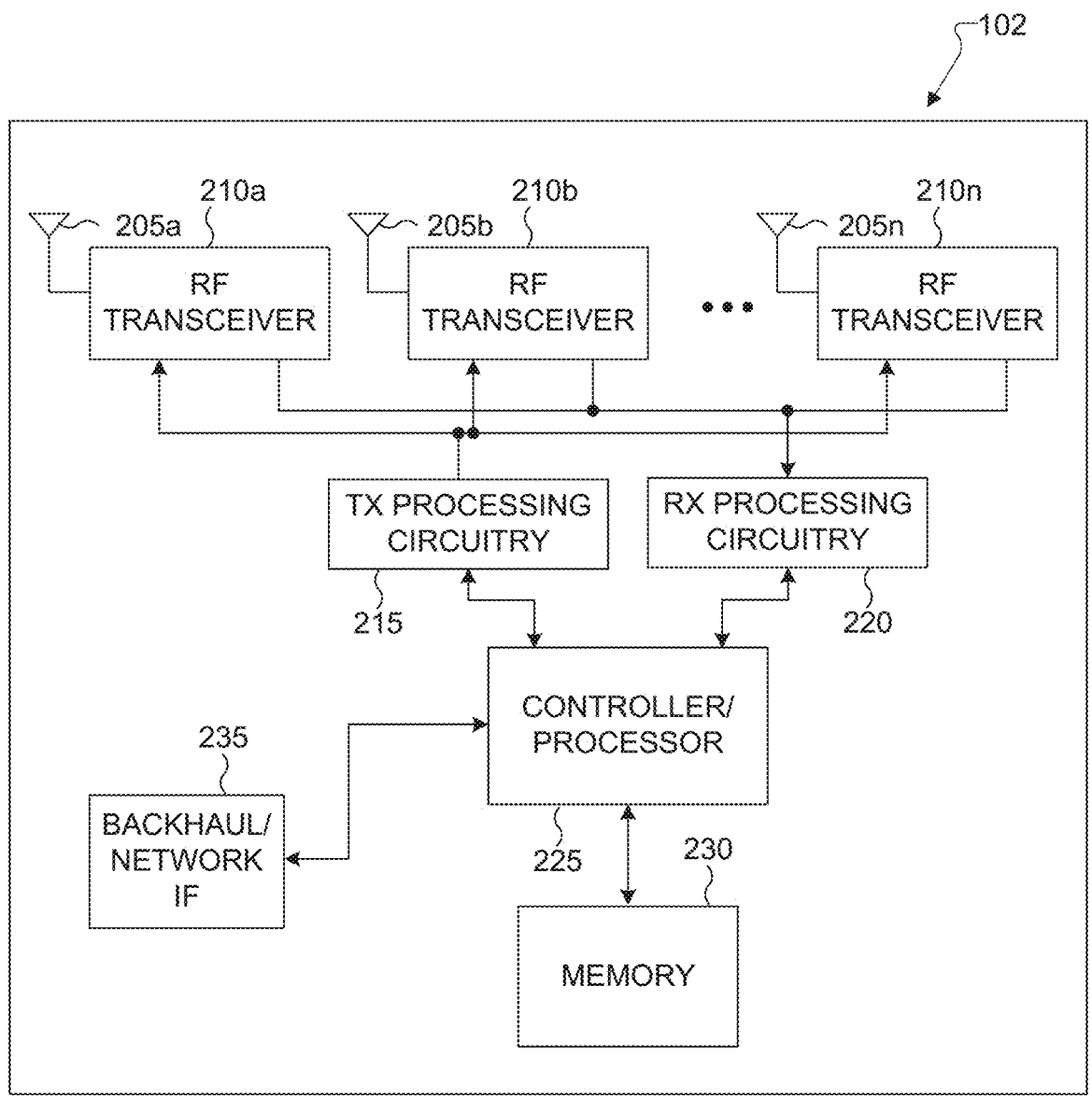
FIG. 2 illustrates an example gNB according to embodiments of the present disclosure.
Figure 3:
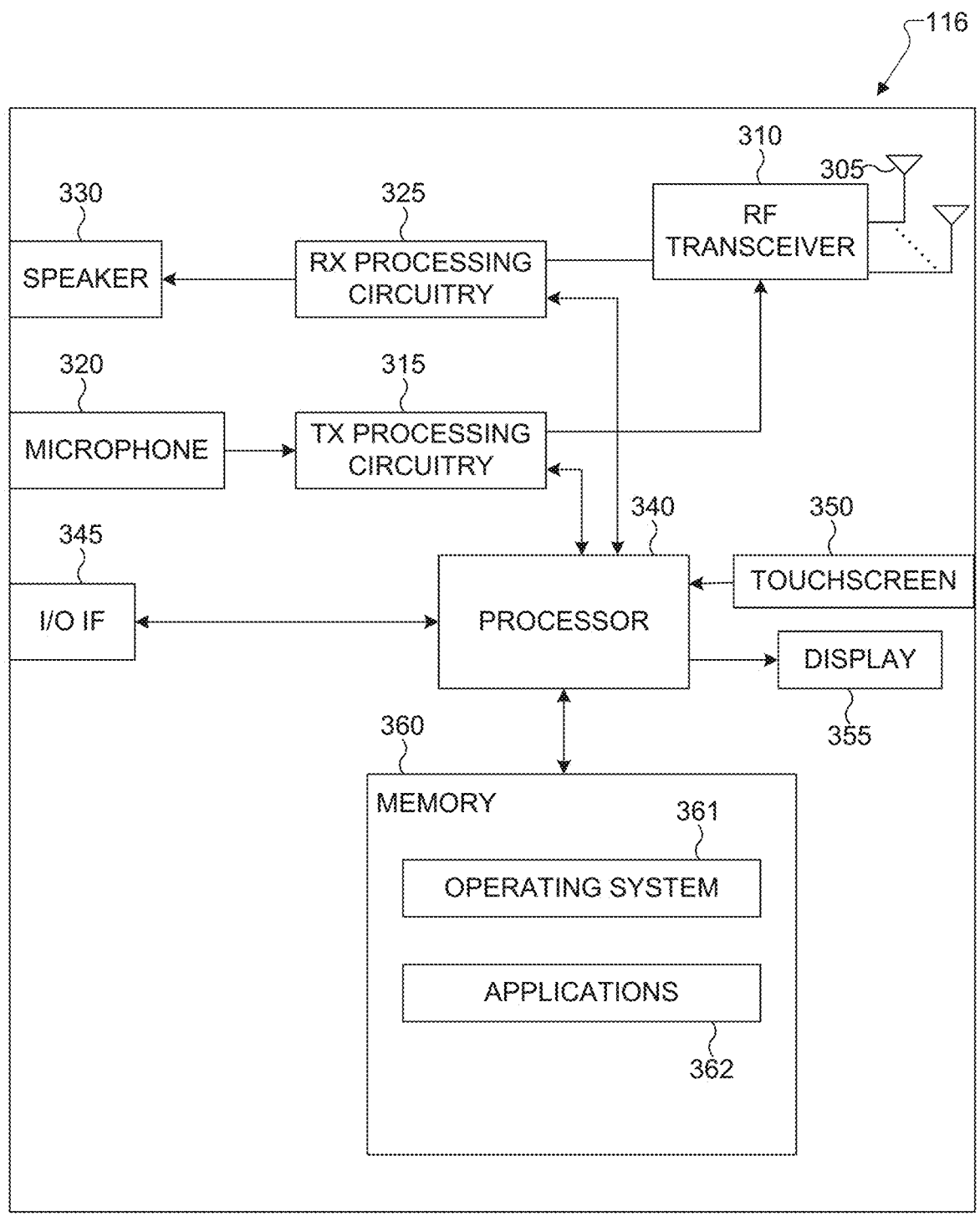
FIG. 3 illustrates an example UE according to embodiments of the present disclosure.

FIGS. 1-4B below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system. The present disclosure covers several components which can be used in conjunction or in combination with one another or can operate as standalone schemes.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programming, or a combination thereof, for receiving a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple ($a_i$, $b_f$, $c_d$), $a_i$ from the first set, $b_f$ from the second set, and $c_d$ from the third set; determining, based on the configuration, the components; and transmitting the CSI report including: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report. One or more of the gNBs 101-103 includes circuitry, programming, or a combination thereof, for generating a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple $(a_i, b_f, c_d)$, $a_i$ from the first set, $b_f$ from the second set, and $c_d$ from the third set; transmitting the configuration; and receiving the CSI report based on the configuration, wherein the CSI report includes: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the RF transceivers 210a-210n, the RX processing circuitry 220, and the TX processing circuitry 215 in accordance with well-known principles. The controller/processor 225 could support additional functions as well, such as more advanced wireless communication functions.

For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for receiving a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple $(a_i, b_f, c_d)$, $a_i$ from the first set, $b_f$ from the second set, and $c_d$ from the third set; determining, based on the configuration, the components; and transmitting the CSI report including: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
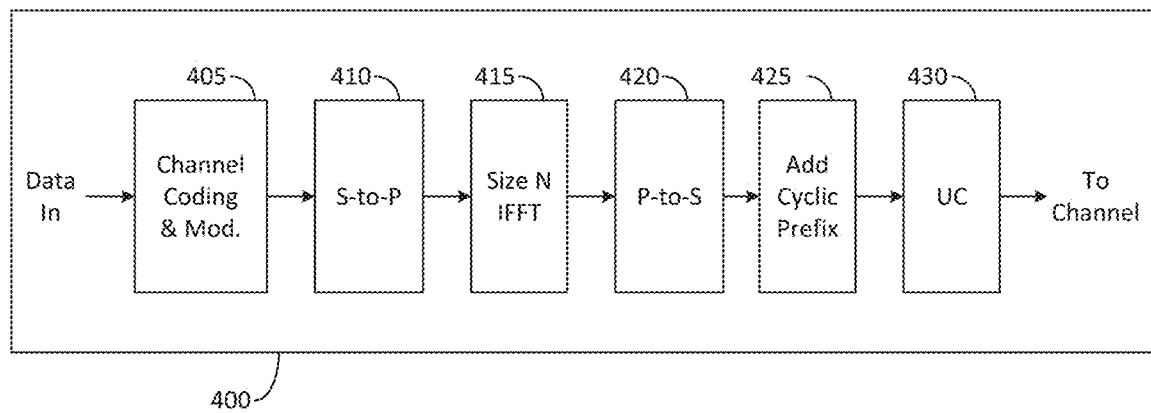
FIG. 4A illustrates a high-level diagram of an orthogonal frequency division multiple access transmit path according to embodiments of the present disclosure.
Figure 4B:
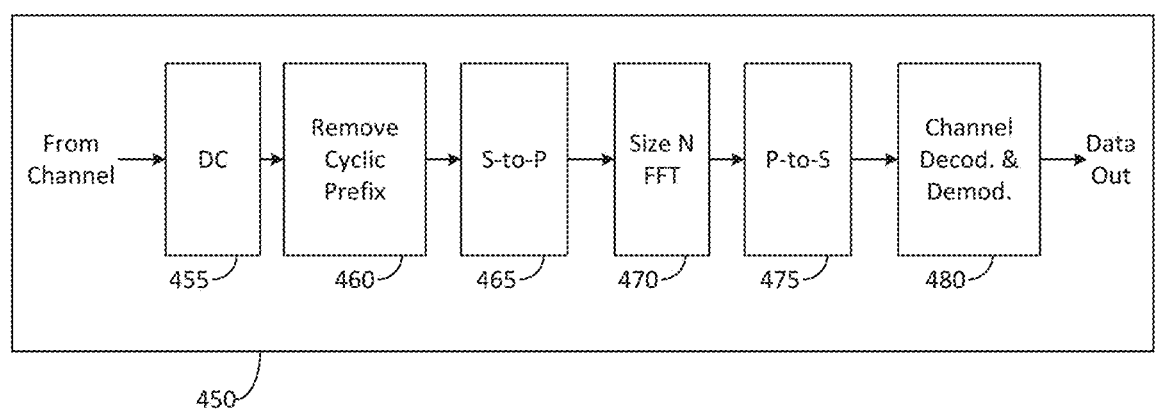
FIG. 4B illustrates a high-level diagram of an orthogonal frequency division multiple access receive path according to embodiments of the present disclosure.

FIG. 4A is a high-level diagram of transmit path circuitry. For example, the transmit path circuitry may be used for an orthogonal frequency division multiple access (OFDMA) communication. FIG. 4B is a high-level diagram of receive path circuitry. For example, the receive path circuitry may be used for an orthogonal frequency division multiple access (OFDMA) communication. In FIGS. 4A and 4B, for downlink communication, the transmit path circuitry may be implemented in a base station (gNB) 102 or a relay station, and the receive path circuitry may be implemented in a user equipment (e.g., user equipment 116 of FIG. 1). In other examples, for uplink communication, the receive path circuitry 450 may be implemented in a base station (e.g., gNB 102 of FIG. 1) or a relay station, and the transmit path circuitry may be implemented in a user equipment (e.g., user equipment 116 of FIG. 1).

Transmit path circuitry comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A 400 and 4B 450 may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and may not be construed to limit the scope of the disclosure. It may be appreciated that in an alternate embodiment of the present disclosure, the Fast Fourier Transform functions and the Inverse Fast Fourier Transform functions may easily be replaced by discrete Fourier transform (DFT) functions and inverse discrete Fourier transform (IDFT) functions, respectively. It may be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., quadrature phase shift keying (QPSK) or quadrature amplitude modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at the UE 116 after passing through the wireless channel, and reverse operations to those at gNB 102 are performed. Down-converter 455 down-converts the received signal to baseband frequency and removes cyclic prefix block 460 and removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of gNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to gNBs 101-103 and may implement a receive path corresponding to the architecture for receiving in the downlink from gNBs 101-103.

5G communication system use cases have been identified and described. Those use cases can be roughly categorized into three different groups. In one example, enhanced mobile broadband (eMBB) is determined to do with high bits/sec requirement, with less stringent latency and reliability requirements. In another example, ultra-reliable and low latency (URLL) is determined with less stringent bits/sec requirement. In yet another example, massive machine type communication (mMTC) is determined that a number of devices can be as many as 100,000 to 1 million per km2, but the reliability/throughput/latency requirement could be less stringent. This scenario may also involve power efficiency requirement as well, in that the battery consumption may be minimized as possible.

A communication system includes a downlink (DL) that conveys signals from transmission points such as base stations (BSs) or NodeBs to user equipments (UEs) and an Uplink (UL) that conveys signals from UEs to reception points such as NodeBs. A UE, also commonly referred to as a terminal or a mobile station, may be fixed or mobile and may be a cellular phone, a personal computer device, or an automated device. An eNodeB, which is generally a fixed station, may also be referred to as an access point or other equivalent terminology. For LTE systems, a NodeB is often referred as an eNodeB.

In a communication system, such as LTE system, DL signals can include data signals conveying information content, control signals conveying DL control information (DCI), and reference signals (RS) that are also known as pilot signals. An eNodeB transmits data information through a physical DL shared channel (PDSCH). An eNodeB transmits DCI through a physical DL control channel (PDCCH) or an Enhanced PDCCH (EPDCCH).

An eNodeB transmits acknowledgement information in response to data transport block (TB) transmission from a UE in a physical hybrid ARQ indicator channel (PHICH). An eNodeB transmits one or more of multiple types of RS including a UE-common RS (CRS), a channel state information RS (CSI-RS), or a demodulation RS (DMRS). A CRS is transmitted over a DL system bandwidth (BW) and can be used by UEs to obtain a channel estimate to demodulate data or control information or to perform measurements. To reduce CRS overhead, an eNodeB may transmit a CSI-RS with a smaller density in the time and/or frequency domain than a CRS. DMRS can be transmitted only in the BW of a respective PDSCH or EPDCCH and a UE can use the DMRS to demodulate data or control information in a PDSCH or an EPDCCH, respectively. A transmission time interval for DL channels is referred to as a subframe and can have, for example, duration of 1 millisecond.

DL signals also include transmission of a logical channel that carries system control information. A BCCH is mapped to either a transport channel referred to as a broadcast channel (BCH) when the DL signals convey a master information block (MIB) or to a DL shared channel (DL-SCH) when the DL signals convey a System Information Block (SIB). Most system information is included in different SIBs that are transmitted using DL-SCH. A presence of system information on a DL-SCH in a subframe can be indicated by a transmission of a corresponding PDCCH conveying a codeword with a cyclic redundancy check (CRC) scrambled with system information RNTI (SI-RNTI). Alternatively, scheduling information for a SIB transmission can be provided in an earlier SIB and scheduling information for the first SIB (SIB-1) can be provided by the MIB.

DL resource allocation is performed in a unit of subframe and a group of physical resource blocks (PRBs). A transmission BW includes frequency resource units referred to as resource blocks (RBs). Each RB includes $N_{sc}^{RB}$ sub-carriers, or resource elements (REs), such as 12 REs. A unit of one RB over one subframe is referred to as a PRB. A UE can be allocated $M_{PDSCH}$ RBs for a total of $M_{sc}^{PDSCH}=M_{PDSCH} \cdot N_{sc}^{RB}$ REs for the PDSCH transmission BW.

UL signals can include data signals conveying data information, control signals conveying UL control information (UCI), and UL RS. UL RS includes DMRS and Sounding RS (SRS). A UE transmits DMRS only in a BW of a respective PUSCH or PUCCH. An eNodeB can use a DMRS to demodulate data signals or UCI signals. A UE transmits SRS to provide an eNodeB with an UL CSI. A UE transmits data information or UCI through a respective physical UL shared channel (PUSCH) or a Physical UL control channel (PUCCH). If a UE needs to transmit data information and UCI in a same UL subframe, the UE may multiplex both in a PUSCH. UCI includes Hybrid Automatic Repeat request acknowledgement (HARQ-ACK) information, indicating correct (ACK) or incorrect (NACK) detection for a data TB in a PDSCH or absence of a PDCCH detection (DTX), scheduling request (SR) indicating whether a UE has data in the UE's buffer, rank indicator (RI), and channel state information (CSI) enabling an eNodeB to perform link adaptation for PDSCH transmissions to a UE. HARQ-ACK information is also transmitted by a UE in response to a detection of a PDCCH/EPDCCH indicating a release of semi-persistently scheduled PDSCH.

An UL subframe includes two slots. Each slot includes $N_{symb}^{UL}$ symbols for transmitting data information, UCI, DMRS, or SRS. A frequency resource unit of an UL system BW is an RB. A UE is allocated $N_{RB}$ RBs for a total of $N_{RB} \cdot N_{sc}^{RB}$ REs for a transmission BW. For a PUCCH, $N_{RB}=1$. A last subframe symbol can be used to multiplex SRS transmissions from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 5:
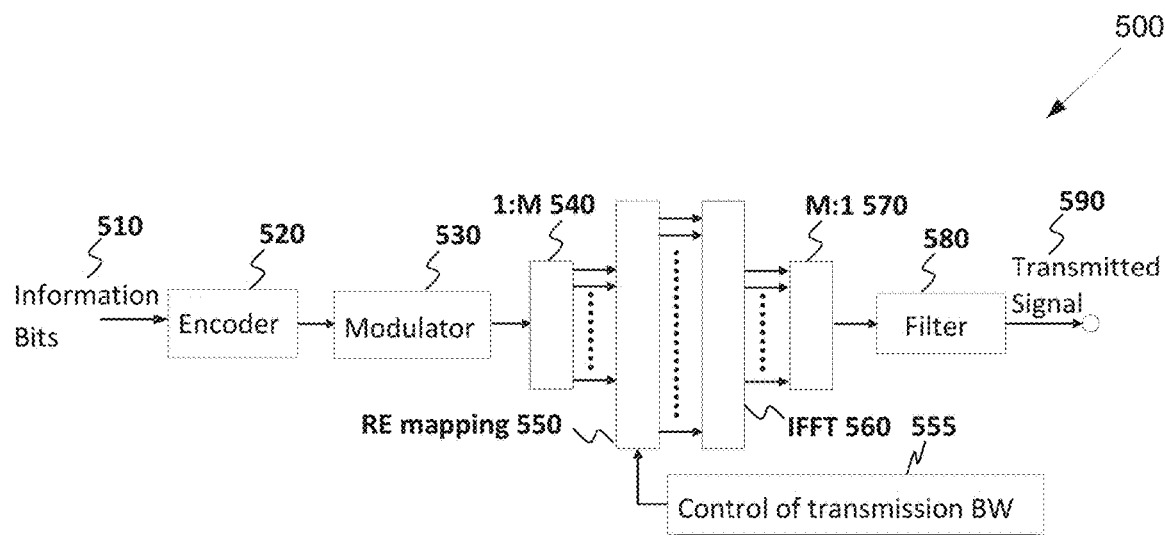
FIG. 5 illustrates a transmitter block diagram for a PDSCH in a subframe according to embodiments of the present disclosure.

FIG. 5 illustrates a transmitter block diagram 500 for a PDSCH in a subframe according to embodiments of the present disclosure. The embodiment of the transmitter block diagram 500 illustrated in FIG. 5 is for illustration only. One or more of the components illustrated in FIG. 5 can be implemented in specialized circuitry configured to perform the noted functions or one or more of the components can be implemented by one or more processors executing instructions to perform the noted functions. FIG. 5 does not limit the scope of this disclosure to any particular implementation of the transmitter block diagram 500.

As shown in FIG. 5, information bits 510 are encoded by encoder 520, such as a turbo encoder, and modulated by modulator 530, for example using quadrature phase shift keying (QPSK) modulation. A serial to parallel (S/P) converter 540 generates M modulation symbols that are subsequently provided to a mapper 550 to be mapped to REs selected by a transmission BW selection unit 555 for an assigned PDSCH transmission BW, unit 560 applies an Inverse fast Fourier transform (IFFT), the output is then serialized by a parallel to serial (P/S) converter 570 to create a time domain signal, filtering is applied by filter 580, and a signal transmitted 590. Additional functionalities, such as data scrambling, cyclic prefix insertion, time windowing, interleaving, and others are well known in the art and are not shown for brevity.

Figure 6:
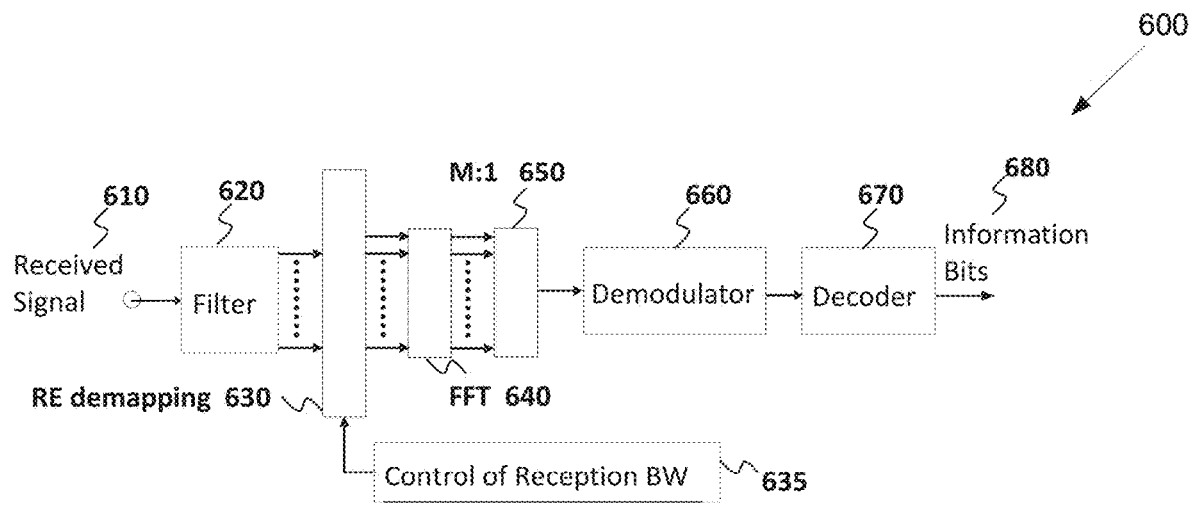
FIG. 6 illustrates a receiver block diagram for a PDSCH in a subframe according to embodiments of the present disclosure.

FIG. 6 illustrates a receiver block diagram 600 for a PDSCH in a subframe according to embodiments of the present disclosure. The embodiment of the diagram 600 illustrated in FIG. 6 is for illustration only. One or more of the components illustrated in FIG. 6 can be implemented in specialized circuitry configured to perform the noted functions or one or more of the components can be implemented by one or more processors executing instructions to perform the noted functions. FIG. 6 does not limit the scope of this disclosure to any particular implementation of the diagram 600.

As shown in FIG. 6, a received signal 610 is filtered by filter 620, REs 630 for an assigned reception BW are selected by BW selector 635, unit 640 applies a fast Fourier transform (FFT), and an output is serialized by a parallel-to-serial converter 650. Subsequently, a demodulator 660 coherently demodulates data symbols by applying a channel estimate obtained from a DMRS or a CRS (not shown), and a decoder 670, such as a turbo decoder, decodes the demodulated data to provide an estimate of the information data bits 680. Additional functionalities such as time-windowing, cyclic prefix removal, de-scrambling, channel estimation, and de-interleaving are not shown for brevity.

Figure 7:
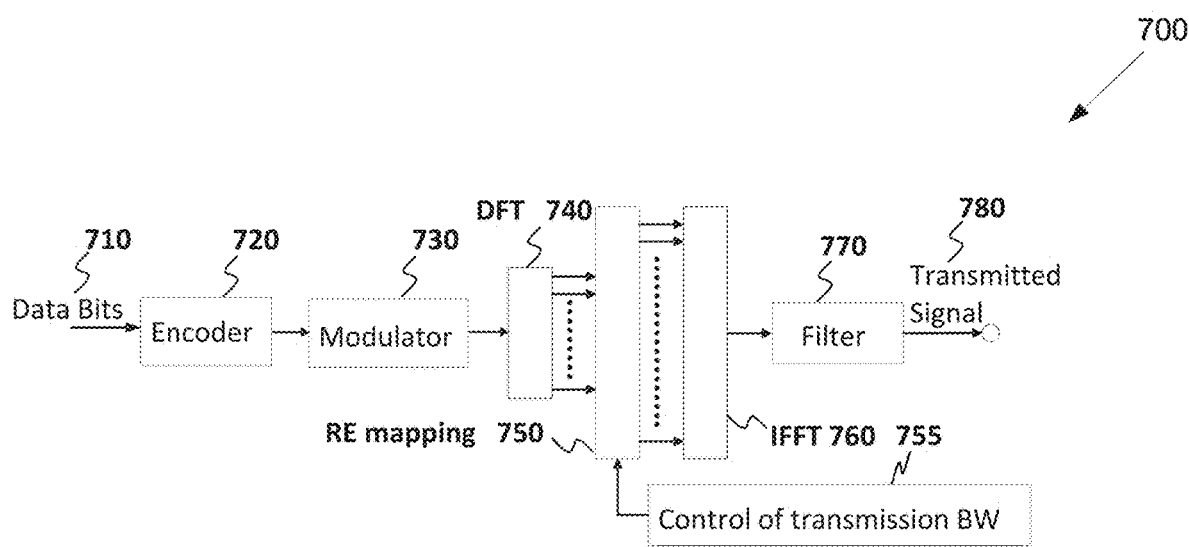
FIG. 7 illustrates a transmitter block diagram for a PUSCH in a subframe according to embodiments of the present disclosure.

FIG. 7 illustrates a transmitter block diagram 700 for a PUSCH in a subframe according to embodiments of the present disclosure. The embodiment of the block diagram 700 illustrated in FIG. 7 is for illustration only. One or more of the components illustrated in FIG. 5 can be implemented in specialized circuitry configured to perform the noted functions or one or more of the components can be implemented by one or more processors executing instructions to perform the noted functions. FIG. 7 does not limit the scope of this disclosure to any particular implementation of the block diagram 700.

As shown in FIG. 7, information data bits 710 are encoded by encoder 720, such as a turbo encoder, and modulated by modulator 730. A discrete Fourier transform (DFT) unit 740 applies a DFT on the modulated data bits, REs 750 corresponding to an assigned PUSCH transmission BW are selected by transmission BW selection unit 755, unit 760 applies an IFFT and, after a cyclic prefix insertion (not shown), filtering is applied by filter 770 and a signal transmitted 780.

Figure 8:
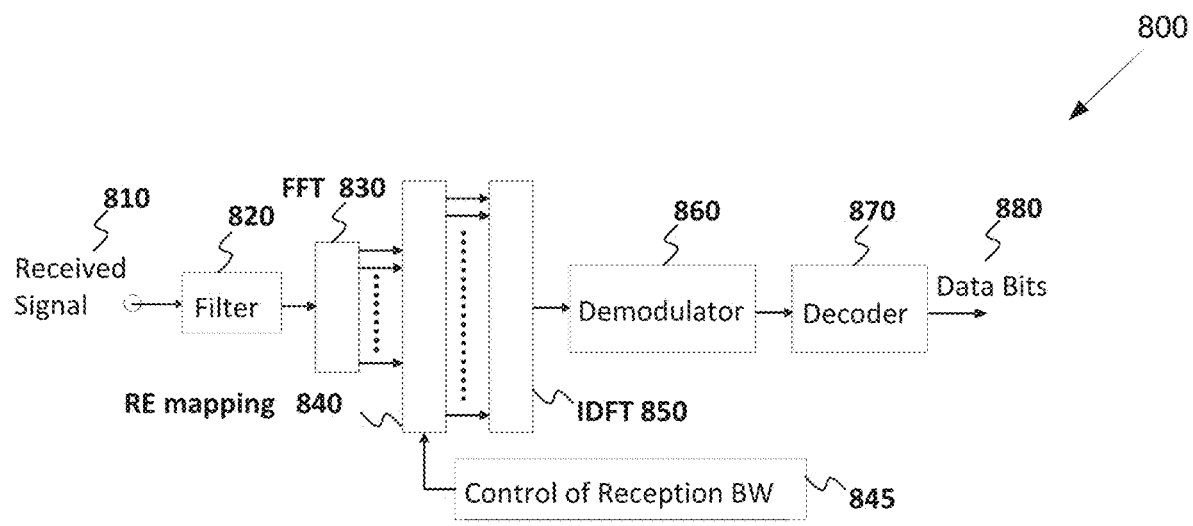
FIG. 8 illustrates a receiver block diagram for a PUSCH in a subframe according to embodiments of the present disclosure.

FIG. 8 illustrates a receiver block diagram 800 for a PUSCH in a subframe according to embodiments of the present disclosure. The embodiment of the block diagram 800 illustrated in FIG. 8 is for illustration only. One or more of the components illustrated in FIG. 8 can be implemented in specialized circuitry configured to perform the noted functions or one or more of the components can be implemented by one or more processors executing instructions to perform the noted functions. FIG. 8 does not limit the scope of this disclosure to any particular implementation of the block diagram 800.

As shown in FIG. 8, a received signal 810 is filtered by filter 820. Subsequently, after a cyclic prefix is removed (not shown), unit 830 applies a FFT, REs 840 corresponding to an assigned PUSCH reception BW are selected by a reception BW selector 845, unit 850 applies an inverse DFT (IDFT), a demodulator 860 coherently demodulates data symbols by applying a channel estimate obtained from a DMRS (not shown), a decoder 870, such as a turbo decoder, decodes the demodulated data to provide an estimate of the information data bits 880.

In next generation cellular systems, various use cases are envisioned beyond the capabilities of LTE system. Termed 5G or the fifth-generation cellular system, a system capable of operating at sub-6 GHz and above-6 GHz (for example, in mmWave regime) becomes one of the requirements. In 3GPP TR 22.891, 74 5G use cases have been identified and described; those use cases can be roughly categorized into three different groups. A first group is termed "enhanced mobile broadband (eMBB)," targeted to high data rate services with less stringent latency and reliability requirements. A second group is termed "ultra-reliable and low latency (URLL)" targeted for applications with less stringent data rate requirements, but less tolerant to latency. A third group is termed "massive MTC (mMTC)" targeted for large number of low-power device connections such as 1 million per km$^2$ with less stringent the reliability, data rate, and latency requirements.

The 3GPP NR specification supports up to 32 CSI-RS antenna ports which enable a gNB to be equipped with a large number of antenna elements (such as 64 or 128). In this case, a plurality of antenna elements is mapped onto one CSI-RS port. For next generation cellular systems such as 5G, the maximum number of CSI-RS ports can either remain the same or increase.

Figure 9:
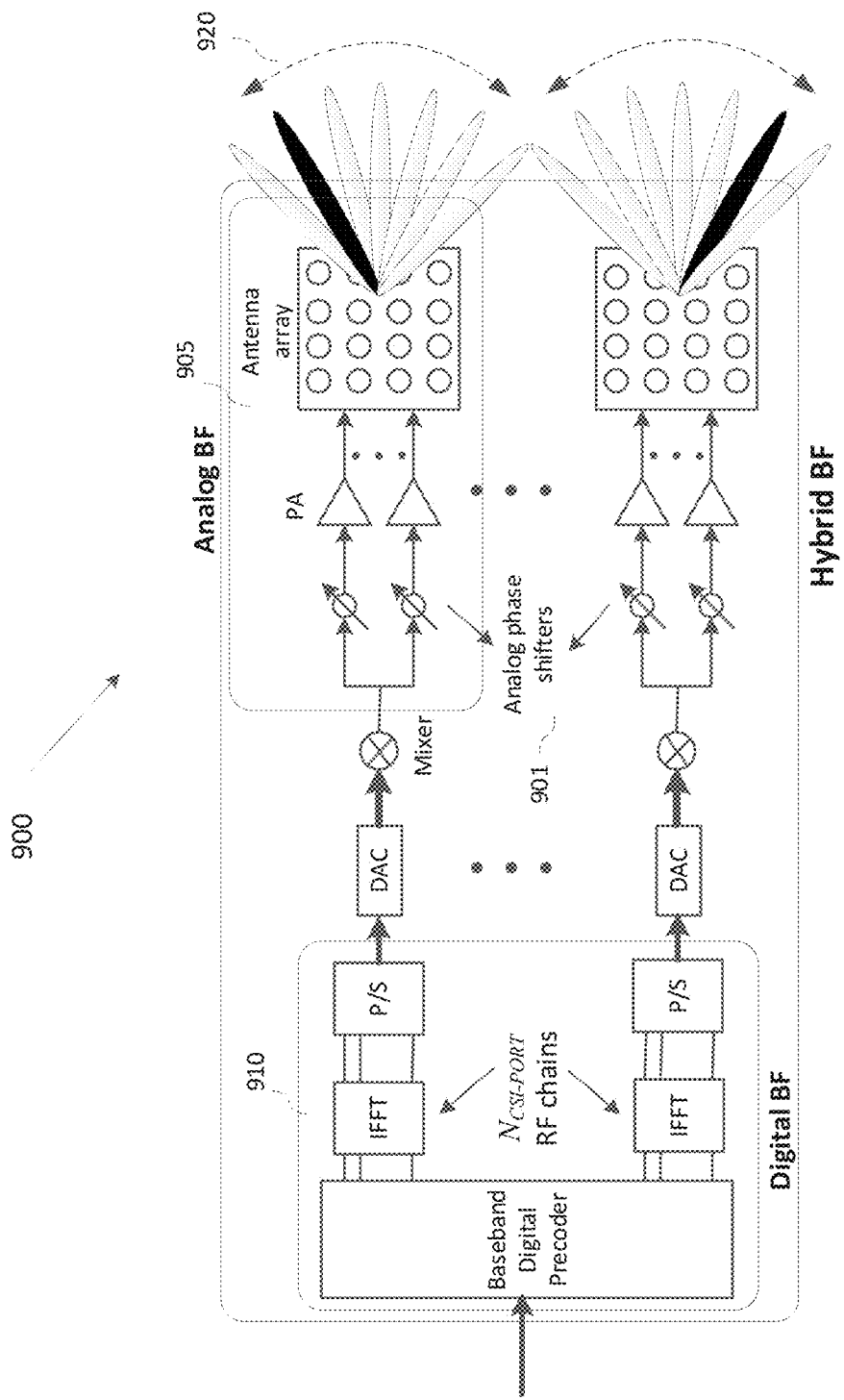
FIG. 9 illustrates an example antenna blocks or arrays forming beams according to embodiments of the present disclosure.

FIG. 9 illustrates an example antenna blocks or arrays 900 according to embodiments of the present disclosure. The embodiment of the antenna blocks or arrays 1100 illustrated in FIG. 9 is for illustration only. FIG. 9 does not limit the scope of this disclosure to any particular implementation of the antenna blocks or arrays 900.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 9. In this case, one CSI-RS port is mapped onto a large number of antenna elements which can be controlled by a bank of analog phase shifters 901. One CSI-RS port can then correspond to one sub-array which produces a narrow analog beam through analog beamforming 905. This analog beam can be configured to sweep across a wider range of angles (920) by varying the phase shifter bank across symbols or subframes. The number of sub-arrays (equal to the number of RF chains) is the same as the number of CSI-RS ports $N_{CSI-PORT}$. A digital beamforming unit 910 performs a linear combination across $N_{CSI-PORT}$ analog beams to further increase precoding gain. While analog beams are wideband (hence not frequency-selective), digital precoding can be varied across frequency sub-bands or resource blocks.

To enable digital precoding, efficient design of CSI-RS is a crucial factor. For this reason, three types of CSI reporting mechanisms corresponding to three types of CSI-RS measurement behavior are supported, for example, "CLASS A" CSI reporting which corresponds to non-precoded CSI-RS, "CLASS B" reporting with K=1 CSI-RS resource which corresponds to UE-specific beamformed CSI-RS, and "CLASS B" reporting with K>1 CSI-RS resources which corresponds to cell-specific beamformed CSI-RS.

For non-precoded (NP) CSI-RS, a cell-specific one-to-one mapping between CSI-RS port and TXRU is utilized. Different CSI-RS ports have the same wide beam width and direction and hence generally cell wide coverage. For beamformed CSI-RS, beamforming operation, either cell-specific or UE-specific, is applied on a non-zero-power (NZP) CSI-RS resource (e.g., comprising multiple ports). At least at a given time/frequency, CSI-RS ports have narrow beam widths and hence not cell wide coverage, and at least from the gNB perspective. At least some CSI-RS port-resource combinations have different beam directions.

In scenarios where DL long-term channel statistics can be measured through UL signals at a serving eNodeB, UE-specific BF CSI-RS can be readily used. This is typically feasible when UL-DL duplex distance is sufficiently small. When this condition does not hold, however, some UE feedback is necessary for the eNodeB to obtain an estimate of DL long-term channel statistics (or any of representation thereof). To facilitate such a procedure, a first BF CSI-RS transmitted with periodicity T1 (ms) and a second NP CSI-RS transmitted with periodicity T2 (ms), where T1≤T2. This approach is termed hybrid CSI-RS. The implementation of hybrid CSI-RS is largely dependent on the definition of CSI process and NZP CSI-RS resource.

In the 3GPP LTE specification, MIMO has been identified as an essential feature in order to achieve high system throughput requirements and it will continue to be the same in NR. One of the key components of a MIMO transmission scheme is the accurate CSI acquisition at the eNB (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, the CSI can be acquired using the CSI-RS transmission from the eNB, and CSI acquisition and feedback from the UE. In legacy FDD systems, the CSI feedback framework is 'implicit' in the form of CQI/PMI/RI derived from a codebook assuming SU transmission from the eNB. Because of the inherent SU assumption while deriving CSI, this implicit CSI feedback is inadequate for MU transmission. Since future (e.g., NR) systems are likely to be more MU-centric, this SU-MU CSI mismatch will be a bottleneck in achieving high MU performance gains. Another issue with implicit feedback is the scalability with larger number of antenna ports at the eNB. For large number of antenna ports, the codebook design for implicit feedback is quite complicated, and the designed codebook is not guaranteed to bring justifiable performance benefits in practical deployment scenarios (for example, only a small percentage gain can be shown at the most).

In 5G or NR systems, the above-mentioned CSI reporting paradigm from LTE is also supported and referred to as Type I CSI reporting. In addition to Type I, a high-resolution CSI reporting, referred to as Type II CSI reporting, is also supported to provide more accurate CSI information to gNB for use cases such as high-order MU-MIMO. The overhead of Type II CSI reporting can be an issue in practical UE implementations. One approach to reduce Type II CSI overhead is based on frequency domain (FD) compression. In Rel. 16 NR, DFT-based FD compression of the Type II CSI has been supported (referred to as Rel. 16 enhanced Type II codebook in REF8). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook in REF8), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

It has been known in the literature that UL-DL channel reciprocity exists in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and/or DFT-based FD basis in $W_f$ can be replaced with SD and FD port selection, i.e., L CSI-RS ports are selected in SD and/or M ports are selected in FD. The CSI-RS ports in this case are beamformed in SD (assuming UL-DL channel reciprocity in angular domain) and/or FD (assuming UL-DL channel reciprocity in delay/frequency domain), and the corresponding SD and/or FD beamforming information can be obtained at the gNB based on UL channel estimated using SRS measurements. In Rel. 17 NR, such a codebook will be supported.

Figure 10:
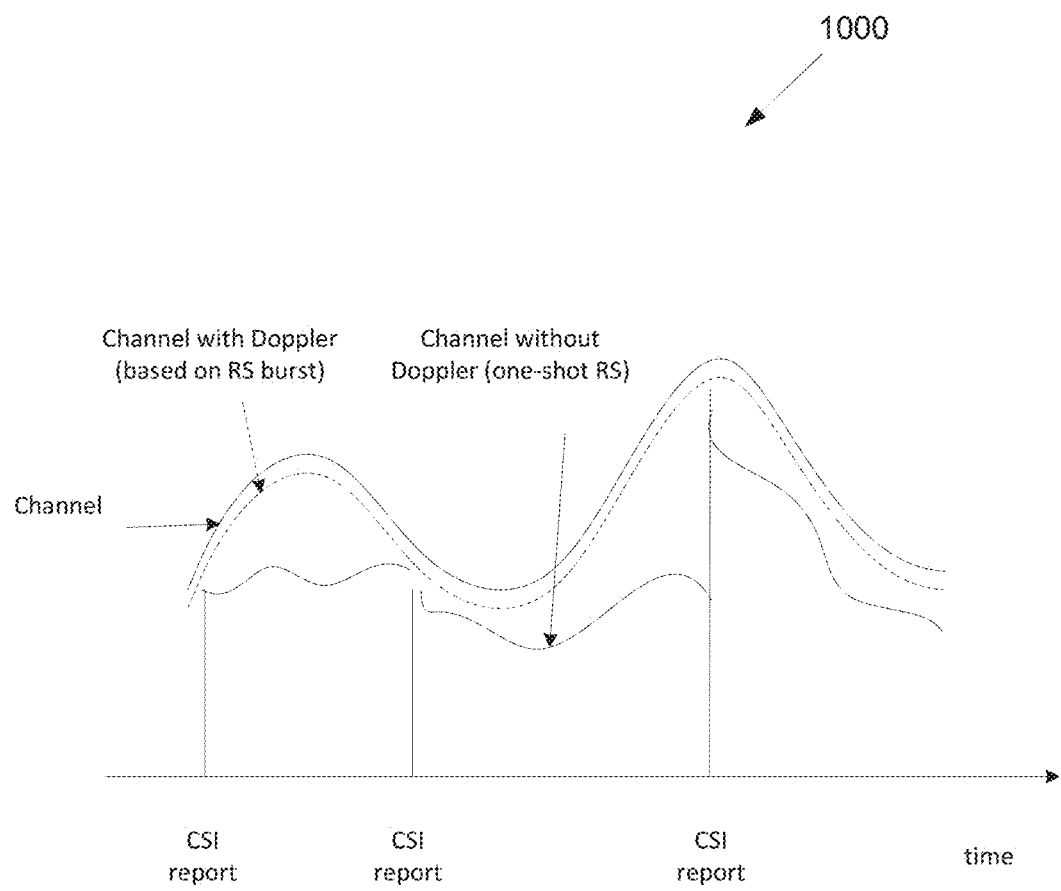
FIG. 10 illustrates channel measurements with and without Doppler components according to embodiments of the present disclosure.

FIG. 10 illustrates channel measurement with and without Doppler components 1000 according to embodiments of the present disclosure. The embodiment of the channel measurement with and without Doppler components 1000 illustrated in FIG. 10 is for illustration only. FIG. 10 does not limit the scope of this disclosure to any particular implementation of the channel measurement with and without Doppler components 1000.

Now, when the UE speed is in a moderate or high-speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in [REF9], the Doppler components of the channel remain almost constant over a large time duration, referred to as channel stationarity time, which is significantly larger than the channel coherence time. Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When the RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Or the gNB can use the obtained Doppler components of the UL channel to beamform CSI-RS for CSI reporting by the UE. An illustration of channel measurement with and without Doppler components is shown in FIG. 10. When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

As described, measuring an RS burst is needed in order to obtain the Doppler components of the channel. This disclosure provides several example embodiments on obtaining the Doppler domain components or units that determine the length of the basis vectors that are used for the Doppler compression. The disclosure also describes example embodiments on signaling related to the CSI reporting format.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 11:
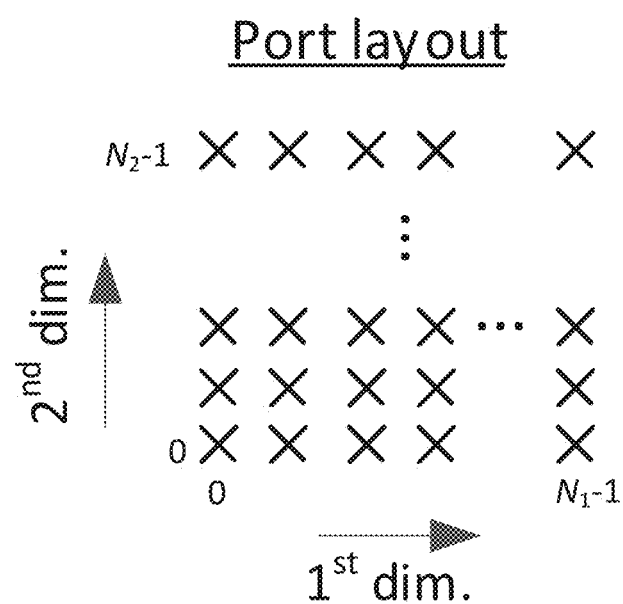
FIG. 11 illustrates an antenna port layout according to embodiments of the present disclosure.

FIG. 11 illustrates an example antenna port layout 1100 according to embodiments of the present disclosure. The embodiment of the antenna port layout 1100 illustrated in FIG. 11 is for illustration only. FIG. 11 does not limit the scope of this disclosure to any particular implementation of the antenna port layout 1100.

As illustrated in FIG. 11, $N_1$ and $N_2$ are the number of antenna ports with the same polarization in the first and second dimensions, respectively. For 2D antenna port layouts, $N_1>1$, $N_2>1$, and for 1D antenna port layouts $N_1>1$ and $N_2=1$. Therefore, for a dual-polarized antenna port layout, the total number of antenna ports is $2N_1N_2$.

As described in U.S. Pat. No. 10,659,118, issued May 19, 2020, and entitled "Method and Apparatus for Explicit CSI Reporting in Advanced Wireless Communication Systems," which is incorporated herein by reference in its entirety, a UE is configured with high-resolution (e.g., Type II) CSI reporting in which the linear combination-based Type II CSI reporting framework is extended to include a frequency dimension in addition to the first and second antenna port dimensions.

Figure 12:
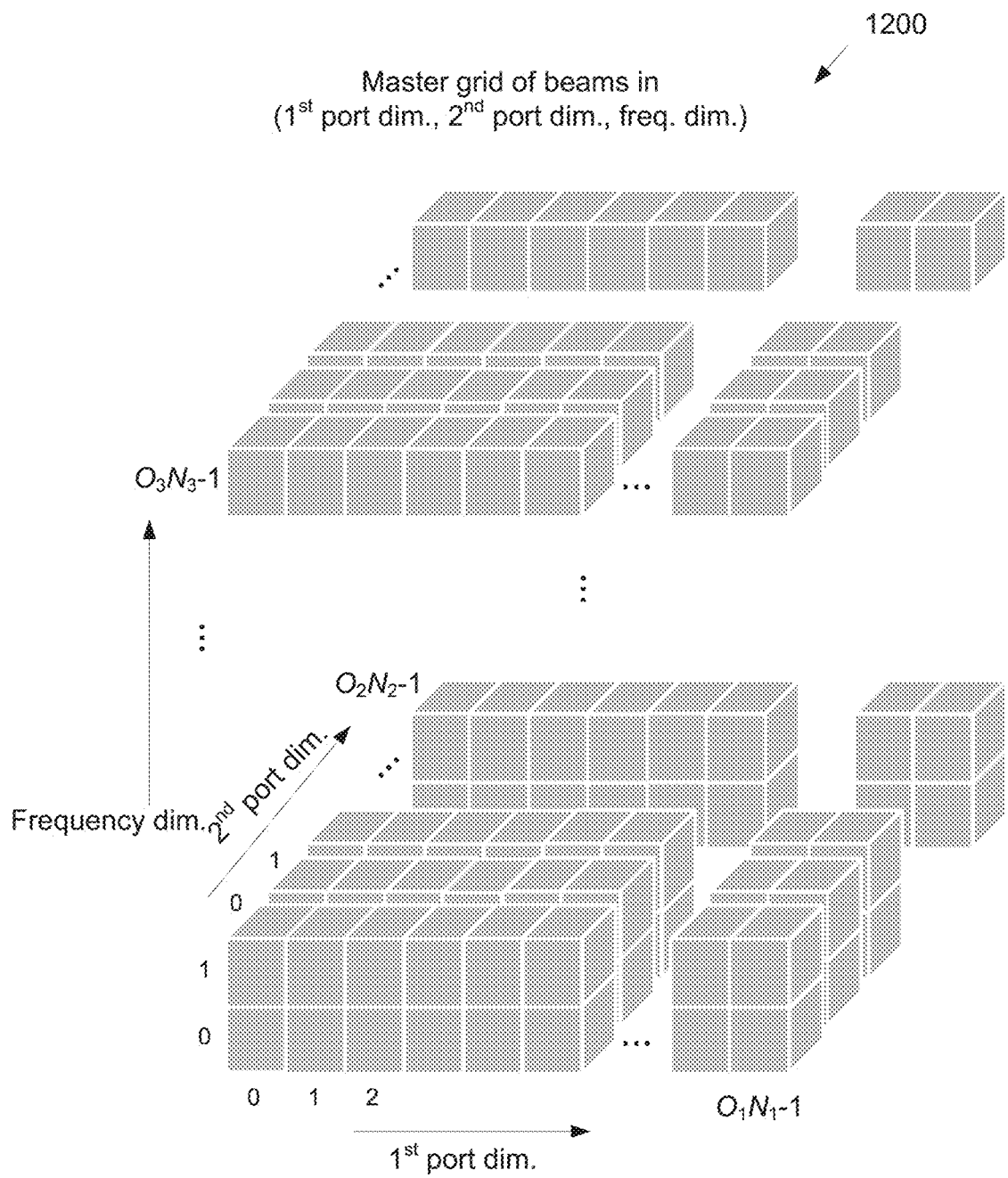
FIG. 12 illustrates a 3D grid of oversampled DFT beams according to embodiments of the present disclosure.

FIG. 12 illustrates a 3D grid 1300 of the oversampled DFT beams (1st port dim., 2nd port dim., freq. dim.) in which 1st dimension is associated with the 1st port dimension,
 2nd dimension is associated with the 2nd port dimension, and
 3rd dimension is associated with the frequency dimension.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In another example, the oversampling factors $O_i$ belongs to $\{2, 4, 8\}$. In yet another example, at least one of $O_1$, $O_2$, and $O_3$ is higher layer configured (via RRC signaling).

As explained in Section 5.2.2.2.6 of REF8, a UE is configured with higher layer parameter codebookType set to 'typeII-PortSelection-r16' for an enhanced Type II CSI reporting in which the pre-coders for all SBs and for a given layer $l=1, \ldots, \upsilon$, where $\upsilon$ is the associated RI value, is given by either $$W^l = AC_l B^H = [a_0 a_1 \ldots a_{L-1}] \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} [b_0 b_1 \ldots b_{M-1}]^H =$$

$$\sum_{f=0}^{M-1} \sum_{i=0}^{L-1} c_{l,i,f}(a_i b_f^H) = \sum_{i=0}^{L-1} \sum_{f=0}^{M-1} c_{l,i,f}(a_i b_f^H), \quad \text{(Eq. 1)}$$

or $$W^l = \begin{bmatrix} A & 0 \\ 0 & A \end{bmatrix} C_l B^H = \begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix} \quad \text{(Eq. 2)}$$

$$[b_0 b_1 \ldots b_{M-1}]^H = \begin{bmatrix} \sum_{f=0}^{M-1} \sum_{i=0}^{L-1} c_{l,i,f}(a_i b_f^H) \\ \sum_{f=0}^{M-1} \sum_{i=0}^{L-1} c_{l,i+L,f}(a_i b_f^H) \end{bmatrix},$$

where
- $N_1$ is a number of antenna ports in a first antenna port dimension (having the same antenna polarization),
- $N_2$ is a number of antenna ports in a second antenna port dimension (having the same antenna polarization),
- $P_{CSI-RS}$ is a number of CSI-RS ports configured to the UE,
- $N_3$ is a number of SBs for PMI reporting or number of FD units or number of FD components (that comprise the CSI reporting band) or a total number of precoding matrices indicated by the PMI (one for each FD unit/component),
- $a_i$ is a $2N_1 N_2 \times 1$ (Eq. 1) or $N_1 N_2 \times 1$ (Eq. 2) column vector, and $a_i$ is a $N_1 N_2 \times 1$ or $$\frac{P_{CSIRS}}{2} \times 1$$

port selection column vector if antenna ports at the gNB are co-polarized, and is a $2N_1 N_2 \times 1$ or $P_{CSIRS} \times 1$ port selection column vector if antenna ports at the gNB are dual-polarized or cross-polarized, where a port selection vector is a defined as a vector which contains a value of 1 in one element and zeros elsewhere, and $P_{CSIRS}$ is the number of CSI-RS ports configured for CSI reporting,
- $b_f$ is a $N_3 \times 1$ column vector,
- $c_{l,i,f}$ is a complex coefficient associate with vectors $a_i$ and $b_f$.

In a variation, when the UE reports a subset $K<2LM$ coefficients (where K is either fixed, configured by the gNB or reported by the UE), then the coefficient $c_{l,i,f}$ in precoder equations Eq. 1 or Eq. 2 is replaced with $x_{l,i,f} \times c_{l,i,f}$ where $x_{l,i,f}=1$ if the coefficient $c_{l,i,f}$ is reported by the UE according to some embodiments of this disclosure.

$x_{l,i,f}=0$ otherwise (i.e., $c_{l,i,f}$ is not reported by the UE).

The indication whether $x_{l,i,f}=1$ or 0 is according to some embodiments of this disclosure. For example, it can be via a bitmap.

In a variation, the precoder equations Eq. 1 or Eq. 2 are respectively generalized to $$W^l = \sum_{i=0}^{L-1} \sum_{f=0}^{M_i-1} c_{l,i,f}(a_i b_{i,f}^H) \quad \text{(Eq. 3)}$$

and $$W^l = \begin{bmatrix} \sum_{f=0}^{M-1} \sum_{f=0}^{M_i-1} c_{l,i,f}(a_i b_{i,f}^H) \\ \sum_{i=0}^{L-1} \sum_{=0}^{M_i-1} c_{l,i+L,f}(a_i b_{i,f}^H) \end{bmatrix}, \quad \text{(Eq. 4)}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i \leq M$ (where $\{M_i\}$ or $\Sigma M_i$ is either fixed, configured by the gNB or reported by the UE).

The columns of $W^l$ are normalized to norm one. For rank R or R layers ($\upsilon$=R), the pre-coding matrix is given by $$W^{(R)} = \frac{1}{\sqrt{R}} [W^1 \ W^2 \ \ldots \ W^R].$$

Eq. 2 is assumed in the rest of the disclosure. The embodiments of the disclosure, however, are general and are also application to Eq. 1, Eq. 3, and Eq. 4.

Here $$L \leq \frac{P_{CSI-RS}}{2}$$

and $M \leq N_3$. If $$L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f = w_f$, where the quantity $w_f$ is given by $$w_f = \left[ 1 \quad e^{j\frac{2\pi n_{3,l}^{(f)}}{O_3 N_3}} \quad e^{j\frac{2\pi \cdot 2 n_{3,l}^{(f)}}{O_3 N_3}} \quad \ldots \quad e^{j\frac{2\pi \cdot (N_3-1) n_{3,l}^{(f)}}{O_3 N_3}} \right]^T.$$

When $O_3 = 1$, the FD basis vector for layer $l \in \{1, \ldots, \nu\}$ (where $\nu$ is the RI or rank value) is given by $$w_f = \left[ y_{0,l}^{(f)} \quad y_{1,l}^{(f)} \quad \ldots \quad y_{N_3-1,l}^{(f)} \right]^T,$$

where $y_{t,l}^{(f)} = e^{j\frac{2\pi t n_{3,l}^{(f)}}{N_3}}$ and $n_{3,l} = \left[ n_{3,l}^{(0)}, \ldots, n_{3,l}^{(M-1)} \right]$ where $n_{3,l}^{(f)} \in \{0, 1, \ldots, N_3 - 1\}$.

In another example, discrete cosine transform DCT basis is used to construct/report basis B for the $3^{rd}$ dimension. The m-th column of the DCT compression matrix is simply given by $$[W_f]_{nm} = \begin{cases} \frac{1}{\sqrt{K}}, & n = 0 \\ \sqrt{\frac{2}{K}} \cos \frac{\pi (2m+1)n}{2K}, & n = 1, \ldots K-1 \end{cases},$$

and $K = N_3$, and $m = 0, \ldots, N_3 - 1$.

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows.

$$W = A_l C_l B_l^H = W_1 \tilde{W}_2 W_f^H, \quad \text{(Eq. 5)}$$

where $A = W_1$ corresponds to the Rel. 15 $W_1$ in Type II CSI codebook [REF8], and $B = W_f$.

The $C_l = \tilde{W}_2$ matrix consists of all the required linear combination coefficients (e.g., amplitude and phase or real or imaginary). Each reported coefficient $(c_{l,i,f} = p_{l,i,f} \phi_{l,i,f})$ in $\tilde{W}_2$ is quantized as amplitude coefficient $(p_{l,i,f})$ and phase coefficient $(\phi_{l,i,f})$. In one example, the amplitude coefficient $(p_{l,i,f})$ is reported using a A-bit amplitude codebook where A belongs to $\{2, 3, 4\}$. If multiple values for A are supported, then one value is configured via higher layer signaling. In another example, the amplitude coefficient $(p_{l,i,f})$ is reported as $p_{l,i,f} = p_{l,i,f}^{(1)} p_{l,i,f}^{(2)}$ where $p_{l,i,f}^{(1)}$ is a reference or first amplitude which is reported using a A1-bit amplitude codebook where A1 belongs to $\{2, 3, 4\}$, and $p_{l,i,f}^{(2)}$ is a differential or second amplitude which is reported using a A2-bit amplitude codebook where $A2 \leq A1$ belongs to $\{2, 3, 4\}$.

For layer l, let us denote the linear combination (LC) coefficient associated with spatial domain (SD) basis vector (or beam) $i \in \{0, 1, \ldots, 2L-1\}$ and frequency domain (FD) basis vector (or beam) $f \in \{0, 1, \ldots, M-1\}$ as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \leq K_0 = \lceil \beta \times 2LM \rceil < 2LM$ and $\beta$ is higher layer configured. The remaining $2LM - K_{NZ}$ coefficients that are not reported by the UE are assumed to be zero. The following quantization scheme is used to quantize/report the $K_{NZ}$ NZ coefficients.

The UE reports the following for the quantization of the NZ coefficients in $\tilde{W}_2$
- A X-bit indicator for the strongest coefficient index $(i^*, f^*)$, where $X = \lceil \log_2 K_{NZ} \rceil$ or $\lceil \log_2 2L \rceil$.
  Strongest coefficient $c_{l,i^*,f^*} = 1$ (hence its amplitude/phase are not reported)
- Two antenna polarization-specific reference amplitudes are used.
  For the polarization associated with the strongest coefficient $c_{l,i^*,f^*} = 1$, since the reference amplitude $p_{l,i,f}^{(1)} = 1$, it is not reported
  For the other polarization, reference amplitude $p_{l,i,f}^{(1)}$ is quantized to 4 bits
  The 4-bit amplitude alphabet is $$\left\{ 1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}} \right\}.$$

For $\{c_{l,i,f}, (i, f) \neq (i^*, f^*)\}$:
  For each polarization, differential amplitudes $p_{l,i,f}^{(2)}$ of the coefficients calculated relative to the associated polarization-specific reference amplitude and quantized to 3 bits
  The 3-bit amplitude alphabet is $$\left\{ 1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}} \right\}.$$

Note: The final quantized amplitude $p_{l,i,f}$ is given by $p_{l,i,f}^{(1)} \times p_{l,i,f}^{(2)}$.

Each phase is quantized to either 8PSK ($N_{ph} = 8$) or 16PSK ($N_{ph} = 16$) (which is configurable).

For the polarization $r^* \in \{0, 1\}$ associated with the strongest coefficient $c_{l,i^*,f^*}$, we have $$r^* = \left\lfloor \frac{i^*}{L} \right\rfloor$$

and the reference amplitude $p_{l,i,f}^{(1)} = p_{l,i,f}^{(1)} = 1$. For the other polarization $r \in \{0, 1\}$ and $r \neq r^*$, we have $$r = \left( \left\lfloor \frac{i^*}{L} \right\rfloor + 1 \right)$$

mod 2 and the reference amplitude $p_{l,i,f}^{(1)}=p_{l,i,f}^{(1)}$ is quantized (reported) using the 4-bit amplitude codebook mentioned above.

A UE can be configured to report M FD basis vectors. In one example, $$M = \left\lceil p \times \frac{N_3}{R} \right\rceil,$$

where R is higher-layer configured from {1, 2} and p is higher-layer configured from {¼, ½}. In one example, the p value is higher-layer configured for rank 1-2 CSI reporting. For rank >2 (e.g., rank 3-4), the p value (denoted by $v_0$) can be different. In one example, for rank 1-4, (p, $v_0$) is jointly configured from {(½, ¼), (¼, ¼), (¼, ⅛)}, i.e., $$M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3=N_{SB} \times R$ where $N_{SB}$ is the number of SBs for CQI reporting. In the rest of the disclosure, M is replaced with $M_v$ to show its dependence on the rank value v, hence p is replaced with $p_v$, $v \in \{1, 2\}$ and $v_0$ is replaced with $p_v$, $v \in \{3, 4\}$.

A UE can be configured to report $M_v$ FD basis vectors in one-step from $N_3$ basis vectors freely (independently) for each layer $l \in \{0, 1, \ldots, v-1\}$ of a rank v CSI reporting. Alternatively, a UE can be configured to report $M_v$ FD basis vectors in two-step as follows.

In step 1, an intermediate set (InS) comprising $N_3' < N_3$ basis vectors is selected/reported, wherein the InS is common for all layers.

In step 2, for each layer $l \in \{0, 1, \ldots, v-1\}$ of a rank v CSI reporting, M FD basis vectors are selected/reported freely (independently) from $N_3'$ basis vectors in the InS.

In one example, one-step method is used when $N_3 \leq 19$ and two-step method is used when $N_3 > 19$. In one example, $N_3' = \lceil \alpha M \rceil$ where $\alpha > 1$ is either fixed (to 2 for example) or configurable.

The codebook parameters used in the DFT based frequency domain compression (Eq. 5) are (L, $p_v$ for $v \in \{1, 2\}$, $p_v$ for $v \in \{3, 4\}$, β, α, $N_{ph}$). In one example, the set of values for these codebook parameters are as follows.

L: the set of values is {2, 4} in general, except L ∈ {2, 4, 6} for rank 1-2, 32 CSI-RS antenna ports, and R=1.

($p_v$ for $v \in \{1, 2\}$, $p_v$ for $v \in \{3, 4\}$) ∈ {(½, ¼), (¼, ¼), (¼, ⅛)}.

β ∈ {¼, ½, ¾}.

α ∈ {1.5, 2, 2.5, 3}

$N_{ph}$ ∈ {8, 16}.

In another example, the set of values for these codebook parameters are as follows: α=2, $N_{ph}$=16, and as in Table 1, where the values of L, β and $p_v$ are determined by the higher layer parameter paramCombination-r17. In one example, the UE is not expected to be configured with paramCombination-r17 equal to 3, 4, 5, 6, 7, or 8 when $P_{CSI-RS}$=4,
7 or 8 when number of CSI-RS ports $P_{CSI-RS}$<32,
7 or 8 when higher layer parameter typeII-RI-Restriction-r17 is configured with $r_i$=1 for any i>1,
7 or 8 when R=2.

The bitmap parameter typeII-RI-Restriction-r17 forms the bit sequence $r_3$, $r_2$, $r_1$, $r_0$ where $r_0$ is the LSB and $r_3$ is the MSB. When $r_i$ is zero, i ∈ {0, 1, ..., 3}, PMI and RI reporting are not allowed to correspond to any precoder associated with v=i+1 layers. The parameter R is configured with the higher-layer parameter numberOfPMISubbandsPerCQISubband-r17. This parameter controls the total number of precoding matrices $N_3$ indicated by the PMI as a function of the number of subbands in csi-ReportingBand, the subband size configured by the higher-level parameter subbandSize and of the total number of PRBs in the bandwidth part.

TABLE 1

| param-Combination-r17 | L | $p_v$ v ∈ {1,2} | $p_v$ v ∈ {3,4} | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

The above-mentioned framework (equation 5) represents the precoding-matrices for multiple ($N_3$) FD units using a linear combination (double sum) over 2L SD beams and $M_v$ FD beams. This framework can also be used to represent the precoding-matrices in time domain (TD) by replacing the FD basis matrix $W_f$ with a TD basis matrix $W_t$, wherein the columns of $W_t$ comprises $M_v$ TD beams that represent some form of delays or channel tap locations. Hence, a precoder $W^l$ can be described as follows.

$$W = A_l C_l B_l^H = W_1 \tilde{W}_2 W_t^H, \quad \text{(Equation 5A)}$$

In one example, the $M_v$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The abovementioned framework for CSI reporting based on space-frequency compression (equation 5) or space-time compression (equation 5A) frameworks can be extended to Doppler domain (e.g., for moderate to high mobility UEs). This disclosure focuses on a CS-RS burst that can be used to obtain Doppler component(s) of the channel, which can be used to perform Doppler domain (DD) or time domain (TD) compression. In particular, the disclosure provides embodiments regarding the granularity or unit of the components across which the TD/DD compression is performed, where each component corresponds to one or multiple time instances within a CSI-RS burst or across multiple CSI-RS bursts.

This disclosure focuses on a reference signal burst that can be used to obtain Doppler component(s) of the channel, which can be used to perform Doppler domain compression.

Figure 13:
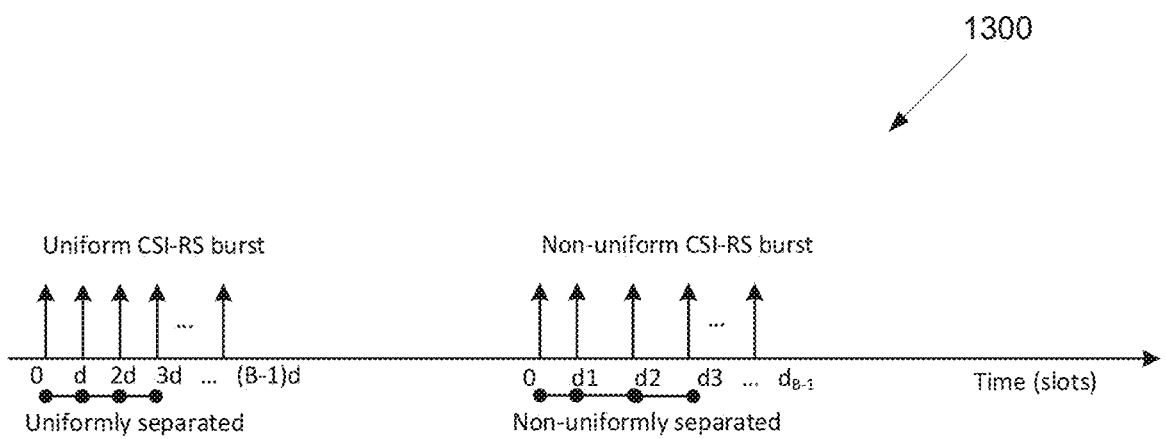
FIG. 13 illustrates an example of a UE configured to receive a burst of NZP CSI-RS resources according to embodiments of the present disclosure.

FIG. 13 illustrates an example of a UE configured to receive a burst of non-zero power (NZP) CSI-RS resource(s) 1300 according to embodiments of the present disclosure. The embodiment of the UE configured to receive the burst of NZP CSI-RS resource(s) 1300 illustrated in FIG. 13 is for illustration only. FIG. 13 does not limit the scope of this disclosure to any particular implementation of the UE configured to receive a burst of NZP CSI-RS resource(s) 1300.

In one embodiment, as shown in FIG. 13, a UE is configured to receive a burst (or occasions) of non-zero power (NZP) CSI-RS resource(s), referred to as CSI-RS burst (or occasions) for brevity, in B time slots, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1=d_1$, $e_2=d_2-d_1$, $e_3=d_3-d_2$, ..., so on, where $e_i \neq e_j$ for at least one pair (i, j) with i≠j.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

Let $h_t$ be the DL channel estimate based on the CSI-RS resource(s) received in time slot t∈{0, 1, ..., B−1}. When the DL channel estimate in slot t is a matrix $G_t$ of size $N_{Rx} \times N_{Tx} \times N_{sc}$, then $h_t = vec(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→ and so on, implying that the concatenation starts from the first dimension, then moves second dimension, and continues until the last dimension. Let $H_B = [h_0 \; h_1 \; ... \; h_{B-1}]$ be a concatenated DL channel. The Doppler component(s) of the DL channel can be obtained based on $H_B$. For example, $H_B$ can be represented as $C\Phi^H = \sum_{s=0}^{N-1} c_s \phi_s^H$ where $\Phi = [\phi_0 \; \phi_1 \; ... \; \phi_{N-1}]$ is a Doppler domain (DD) or TD basis matrix whose columns comprise basis vectors, $C = [c_0 \; c_1 \; ... \; c_{N-1}]$ is a coefficient matrix whose columns comprise coefficient vectors, and N<B is the number of DD or TD basis vectors. Since the columns of $H_B$ are likely to be correlated, a DD or TD compression can be achieved when the value of N is small (compared to the value of B). In this example, the Doppler component(s) of the channel is represented by the DD or TD basis matrix $\Phi$ and the coefficient matrix C.

Figure 14:
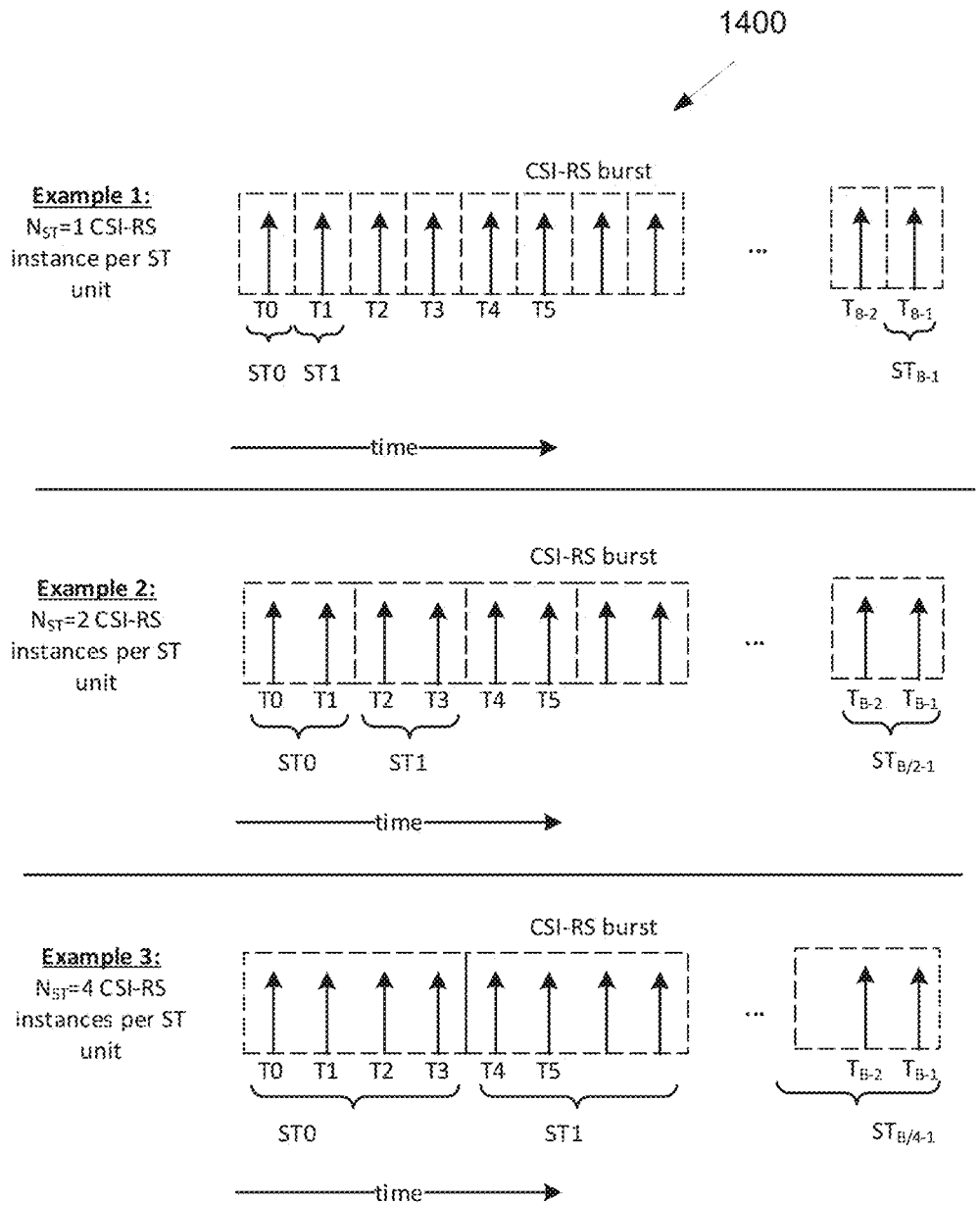
FIG. 14 illustrates an example of a UE configured to determine a value of $N_4$ based on the value B in a CSI-RS burst and a sub-time unit size $N_{ST}$ according to embodiments of the present disclosure.

FIG. 14 illustrates an example of a UE configured to determine a value of $N_4$ based on the value B in a CSI-RS burst and a sub-time unit size $N_{ST}$ 1400 according to embodiments of the present disclosure. The embodiment of the UE configured to determine a value of $N_4$ based on the value B in a CSI-RS burst and a sub-time unit size $N_{ST}$ 1400 illustrated in FIG. 14 is for illustration only. FIG. 14 does not limit the scope of this disclosure to any particular implementation of the UE configured to determine a value of $N_4$ based on the value B in a CSI-RS burst and a sub-time unit size $N_{ST}$ 1400.

Let $N_4$ be the length of the basis vectors {$\phi_s$}, e.g., each basis vector is a length $N_4 \times 1$ column vector.

In one embodiment, a UE is configured to determine a value of $N_4$ based on the value B (number of CSI-RS instances) in a CSI-RS burst and components across which the DD or TD compression is performed, where each component corresponds to one or multiple time instances within the CSI-RS burst. In one example, $N_4$ is fixed (e.g., $N_4=B$) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD or TD compression corresponds to a ST unit. Three examples of the ST units are shown in FIG. 14. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}=1$ or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

Figure 15:
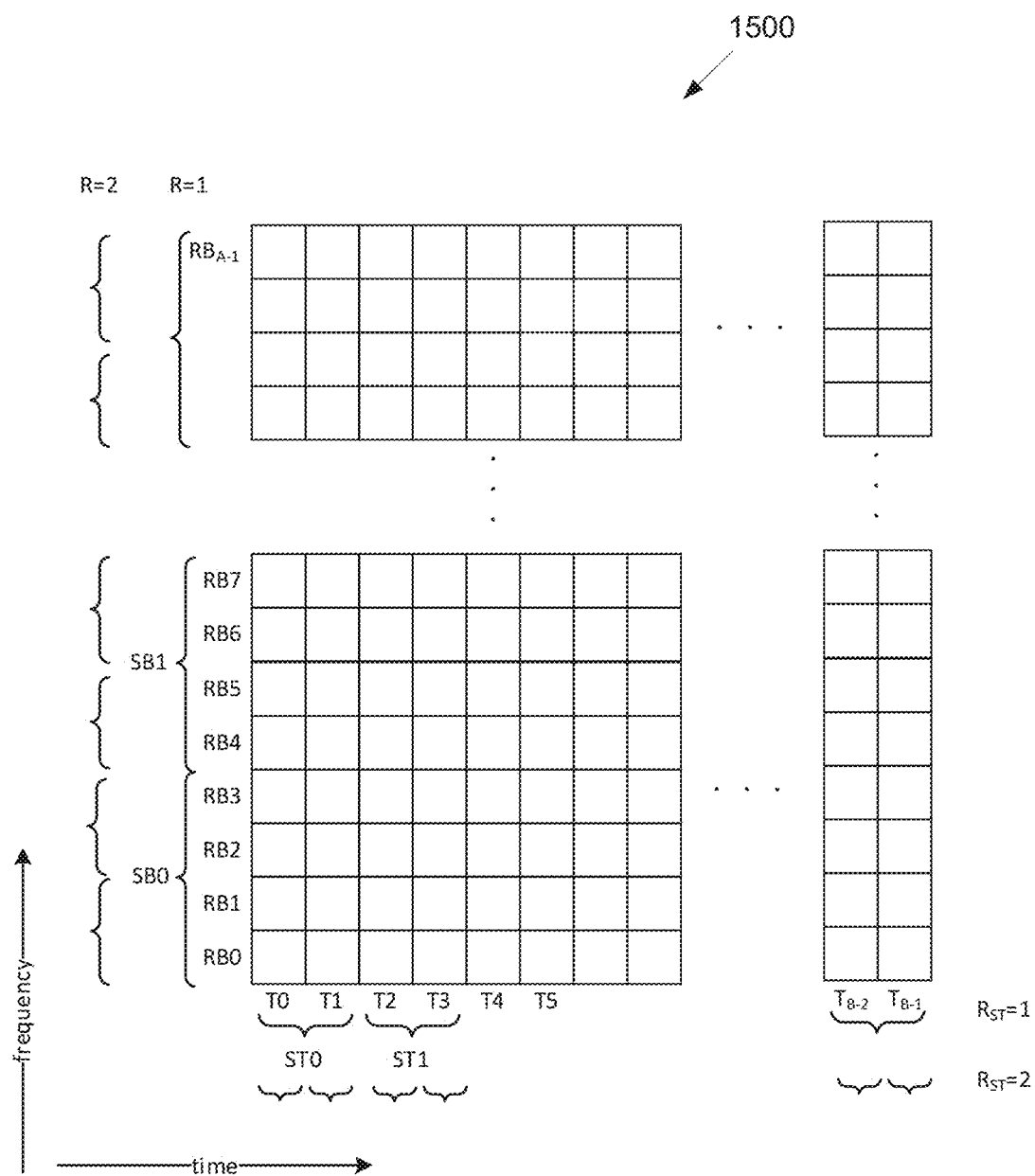
FIG. 15 illustrates an example of a UE configured to determine a value of frequency-domain unit and a value of time/Doppler domain unit based on $J \geq 1$ CSI-RS bursts that occupy a frequency band and a time span according to embodiments of the present disclosure.

FIG. 15 illustrates an example of a UE configured to determine a value of a frequency-domain unit and a value of time/Doppler domain unit based on J≥1 CSI-RS bursts that occupy a frequency band and a time span 1500 according to embodiments of the present disclosure. The embodiment of the UE configured to determine a value of a frequency-domain unit and a value of time/Doppler domain unit based on J≥1 CSI-RS bursts that occupy a frequency band and a time span 1500 illustrated in FIG. 15 is for illustration only. FIG. 15 does not limit the scope of this disclosure to any particular implementation of the UE configured to determine a value of a frequency-domain unit and a value of time/Doppler domain unit based on J≥1 CSI-RS bursts that occupy a frequency band and a time span 1500.

In one embodiment, a UE is configured with J≥1 CSI-RS bursts (as illustrated earlier in the disclosure) that occupy a frequency band and a time span (duration), wherein the frequency band comprises A RBs, and the time span comprises B time instances (of CSI-RS resource(s)) or C or B+C time instances, as described above. When J>1, the A RBs and/or Y time instances (where Y=B or C or B+C) can be aggregated across j CSI-RS bursts. In one example, the frequency band equals the CSI reporting band, and the time span equals the number of CSI-RS resource instances (across J CSI-RS bursts) or the time span/window during which the CSI report is expected to be valid, both can be configured to the UE for a CSI reporting, which can be based on the DD or TD compression.

The UE is further configured to partition (divide) the A RBs into subbands (SBs) and/or the Y time instances into sub-times (STs). The partition of A RBs can be based on a SB size value $N_{SB}$, which can be configured to the UE (cf. Table 5.2.1.4-2 of REF8). The partition of Y time instances can be based either on an ST size value $N_{ST}$ or on an r value, as described in this disclosure. An example is illustrated in FIG. 15 for Y=B, where RB0, RB1, ..., $RB_{A-1}$ comprise A RBs, $T_0, T_1, ..., T_{B-1}$ comprise B time instances, the SB size $N_{SB}=4$, and the ST size $N_{ST}=2$.

The CSI reporting is based on channel measurements (based on CSI-RS bursts) in three-dimensions (3D): the first dimension corresponds to SD comprising $2N_1N_2$ or $P_{CSIRS}$ CSI-RS antenna ports, the second dimension corresponds to FD comprising $N_3$ FD units (e.g., SB), and the third dimension corresponds to DD or TD comprising $N_4$ DD or TD units (e.g., ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD or TD.

In one embodiment, the UE is configured to report a CSI determined based on a codebook comprising components: (A) three separate basis matrices $W_1$, $W_f$, and $W_d$ for SD, FD, and DD or TD compression, respectively, and (B) coefficients $\tilde{W}_2$. In particular, the precoder for layer 1 is given by $$W_l = A_l C_l B_l^H = W_1 \tilde{W}_2 W_{f,d}^H$$

Here $W_l$ is a $P_{CSIRS} \times N_3 N_4$ matrix whose columns are precoding vectors for $N_3 N_4$ pairs of (FD, DD/TD) units, $W_1$ is a $P_{CSIRS} \times 2L$ or $P_{CSIRS} \times L$ SD basis matrix (similar to Rel. 16 enhanced Type II codebook), $\tilde{W}_2$ is a $2L \times M_v N$ coefficients matrix, and $W_{f,d}$ is a $N_3 N_4 \times M_v N$ basis matrix for (FD, DD/TD) pairs. The columns of $W_f$ comprises vectors $v_{f,d,l}$ that are Kronecker products (KPs) of vectors $g_{f,l}$ and $h_{d,l}$, columns of $W_f$ and $W_d$, respectively. $W_f$ is a $N_3 \times M_v$ FD basis matrix (similar to Rel. 16 enhanced Type II codebook) and $W_d$ is a $N_4 \times N$ DD basis matrix.

In one example, $v_{f,d,l} = [g_{f,l} \phi_{0,l}^{(d)} \ g_{f,l} \phi_{1,l}^{(d)} \ \ldots \ g_{f,l} \phi_{N_4-1,l}^{(d)}]^T = [\phi_{0,l}^{(d)} g_{f,l} \ \phi_{1,l}^{(d)} g_{f,l} \ \ldots \ \phi_{N_4-1,l}^{(d)} g_{f,l}]^T$, the KP of $h_{d,l}$ and $g_{f,l}$.

In one example $v_{f,d,l} = [h_{d,l} y_{0,l}^{(f)} \ h_{d,l} y_{1,l}^{(f)} \ \ldots \ h_{d,l} y_{N_3-1,l}^{(f)}]^T = [y_{0,l}^{(f)} h_{d,l} \ y_{1,l}^{(f)} h_{d,l} \ \ldots \ y_{N_3-1,l}^{(f)} h_{d,l}]^T$, the KP of $g_{f,l}$ and $h_{d,l}$.

Here, $g_{f,l} = [y_{0,l}^{(f)} \ y_{1,l}^{(f)} \ \ldots \ y_{N_3-1,l}^{(f)}]$ and $h_{d,l} = [\phi_{0,l}^{(d)} \ \phi_{0,l}^{(d)} \ \ldots \ \phi_{N_4-1,l}^{(d)}]$.

At least one of the following examples is used/configured regarding the reporting of the three bases.

In one example, all three bases are reported by the UE, e.g., via a component or more than one component of the PMI.

In one example, 2 out of 3 bases are reported, and the $3^{rd}$ basis is either fixed, or configured (e.g., via RRC, MAC CE, or DCI).

In one example, the 2 reported bases correspond to SD and FD bases, and the $3^{rd}$ basis corresponds to the DD/TD basis.

In one example, the 2 reported bases correspond to SD and DD/TD bases, and the $3^{rd}$ basis corresponds to the FD basis.

In one example, the 2 reported bases correspond to FD and DD/TD bases, and the $3^{rd}$ basis corresponds to the SD basis.

In one example, 1 out of 3 bases is reported, and one or both of the other two bases is either fixed, or configured (e.g., via RRC, MAC CE, or DCI).

In one example, the 1 reported basis corresponds to the SD basis, and the other two bases correspond to the FD and DD/TD bases.

In one example, the 1 reported basis corresponds to the FD basis, and the other two bases correspond to the SD and DD/TD bases.

In one example, the 1 reported basis corresponds to the DD/TD basis, and the other two bases correspond to the SD and FD bases.

At least one of the following examples is used/configured regarding the three basis matrices.

In one, when $W_1$ is a $P_{CSIRS} \times 2L$, the L SD basis vectors are determined the same way as in Rel. 15/16 Type II codebooks (cf. 5.2.2.2.3, REF 8), i.e., the SD basis vectors $v_{m_1^{(i)} m_2^{(i)}}$, i=0, 1, ..., L−1, are identified by the indices $q_1$, $q_2$, $n_1$, $n_2$, can be indicated by PMI components $i_{1,1}$, $i_{1,2}$, and are obtained as in 5.2.2.2.3 of [REF 8].

The $M_v$ FD basis vectors, $g_{f,l} = [y_{0,l}^{(f)} \ y_{1,l}^{(f)} \ \ldots \ y_{N_3-1,l}^{(f)}]$, f=0, 1, ..., $M_v$−1, are identified by $n_{3,l}$ (l=1, ..., v) where $$n_{3,l} = [n_{3,l}^{(0)}, \ldots, n_{3,l}^{(M_v-1)}]$$

$$n_{3,l}^{(f)} \in \{0,1, \ldots, N_3-1\}$$

The vector $y_{t,l} = [y_{t,l}^{(0)} \ y_{t,l}^{(0)} \ \ldots \ y_{t,l}^{(M_v-1)}]$ comprises entries of FD basis vectors with FD index t={0, 1, ..., $N_3$−1}, which is an (FD) index associated with the precoding matrix.

The N DD/TD basis vectors, $h_{d,l} = [\phi_{0,l}^{(d)} \ \phi_{1,l}^{(d)} \ \ldots \ \phi_{N_4-1,l}^{(d)}]$, d=0, 1, ..., N−1, are identified by $n_{4,l}$ (l=1, ..., v) where $$n_{4,l} = [n_{4,l}^{(0)}, \ldots, n_{4,l}^{(N-1)}]$$

$$n_{4,l}^{(d)} \in \{0,1, \ldots, N_4-1\}$$

The vector $\phi_{u,l} = [\phi_{u,l}^{(0)} \ \phi_{u,l}^{(1)} \ \ldots \ \phi_{u,l}^{(N-1)}]$ comprises entries of DD/TD basis vectors with DD/TD index u={0, 1, ..., $N_4$−1}, which is an (DD/TD) index associated with the precoding matrix.

In one example, the FD basis vectors are orthogonal DFT vectors, and $$y_{t,l}^{(f)} = e^{j\frac{2\pi t n_{3,l}^{(f)}}{N_3}}.$$

In one example, the DD/TD basis vectors are orthogonal DFT vectors, and $$\phi_{u,l}^{(d)} = e^{j\frac{2\pi u n_{4,l}^{(d)}}{N_4}}.$$

In one example, the FD basis vectors are oversampled (or rotated) orthogonal DFT vectors with the oversampling (rotation) factor $O_3$, and $$y_{t,l}^{(f)} = e^{j\frac{2\pi t n_{3,l}^{(f)}}{O_3 N_3}},$$

and the $M_v$ FD basis vectors are also identified by the rotation index $q_{3,l} \in \{0, 1, \ldots, O_3-1\}$. In one example, the DD/TD basis vectors are oversampled (or rotated) orthogonal DFT vectors with the oversampling (rotation) factor $O_4$, and $$\phi_{u,l}^{(d)} = e^{j\frac{2\pi u n_{4,l}^{(d)}}{O_4 N_4}}$$

and the N DD/TD basis vectors are also identified by the rotation index $q_{4,l} \in \{0, 1, \ldots, O_4-1\}$. In one example, $O_3$ is fixed (e.g., 4), or configured (e.g., via RRC), or reported by the UE. In one example, $O_4$ is fixed (e.g., 4), or configured (e.g., via RRC), or reported by the UE. In one example, the rotation factor is layer-common (one value for all layers), i.e., $q_{3,l} = q_3$ or $q_{4,l} = q_4$.

The precoders for $v$ layers are then given by $$W^l_{\ldots,t,u} = \frac{1}{\sqrt{N_1 N_2 \gamma_{t,u,l}}} \begin{bmatrix} \sum_{i=0}^{L-1} v^{(i)}_{m_1^{(i)},m_2^{(i)}} \sum_{f=0}^{M_v-1} \sum_{d=0}^{N-1} y^{(f)}_{t,l} \phi^{(d)}_{u,l} x_{l,i,f,d} \\ \sum_{i=0}^{L-1} v^{(i)}_{m_1^{(i)},m_2^{(i)}} \sum_{f=0}^{M_v-1} \sum_{d=0}^{N-1} y^{(f)}_{t,l} \phi^{(d)}_{u,l} x_{l,i+L,f,d} \end{bmatrix}, l=1,\ldots,v,$$

$$\gamma_{t,u,l} = \sum_{i=0}^{2L-1} \left| \sum_{f=0}^{M_v-1} \sum_{d=0}^{N-1} y^{(f)}_{t,l} \phi^{(d)}_{u,l} x_{l,i,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$. In one example, f=k mod $M_v$ and $$d = \frac{k-f}{M_v},$$

where $k \in \{0, 1, \ldots, M_v N\}$ is a column index of $\tilde{W}_2$. Here, $k=M_v d+f$.

In one example, d=k mod N and $$f = \frac{k-d}{N}.$$

Here, k=Nf+d.
In one example, $$x_{l,i,f,d} = p^{(1)}_{l,\lfloor \frac{i}{L} \rfloor} p^{(2)}_{l,i,f,d} \varphi_{l,i,f,d}$$

similar to Rel. 16 enhanced Type II codebook (cf. Section 5.2.2.2.5, REF 8). Then, $$W^l_{\ldots,t,u} = \frac{1}{\sqrt{N_1 N_2 \gamma_{t,u,l}}} \begin{bmatrix} \sum_{i=0}^{L-1} v^{(i)}_{m_1^{(i)},m_2^{(i)}} p^{(1)}_{l,0} \sum_{f=0}^{M_v-1} \sum_{d=0}^{N-1} y^{(f)}_{t,l} \phi^{(d)}_{u,l} p^{(2)}_{l,i,f,d} \varphi_{l,i,f,d} \\ \sum_{i=0}^{L-1} v^{(i)}_{m_1^{(i)},m_2^{(i)}} p^{(1)}_{l,1} \sum_{f=0}^{M_v-1} \sum_{d=0}^{N-1} y^{(f)}_{t,l} \phi^{(d)}_{u,l} p^{(2)}_{l,i+L,f,d} \varphi_{l,i+L,f,d} \end{bmatrix},$$

$$l=1,\ldots,v,$$

$$\gamma_{t,u,l} = \sum_{i=0}^{2L-1} \left(p^{(1)}_{l,\lfloor \frac{i}{L} \rfloor}\right)^2 \left| \sum_{f=0}^{M_v-1} \sum_{d=0}^{N-1} y^{(f)}_{t,l} \phi^{(d)}_{u,l} p^{(2)}_{l,i,f,d} \varphi_{l,i,f,d} \right|^2,$$

and the quantities $\varphi_{l,i,f,d}$ and $p_{l,1}^{(1)}$, $p_{l,i,f,d}^{(2)}$, correspond to $\varphi_{l,i,f}$ and $p_{l,0}^{(1)}$, $p_{l,1}^{(1)}$, $p_{l,i,f}^{(2)}$ respectively, as described in 5.2.2.2.5 of [REF 8].

In a variation, when $W_1$ is a $P_{CSIRS} \times L$, and is not common for two antenna polarizations, the precoders for $v$ layers are then given b $$W^l_{\ldots,t,u} = \frac{1}{\sqrt{N_1 N_2 \gamma_{t,u,l}}} \left[ \sum_{i=0}^{L-1} v^{(i)}_{m_1^{(i)},m_2^{(i)}} \sum_{f=0}^{M_v-1} \sum_{d=0}^{N-1} y^{(f)}_{t,l} \phi^{(d)}_{u,l} x_{l,i,f,d} \right], l=1,\ldots,v,$$

$$\gamma_{t,u,l} = \sum_{i=0}^{L-1} \left| \sum_{f=0}^{M_v-1} \sum_{d=0}^{N-1} y^{(f)}_{t,l} \phi^{(d)}_{u,l} x_{l,i,f,d} \right|^2,$$

Where $v^{(i)}_{m_1^{(i)} m_2^{(i)}}$ is a $P_{CSIRS} \times 1$ or $2N_1 N_2 \times 1$ FD basis vector.

In one example, when $W_1$ is a $P_{CSIRS} \times 2L$, the L SD basis vectors are determined as in example I.1.1. The $M_v N$ basis vectors $v_{k,l} = v_{f,d,l} = [y_{0,l}^{(k)} \ y_{1,l}^{(k)} \ldots y_{N_3 N_4 -1, l}^{(k)}]$, k=0, 1, ..., $M_v N-1$, are determined based on the $M_v$ FD basis vectors, $g_{f,l} = [y_{0,l}^{(f)} \ y_{1,l}^{(f)} \ldots y_{N_3-1,l}^{(f)}]$, f=0, 1, ..., $M_v-1$, and DD/TD basis vectors, $h_{d,l} = [\phi_{0,l}^{(d)} \ \phi_{1,l}^{(d)} \ldots \phi_{N_4-1,l}^{(d)}]$, d=0, 1, ..., N−1. The index k determines (f, d) as explained in example I.1.1. The details of $g_{f,l}$ and $h_{d,l}$ are as in example I.1.1.

The vector $y_{t,u,l} = [y_{t,u,l}^{(0)} \ y_{t,u,l}^{(1)} \ldots y_{t,u,l}^{(M_v N-1)}]$ comprises entries of FD basis vectors with FD index t={0, 1, ..., $N_3-1$} and entries of DD/TD basis vectors with DD/TD index u={0, 1, ..., $N_4-1$}, and (t, u) is an (FD, DD/TD) index pair associated with the precoding matrix.

The precoders for $v$ layers are given by $$W^l_{\ldots,t,u} = \frac{1}{\sqrt{N_1 N_2 \gamma_{t,u,l}}} \begin{bmatrix} \sum_{i=0}^{L-1} v^{(i)}_{m_1^{(i)},m_2^{(i)}} \sum_{f=0}^{M_v-1} \sum_{d=0}^{N-1} y^{(k)}_{t,u,l} x_{l,i,f,d} \\ \sum_{i=0}^{L-1} v^{(i)}_{m_1^{(i)},m_2^{(i)}} \sum_{f=0}^{M_v-1} \sum_{d=0}^{N-1} y^{(k)}_{t,u,l} x_{l,i+L,f,d} \end{bmatrix}, l=1,\ldots,v,$$

$$\gamma_{t,u,l} = \sum_{i=0}^{2L-1} \left| \sum_{f=0}^{M_v-1} \sum_{d=0}^{N-1} y^{(k)}_{t,u,l} x_{l,i,f,d} \right|^2,$$

where $x_{l,i,f,d}$ is the coefficient (an element of $\tilde{W}_2$) associated with indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where $k \in \{0, 1, \ldots, M_v N\}$ is a column index of $\tilde{W}_2$. Here, $k=M_v d+f$.

In one example, d=k mod N and $$f = \frac{k-d}{N}.$$

Here, k=Nf+d.
In one example, $$x_{l,i,f,d} = p^{(1)}_{l,\lfloor \frac{i}{L} \rfloor} p^{(2)}_{l,i,f,d} \varphi_{l,i,f,d}$$

as in Rel. 16 enhanced Type II codebook (cf. Section 5.2.2.2.5, REF 8). Then, $$W^l_{\ldots,t,u} = \frac{1}{\sqrt{N_1 N_2 \gamma_{t,u,l}}} \begin{bmatrix} \sum_{i=0}^{L-1} v^{(i)}_{m_1^{(i)},m_2^{(i)}} p^{(1)}_{l,0} \sum_{f=0}^{M_v-1} \sum_{d=0}^{N-1} y^{(k)}_{t,u,l} p^{(2)}_{l,i,f,d} \varphi_{l,i,f,d} \\ \sum_{i=0}^{L-1} v^{(i)}_{m_1^{(i)},m_2^{(i)}} p^{(1)}_{l,1} \sum_{f=0}^{M_v-1} \sum_{d=0}^{N-1} y^{(k)}_{t,u,l} p^{(2)}_{l,i+L,f,d} \varphi_{l,i+L,f,d} \end{bmatrix},$$

$$l=1,\ldots,v,$$

$$\gamma_{t,u,l} = \sum_{i=0}^{2L-1} \left(p^{(1)}_{l,\lfloor \frac{i}{L} \rfloor}\right)^2 \left| \sum_{f=0}^{M_v-1} \sum_{d=0}^{N-1} y^{(k)}_{t,u,l} p^{(2)}_{l,i,f,d} \varphi_{l,i,f,d} \right|^2.$$

and the quantities $\varphi_{l,i,f,d}$ and $p_{l,0}^{(1)}$, $p_{l,1}^{(1)}$, $p_{l,i,f,d}^{(2)}$ correspond to $\varphi_{l,i,f}$ and $p_{l,0}^{(1)}$, $p_{l,1}^{(1)}$, $p_{l,i,f}^{(2)}$ respectively, as described in in 5.2.2.2.5 of [REF 8].

In a variation, when $W_1$ is a $P_{CSIRS} \times L$, and is not common for two antenna polarizations, the precoders for v layers are then given by $$W^l_{\ldots,t,u} = \frac{1}{\sqrt{N_1 N_2 \gamma_{t,u,l}}} \left[ \sum_{i=0}^{L-1} v_{m_1^{(i)}, m_2^{(i)}} \sum_{f=0}^{M_v-1} \sum_{d=0}^{N-1} y_{t,u,i}^{(k)} x_{l,i,f,d} \right], l = 1, \ldots, v,$$

$$\gamma_{t,u,l} = \sum_{i=0}^{L-1} \left| \sum_{f=0}^{M_v-1} \sum_{d=0}^{N-1} y_{t,u,i}^{(k)} x_{l,i,f,d} \right|^2,$$

Where $v_{m_1^{(i)}, m_2^{(i)}}$ is a $P_{CSIRS} \times 1$ or $2N_1N_2 \times 1$ FD basis vector.

In one example, the same as examples described above except that the SD basis is replaced with a port selection (PS) basis, i.e., the 2L antenna ports vectors are selected from the $P_{CSIRS}$ CSIRS ports. The rest of the details are the same as in the examples described above.

In one example, whether there is any selection in SD or not depends on the value of L. If $$L = \frac{P_{CSI-RS}}{2},$$

there is no need for any selection in SD (since all ports are selected), and when $$L < \frac{P_{CSI-RS}}{2},$$

the SD ports are selected (hence reported), where this selection is according to at least one example described above.

In one example, the SD basis is analogous to the $W_1$ component in Rel.15/16 Type II port selection codebook (cf. 5.2.2.2.3/5.2.2.2.5, REF 8), wherein the $L_l$ antenna ports or column vectors of $A_l$ are selected by the index $$q_1 \in \left\{ 0, 1, \ldots, \left\lceil \frac{P_{CSI-RS}}{2d} \right\rceil - 1 \right\}$$

(this require $$\left\lceil \log_2 \left\lceil \frac{P_{CSI-RS}}{2d} \right\rceil \right\rceil \text{ bits} \right),$$

where $$d \leq \min\left( \frac{P_{CSI-RS}}{2d}, L_l \right).$$

In one example, $d \in \{1, 2, 3, 4\}$. To select columns of $A_l$, the port selection vectors are used, For instance, $a_i = v_m$, where the quantity $v_m$ is a $P_{CSI-RS}/2$-element column vector containing a value of 1 in element m mod $P_{CSI-RS}/2$ and zeros elsewhere (where the first element is element 0). The port selection matrix is then given by $$W_1 = A_l = \begin{bmatrix} X & 0 \\ 0 & X \end{bmatrix} \text{ where } X = \begin{bmatrix} v_{q_1 d} & v_{q_1 d + 1} & \ldots & v_{q_1 d + L_l - 1} \end{bmatrix}.$$

The SD basis is selected either common (the same) for the two antenna polarizations or independently for each of the two antenna polarizations.

In one example, the SD basis selects $L_l$ antenna ports freely, i.e., the $L_l$ antenna ports per polarization or column vectors of $A_l$ are selected freely by the index $$q_1 \in \left\{ 0, 1, \ldots, \binom{\frac{P_{CSI-RS}}{2}}{L_l} - 1 \right\} \left( \text{this requires } \left\lceil \log_2 \binom{\frac{P_{CSI-RS}}{2}}{L_l} \right\rceil \text{ bits} \right).$$

To select columns of $A_l$, the port selection vectors are used, For instance, $a_i = v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = \begin{bmatrix} v_{x_0} & v_{x_1} & \ldots & v_{x_{L_1-1}} \end{bmatrix}.$$

The SD basis is selected either common (the same) for the two antenna polarizations or independently for each of the two antenna polarizations.

In one example, the SD basis selects $L_l$ antenna ports freely from $P_{CSI-RS}$ ports, i.e., the $L_l$ antenna ports or column vectors of $A_l$ are selected freely by the index $$q_1 \in \left\{ 0, 1, \ldots, \binom{P_{CSI-RS}}{L_l} - 1 \right\}$$

(this requires $$\left\lceil \log_2 \binom{P_{CSI-RS}}{L_l} \right\rceil \text{ bits}).$$

To select columns of $A_l$, the port selection vectors are used, For instance, $a_i = v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = \begin{bmatrix} v_{x_0} & v_{x_1} & \ldots & v_{x_{L_l-1}} \end{bmatrix}.$$

In one example, the SD basis selects $2L_l$ antenna ports freely from $P_{CSI-RS}$ ports, i.e., the $2L_l$ antenna ports or column vectors of $A_l$ are selected freely by the index $$q_1 \in \left\{ 0, 1, \ldots, \binom{P_{CSI-RS}}{2L_l} - 1 \right\}$$

(this requires $$\left\lceil \log_2 \binom{P_{CSI-RS}}{L_l} \right\rceil \text{ bits}).$$

To select columns of $A_l$, the port selection vectors are used, For instance, $a_i=v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots x_{2L_l-1}\}$ be indices of selection vectors selected by the index $q_1$. The port selection matrix is then given by $$W_1 = A_l = \begin{bmatrix} X & 0 \\ 0 & X \end{bmatrix} \text{ where } X = \begin{bmatrix} v_{x_0} & v_{x_1} & \ldots & v_{x_{2L_l-1}} \end{bmatrix}.$$

In one embodiment, which is an extension of an embodiment described above, wherein the UE is configured to report a CSI determined based on a codebook comprising components: (A) two separate basis matrices $W_1$, $W_f$ for SD, FD compression, (B) for each (SD, FD) basis vector pairs with indices (i, f), an independent/separate TD/DD basis matrix $W_d^{(i,f)}$ for DD or TD compression, and (C) coefficients $\tilde{W}_2$. In articular, the recoder for layer l is given by $$W_l \begin{bmatrix} \sum_{i=0}^{L-1} v_{m_1^{(i)}, m_2^{(i)}} \sum_{f=0}^{M_U-1} \sum_{d=0}^{N-1} c_{l,i,f,d} (g_{f,l} \otimes h_{d,l}^{(i,f)})^H \\ \sum_{i=0}^{L-1} v_{m_1^{(i)}, m_2^{(i)}} \sum_{f=0}^{M_U-1} \sum_{d=0}^{N-1} c_{l,i+L,f,d} (g_{f,l} \otimes h_{d,l}^{(i,f)})^H \end{bmatrix}$$

Where $g_{f,l} \otimes h_{d,l}^{(i)}$ is Kronecker product (KP) of FD and TD/DD basis vectors $g_{f,l}$ and $h_{d,l}^{(i,f)}$. Here, the set of TD/DD basis vectors $\{h_{d,l}^{(i,f)}\}$ for each (SD, FD) basis vector pairs $(v_{m_1^{(i)} m_2^{(i)}}, g_{f,l})$ is polarization-common, i.e., the same/common set of TD/DD basis vectors are determined/reported for the two antenna polarizations, a first polarization and second polarization. In one example, the first polarization comprises a first group CSI-RS antenna ports $$\left\{ x, x+1, \ldots x + \frac{P_{CSIRS}}{2} - 1 \right\},$$

and the second polarization comprises a second group CSI-RS antenna ports $$\left\{ x + \frac{P_{CSIRS}}{2}, x + \frac{P_{CSIRS}}{2} + 1, \ldots x + P_{CSIRS} - 1 \right\}$$

and x is the index of the first CSI-RS antenna port. So, the number of sets of TD/DD basis vectors is $LM_v$ (when the sets are the same for all layers) or $LM_v v$ (when the sets can be different for v layers).

The N DD/TD basis vectors, $h_{d,l}^{(i,f)} = [\phi_{0,l}^{(i,f,d)} \phi_{1,l}^{(i,f,d)} \ldots \phi_{N_4-1,l}^{(i,f,d)}]$, $d=0, 1, \ldots, N-1$, are identified by $n_{4,l}$ (l=1, \ldots, v) where $$n_{4,l} = \{n_{4,l}^{(i,f)} : i=0, \ldots, L-1, f=0, \ldots, M_v-1\}$$

$$n_{4,l}^{(i,f)} = [n_{4,l}^{(0)}, \ldots, n_{4,l}^{(N-1)}]$$

$$n_{4,l}^{(d)} \in \{0, 1, \ldots, N_4-1\}$$

The vector $\phi_{u,l}^{(i,f)} = [\phi_{u,l}^{(i,f,0)} \phi_{u,l}^{(i,f,1)} \ldots \phi_{u,l}^{(i,f,N-1)}]$ comprises entries of DD/TD basis vectors with DD/TD index $u=\{0, 1, \ldots, N_4-1\}$, which is an (DD/TD) index associated with the precoding matrix. The rest of the details can be the same as embodiment I.1. In particular, the precoders for v layers are then given by $$W_{\ldots,t,u}^l = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_U-1} \sum_{d=0}^{N-1} y_{t,l} \phi_{u,l}^{(i,f,d)} x_{l,i,f,d} \\ \sum_{i=0}^{L-1} v_{m_1^{(i)}, m_2^{(i)}} \sum_{f=0}^{M_U-1} \sum_{d=0}^{N-1} y_{t,l} \phi_{u,l}^{(i,f,d)} x_{l,i+L,f,d} \end{bmatrix},$$

$l = 1, \ldots, v,$ $$\gamma_{t,u,l} = \sum_{i=0}^{L-1} \left| \sum_{f=0}^{M_U-1} \sum_{d=0}^{N-1} y_{t,l}^{(f)} \phi_{u,l}^{(i,f,d)} x_{l,i,f,d} \right|^2 + \sum_{i=0}^{L-1} \left| \sum_{f=0}^{M_U-1} \sum_{d=0}^{N-1} y_{t,l}^{(f)} \phi_{u,l}^{(i,f,d)} x_{l,i+L,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where $k \in \{0, 1, \ldots, M_v N\}$ is a column index of $\tilde{W}_2$. Here, $k = M_v d + f$.

In one example, d=k mod N and $$f = \frac{k-d}{N}.$$

Here, k=Nf+d.

In one example, $$x_{l,i,f,d} = p_{l,\lfloor \frac{i}{L} \rfloor}^{(1)} p_{l,i,f,d}^{(2)} \varphi_{l,i,f,d}$$

similar to Rel. 16 enhanced Type II codebook (cf. Section 5.2.2.2.5, REF 8).

In one embodiment, which is an extension of an embodiment described above, wherein the UE is configured to report a CSI determined based on a codebook comprising components: (A) two separate basis matrices $W_1$, $W_f$ for SD, FD compression, (B) for each (SD, FD) basis vector pairs with indices (i, f), an independent/separate TD/DD basis matrix $W_d^{(i,f)}$ for DD or TD compression, and (C) coefficients $\tilde{W}_2$. In particular, the precoder for layer l is given by $$W_l = \begin{bmatrix} \sum_{i=0}^{L-1} v_{m_1^{(i)}, m_2^{(i)}} \sum_{f=0}^{M_U-1} \sum_{d=0}^{N-1} c_{l,i,f,d} (g_{f,l} \otimes h_{d,l}^{(i,f)})^H \\ \sum_{i=0}^{L-1} v_{m_1^{(i)}, m_2^{(i)}} \sum_{f=0}^{M_U-1} \sum_{d=0}^{N-1} c_{l,i+L,f,d} (g_{f,l} \otimes h_{d,l}^{(i+L,f)})^H \end{bmatrix}$$

where $g_{f,l} \otimes h_{d,l}^{(i)}$ is Kronecker product (KP) of FD and TD/DD basis vectors $g_{f,l}$ and $h_{d,l}^{(i,f)}$. Here, the set of TD/DD basis vectors $\{h_{d,l}^{(i,f)}\}$ for each (SD, FD) basis vector pairs $(v_{m_1^{(i)} m_2^{(i)}}, g_{f,l})$ is polarization-specific or polarization-independent, i.e., the set of TD/DD basis vectors are determined/ reported for each polarizations. So, the number of sets of TD/DD basis vectors is 2LM (when the sets are the same for all layers) or $2LM_v v$ (when the sets can be different for $v$ layers).

The N DD/TD basis vectors, $h_{d,l}^{(i,f)} = [\phi_{0,l}^{(i,f,d)} \phi_{1,l}^{(i,f,d)} \ldots \phi_{N_4-1,l}^{(i,f,d)}]$, d=0, 1, ..., N–1, are identified by $n_{4,l}$ (l=1, ..., $v$) where $$n_{4,l} = \{n_{4,l}^{(i,f)} : i=0, \ldots, 2L-1, f=0, \ldots, M_v-1\}$$

$$n_{4,l}^{(i,f)} = [n_{4,l}^{(0)}, \ldots, n_{4,l}^{(N-1)}]$$

$$n_{4,l}^{(d)} \in \{0, 1, \ldots, N_4-1\}$$

The vector $\phi_{u,l}^{(i,f)} = [\phi_{u,l}^{(i,f,0)} \phi_{u,l}^{(i,f,1)} \ldots \phi_{u,l}^{(i,f,N-1)}]$ comprises entries of DD/TD basis vectors with DD/TD index u={0, 1, ..., $N_4$–1}, which is an (DD/TD) index associated with the precoding matrix. The rest of the details can be the same as embodiment I.1. In particular, the precoders for $v$ layers are then given by $$W^l_{\ldots,t,u} = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_v-1} \sum_{d=0}^{N-1} y_{t,l}^{(f)} \phi_{u,l}^{(i,f,d)} x_{l,i,f,d} \\ \sum_{i=0}^{L-1} v_{m_1^{(i)}, m_2^{(i)}} \sum_{f=0}^{M_v-1} \sum_{d=0}^{N-1} y_{t,l}^{(f)} \phi_{u,l}^{(i,f,d)} x_{l,i+L,f,d} \end{bmatrix},$$

$l = 1, \ldots, v,$ $$\gamma_{t,u,l} = \sum_{i=0}^{2L-1} \left| \sum_{f=0}^{M_v-1} \sum_{d=0}^{N-1} y_{t,l}^{(f)} \phi_{u,l}^{(i,f,d)} x_{l,i,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where k $\in$ {0, 1, ..., $M_v N$} is a column index of $\tilde{W}_2$. Here, k=$M_v$d+f.

In one example, d=k mod N and $$f = \frac{k-d}{N}.$$

Here, k=Nf+d.

In one example, $$x_{l,i,f,d} = p_{l,\lfloor \frac{i}{L} \rfloor}^{(1)} p_{l,i,f,d}^{(2)} \varphi_{l,i,f,d}$$

similar to Rel. 16 enhanced Type II codebook (cf. Section 5.2.2.2.5, REF 8).

In one embodiment, which is an extension of an embodiment described above, wherein the UE is configured to report a CSI determined based on a codebook comprising components: (A) two separate basis matrices $W_1$, $W_f$, for SD, FD compression, (B) for each SD basis vector with index i, an independent/separate TD/DD basis matrix $W_d^{(i)}$ for DD or TD compression, and (C) coefficients $\tilde{W}_2$. In particular, the precoder for layer l is given by $$W_l = \begin{bmatrix} \sum_{i=0}^{L-1} v_{m_1^{(i)}, m_2^{(i)}} \sum_{f=0}^{M_U-1} \sum_{d=0}^{N-1} c_{l,i,f,d} (g_{f,l} \otimes h_{d,l}^{(i)})^H \\ \sum_{i=0}^{L-1} v_{m_1^{(i)}, m_2^{(i)}} \sum_{f=0}^{M_U-1} \sum_{d=0}^{N-1} c_{l,i+L,f,d} (g_{f,l} \otimes h_{d,l}^{(i)})^H \end{bmatrix}$$

Where $g_{f,l} \otimes h_{d,l}^{(i)}$ is Kronecker product (KP) of FD and TD/DD basis vectors $g_{f,l}$ and $h_{d,l}^{(i)}$. Here, the set of TD/DD basis vectors $\{h_{d,l}^{(i)}\}$ for each SD basis vector $v_{m_1^{(i)}, m_2^{(i)}}$ is polarization-common, i.e., the same/common set of TD/DD basis vectors are determined/reported for the two antenna polarizations, a first polarization and second polarization. In one example, the first polarization comprises a first group CSI-RS antenna ports $$\left\{ x, x+1, \ldots x + \frac{P_{CSIRS}}{2} - 1 \right\},$$

and the second polarization comprises a second group CSI-RS antenna ports $$\left\{ x + \frac{P_{CSIRS}}{2}, x + \frac{P_{CSIRS}}{2} + 1, \ldots x + P_{CSIRS} - 1 \right\}$$

and x is the index of the first CSI-RS antenna port. So, the number of sets of TD/DD basis vectors is L (when the sets are the same for all layers) or $Lv$ (when the sets can be different for $v$ layers).

The N DD/TD basis vectors, $h_{d,l}^{(i)} = [\phi_{0,l}^{(i,d)} \phi_{1,l}^{(i,d)} \ldots \phi_{N_4-1,l}^{(i,d)}]$, d=0, 1, ..., N–1, are identified by $n_{4,l}$ (l=1, ..., $v$) where $$n_{4,l} = \{n_{4,l}^{(i)} : i=0, \ldots, L-1\}$$

$$n_{4,l}^{(i)} = [n_{4,l}^{(0)}, \ldots, n_{4,l}^{(N-1)}]$$

$$n_{4,l}^{(d)} \in \{0, 1, \ldots, N_4-1\}$$

The vector $\phi_{u,l}^{(i)} = [\phi_{u,l}^{(i,0)} \phi_{u,l}^{(i,1)} \ldots \phi_{u,l}^{(i,N-1)}]$ comprises entries of DD/TD basis vectors with DD/TD index u={0, 1, ..., $N_4$–1}, which is an (DD/TD) index associated with the precoding matrix. The rest of the details can be the same as embodiment I.1. In particular, the precoders for $v$ layers are then given by $$W^l_{\ldots,t,u} = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_U-1} \sum_{d=0}^{N-1} x_{t,l}^{(f)} \phi_{u,l}^{(i,d)} x_{l,i,f,d} \\ \sum_{i=0}^{L-1} v_{m_1^{(i)}, m_2^{(i)}} \sum_{f=0}^{M_U-1} \sum_{d=0}^{N-1} y_{t,l}^{(f)} \phi_{u,l}^{(i,d)} x_{l,i,f,d} \end{bmatrix}, l = 1, \ldots, v,$$

$$\gamma_{t,u,l} = \sum_{i=0}^{L-1} \left| \sum_{f=0}^{M_U-1} \sum_{d=0}^{N-1} y_{t,l}^{(f)} \phi_{u,l}^{(i,d)} x_{l,i,f,d} \right|^2 + \sum_{i=0}^{L-1} \left| \sum_{f=0}^{M_U-1} \sum_{d=0}^{N-1} y_{t,l}^{(f)} \phi_{u,l}^{(i,d)} x_{l,i+L,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where $k \in \{0, 1, \ldots, M_vN\}$ is a column index of $\tilde{W}_2$. Here, $k=M_vd+f$.

In one example, $d=k \mod N$ and $$f = \frac{k-d}{N}.$$

Here, $k=Nf+d$.

In one example, $$x_{l,i,f,d} = p^{(1)}_{l,\lfloor \frac{i}{L} \rfloor} p^{(2)}_{l,i,f,d} \varphi_{l,i,f,d}$$

similar to Rel. 16 enhanced Type II codebook (cf. Section 5.2.2.2.5, REF 8).

In one embodiment, which is an extension of an embodiment described above, wherein the UE is configured to report a CSI determined based on a codebook comprising components: (A) two separate basis matrices $W_1$, $W_f$, for SD, FD compression, (B) for each SD basis vector with index i, an independent/separate TD/DD basis matrix $W_d^{(i)}$ for DD or TD compression, and (C) coefficients $\tilde{W}_2$. In particular, the precoder for layer l is given by $$W_l = \begin{bmatrix} \sum_{i=0}^{L-1} v^{(i)}_{m_1^{(i)}, m_2^{(i)}} \sum_{f=0}^{M_v-1} \sum_{d=0}^{N-1} c_{l,i,f,d} \left( g_{f,l} \otimes h_{d,l}^{(i)} \right)^H \\ \sum_{i=0}^{L-1} v^{(i)}_{m_1^{(i)}, m_2^{(i)}} \sum_{f=0}^{M_v-1} \sum_{d=0}^{N-1} c_{l,i+L,f,d} \left( g_{f,l} \otimes h_{d,l}^{(i)} \right)^H \end{bmatrix}$$

where $g_{f,l} \otimes h_{d,l}^{(i)}$ is Kronecker product (KP) of FD and TD/DD basis vectors $g_{f,l}$ and $h_{d,l}^{(i)}$. Here, the set of TD/DD basis vectors $\{h_{d,l}^{(i)}\}$ for each SD basis vector $v^{(i)}_{m_1^{(i)} m_2^{(i)}}$ is polarization-specific or polarization-independent, i.e., the set of TD/DD basis vectors are determined/reported for each polarizations. So, the number of sets of TD/DD basis vectors is 2L (when the sets are the same for all layers) or 2Lv (when the sets can be different for v layers).

The N DD/TD basis vectors, $h_{d,l}^{(i)} = [\phi_{0,l}^{(i,d)} \phi_{1,l}^{(i,d)} \ldots \phi_{N_4-1,l}^{(i,d)}]$, $d=0, 1, \ldots, N-1$, are identified by $n_{4,l}$ ($l=1, \ldots, v$) where $n_{4,l} = \{n_{4,l}^{(i)} : i=0, \ldots, L-1\}$ $n_{4,l}^{(i)} = [n_{4,l}^{(0)}, \ldots, n_{4,l}^{(N-1)}]$ $n_{4,l}^{(d)} \in \{0,1, \ldots, N_4-1\}$ The vector $\phi_{u,l}^{(i)} = [\phi_{u,l}^{(i,0)} \phi_{u,l}^{(i,1)} \ldots \phi_{u,l}^{(i,N-1)}]$ comprises entries of DD/TD basis vectors with DD/TD index $u=\{0, 1, \ldots, N_4-1\}$, which is an (DD/TD) index associated with the precoding matrix. The rest of the details can be the same as embodiment I.1. In particular, the precoders for v layers are then given by $$W^l_{\ldots,t,u} = \frac{1}{\sqrt{N_1 N_2 \gamma_{t,u,l}}} \begin{bmatrix} \sum_{i=0}^{L-1} v^{(i)}_{m_1^{(i)}, m_2^{(i)}} \sum_{f=0}^{M_v-1} \sum_{d=0}^{N-1} y^{(f)}_{t,l} \phi_{u,l}^{(i,d)} x_{l,i,f,d} \\ \sum_{i=0}^{L-1} v^{(i)}_{m_1^{(i)}, m_2^{(i)}} \sum_{f=0}^{M_v-1} \sum_{d=0}^{N-1} y^{(f)}_{t,l} \phi_{u,l}^{(i+L,d)} x_{l,i,f,d} \end{bmatrix}, l=1, \ldots, v,$$

$$\gamma_{t,u,l} = \sum_{i=0}^{2L-1} \left| \sum_{f=0}^{M_v-1} \sum_{d=0}^{N-1} y^{(f)}_{t,l} \phi_{u,l}^{(i,d)} x_{l,i,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, $f=k \mod M_v$ and $$d = \frac{k-f}{M_v},$$

where $k \in \{0, 1, \ldots, M_vN\}$ is a column index of $\tilde{W}_2$. Here, $k=M_vd+f$.

In one example, $d=k \mod N$ and $$f = \frac{k-d}{N}.$$

Here, $k=Nf+d$.

In one example, $$x_{l,i,f,d} = p^{(1)}_{l,\lfloor \frac{i}{L} \rfloor} p^{(2)}_{l,i,f,d} \varphi_{l,i,f,d}$$

similar to Rel. 16 enhanced Type II codebook (cf. Section 5.2.2.2.5, REF 8).

In one embodiment, which is an extension of an embodiment described above, wherein the UE is configured to report a CSI determined based on a codebook comprising components: (A) one SD basis matrix $W_1$ for SD compression, (B) for each SD basis vector with index i, an independent/separate $W_f$ for FD compression and an independent/separate TD/DD basis matrix $W_d^{(i)}$ for DD or TD compression, and (C) coefficients $\tilde{W}_2$. In particular, the precoder for layer l is given by $$W_l = \begin{bmatrix} \sum_{i=0}^{L-1} v^{(i)}_{m_1^{(i)}, m_2^{(i)}} \sum_{f=0}^{M_v-1} \sum_{d=0}^{N-1} c_{l,i,f,d} \left( g_{f,l}^{(i)} \otimes h_{d,l}^{(i)} \right)^H \\ \sum_{i=0}^{L-1} v^{(i)}_{m_1^{(i)}, m_2^{(i)}} \sum_{f=0}^{M_v-1} \sum_{d=0}^{N-1} c_{l,i+L,f,d} \left( g_{f,l}^{(i)} \otimes h_{d,l}^{(i)} \right)^H \end{bmatrix}$$

Where $g_{f,l}^{(i)} \otimes h_{d,l}^{(i)}$ is Kronecker product (KP) of FD and TD/DD basis vectors $g_{f,l}^{(i)}$ and $h_{d,l}^{(i)}$. Here, the set of FD basis vectors $\{g_{f,l}^{(i)}\}$ and TD/DD basis vectors $\{h_{d,l}^{(i)}\}$ for each SD basis vector $v^{(i)}_{m_1^{(i)} m_2^{(i)}}$ is polarization-common, i.e., the same/common set of FD basis vectors and TD/DD basis vectors are determined/reported for the two antenna polarizations, a first polarization and second polarization. In one example, the first polarization comprises a first group CSI-RS antenna ports $$\left\{ x, x+1, \ldots x + \frac{P_{CSIRS}}{2} - 1 \right\},$$

and the second polarization comprises a second group CSI-RS antenna ports $$\left\{ x + \frac{P_{CSIRS}}{2}, x + \frac{P_{CSIRS}}{2} + 1, \ldots x + P_{CSIRS} - 1 \right\}$$

and x is the index of the first CSI-RS antenna port. So, the number of sets of FD basis vectors is L (when the sets are the same for all layers) or Lv (when the sets can be different for v layers). Likewise, the number of sets of TD/DD basis vectors is L (when the sets are the same for all layers) or Lv (when the sets can be different for v layers).

The N DD/TD basis vectors, $h_{d,l}^{(i)} = [\phi_{0,l}^{(i,d)} \phi_{1,l}^{(i,d)} \ldots \phi_{N_4-1,l}^{(i,d)}]$, d=0, 1, ..., N−1, are identified by $n_{4,l}$ (l=1, ..., v) where $$n_{4,l} = \{n_{4,l}^{(i)} : i=0, \ldots, L-1\}$$

$$n_{4,l}^{(i)} = [n_{4,l}^{(0)}, \ldots, n_{4,l}^{(N-1)}]$$

$$n_{4,l}^{(d)} \in \{0,1, \ldots, N_4-1\}$$

The vector $\phi_{u,l}^{(i)} = [\phi_{u,l}^{(i,0)} \phi_{u,l}^{(i,1)} \ldots \phi_{u,l}^{(i,N-1)}]$ comprises entries of DD/TD basis vectors with DD/TD index u={0, 1, ..., $N_4$−1}, which is an (DD/TD) index associated with the precoding matrix. The rest of the details can be the same as embodiment I.1. In particular, the precoders for v layers are then given by $$W^l_{\ldots,t,u} = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_v-1} \sum_{d=0}^{N-1} y_{t,l}^{(i,f)} \phi_{u,l}^{(i,d)} x_{l,i,f,d} \\ \sum_{i=0}^{L-1} v_{m_1^{(i)}, m_2^{(i)}} \sum_{f=0}^{M_v-1} \sum_{d=0}^{N-1} y_{t,l}^{(i,f)} \phi_{u,l}^{(i,d)} x_{l,i+L,f,d} \end{bmatrix},$$

$$l = 1, \ldots, v, \gamma_{t,u,l} = \sum_{i=0}^{L-1} \left| \sum_{f=0}^{M_v-1} \sum_{d=0}^{N-1} y_{t,l}^{(i,f)} \phi_{u,l}^{(i,d)} x_{l,i,f,d} \right|^2 + \sum_{i=0}^{L-1} \left| \sum_{f=0}^{M_v-1} \sum_{d=0}^{N-1} y_{t,l}^{(i,f)} \phi_{u,l}^{(i,d)} x_{l,i,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where k ∈ {0, 1, ..., $M_v N$} is a column index of $\tilde{W}_2$. Here, k=$M_v$d+f.

In one example, d=k mod N and $$f = \frac{k-d}{N}.$$

Here, k=Nf+d.

In one example, $$x_{l,i,f,d} = p^{(1)}_{l,\lfloor \frac{i}{L} \rfloor} p^{(2)}_{l,i,f,d} \varphi_{l,i,f,d}$$

similar to Rel. 16 enhanced Type II codebook (cf. Section 5.2.2.2.5, REF 8).

In one embodiment, which is an extension of an embodiment described above, wherein the UE is configured to report a CSI determined based on a codebook comprising components: (A) one SD basis matrix $W_1$ for SD compression, (B) for each SD basis vector with index i, an independent/separate $W_f$ for FD compression and an independent/separate TD/DD basis matrix $W_d^{(i)}$ for DD or TD compression, and (C) coefficients $\tilde{W}_2$. In particular, the precoder for layer 1 is given by $$W_l \begin{bmatrix} \sum_{i=0}^{L-1} v_{m_1^{(i)}, m_2^{(i)}} \sum_{f=0}^{M_v-1} \sum_{d=0}^{N-1} c_{l,i,f,d} (g_{f,l}^{(i)} \otimes h_{d,l}^{(i)})^H \\ \sum_{i=0}^{L-1} v_{m_1^{(i)}, m_2^{(i)}} \sum_{f=0}^{M_v-1} \sum_{d=0}^{N-1} c_{l,i+L,f,d} (g_{f,l}^{(i+L)} \otimes h_{d,l}^{(i+L)})^H \end{bmatrix}$$

Where $g_{f,l}^{(i)} \otimes h_{d,l}^{(i)}$ is Kronecker product (KP) of FD and TD/DD basis vectors $g_{f,l}^{(i)}$ and $h_{d,l}^{(i)}$. Here, the set of FD basis vectors $\{g_{f,l}^{(i)}\}$ and TD/DD basis vectors $\{h_{d,l}^{(i)}\}$ for each SD basis vector $v_{m_1^{(i)}, m_2^{(i)}}$ is polarization-specific or polarization-independent, i.e., the set of TD/DD basis vectors are determined/reported for each polarizations. So, the number of sets of FD basis vectors is 2L (when the sets are the same for all layers) or 2Lv (when the sets can be different for v layers). Likewise, the number of sets of TD/DD basis vectors is 2L (when the sets are the same for all layers) or 2Lv (when the sets can be different for v layers).

The N DD/TD basis vectors, $h_{d,l}^{(i)} = [\phi_{0,l}^{(i,d)} \phi_{1,l}^{(i,d)} \ldots \phi_{N_4-1,l}^{(i,d)}]$, d=0, 1, ..., N−1, are identified by $n_{4,l}$ (l=1, ..., v) where $$n_{4,l} = \{n_{4,l}^{(i)} : i=0, \ldots, L-1\}$$

$$n_{4,l}^{(i)} = [n_{4,l}^{(0)}, \ldots, n_{4,l}^{(N-1)}]$$

$$n_{4,l}^{(d)} \in \{0,1, \ldots, N_4-1\}$$

The vector $\phi_{u,l}^{(i)} = [\phi_{u,l}^{(i,0)} \phi_{u,l}^{(i,1)} \ldots \phi_{u,l}^{(i,N-1)}]$ comprises entries of DD/TD basis vectors with DD/TD index u={0, 1, ..., $N_4$−1}, which is an (DD/TD) index associated with the precoding matrix. The rest of the details can be the same as embodiment I.1. In particular, the precoders for v layers are then given by $$W^l_{\ldots,t,u} = \frac{1}{\sqrt{N_1 N_2 \gamma_{t,u,l}}} \begin{bmatrix} \sum_{i=0}^{L-1} v_{m_1^{(i)}, m_2^{(i)}} \sum_{f=0}^{M_v-1} \sum_{d=0}^{N-1} y_{t,l}^{(i,f)} \phi_{u,l}^{(i,d)} x_{l,i,f,d} \\ \sum_{i=0}^{L-1} v_{m_1^{(i)}, m_2^{(i)}} \sum_{f=0}^{M_v-1} \sum_{d=0}^{N-1} y_{t,l}^{(i+L,f)} \phi_{u,l}^{(i+L,d)} x_{l,i,f,d} \end{bmatrix},$$

$$l = 1, \ldots, v, \gamma_{t,u,l} = \sum_{i=0}^{2L-1} \left| \sum_{f=0}^{M_v-1} \sum_{d=0}^{N-1} y_{t,l}^{(i,f)} \phi_{u,l}^{(i,d)} x_{l,i,f,d} \right|^2,$$

where $x_{l,i,f,d}$ is the coefficient (an element of $\tilde{W}_2$) associated with codebook indices (l, i, f, d), where i is a row index of $\tilde{W}_2$ and (f, d) determine the column index k of $\tilde{W}_2$.

In one example, f=k mod $M_v$ and $$d = \frac{k-f}{M_v},$$

where k ∈ {0, 1, ..., $M_v N$} is a column index of $\tilde{W}_2$. Here, k=$M_v$d+f.

In one example, d=k mod N and $$f = \frac{k-d}{N}.$$

Here, k=Nf+d.

In one example, $$x_{l,i,f,d} = p_{l,\lfloor \frac{i}{L} \rfloor}^{(1)} p_{l,i,f,d}^{(2)} \varphi_{l,i,f,d}$$

similar to Rel. 16 enhanced Type II codebook (cf. Section 5.2.2.2.5, REF 8).

In one embodiment, the same as one or more embodiments described above except that the SD basis vectors $v_{m_1^{(i)}, m_2^{(i)}}$ are replaced with port selection (PS) vectors $v_{m^{(i)}}$, i.e., the 2L antenna ports vectors are selected from the $P_{CSIRS}$ CSIRS ports, e.g., as in Rel. 16 or 17 Type II port selection codebooks [cf. 5.2.2.2.6 and 5.2.2.2.7 of REF 8]. The rest of the details are the same as in embodiment I.1A through I.1D. The details of the port selection vectors are according to at least one of the examples described above.

In one embodiment, the UE is configured to report a CSI determined based on a codebook comprising components: (A) two basis matrices, basis $W_1$ for SD, and a joint basis $W_{joint}$ for joint FD and DD/TD compression, and (B) coefficients $\tilde{W}_2$. In particular, the precoder for layer l is given by $$W_l = A_l C_l B_l^H = W_1 \tilde{W}_2 W_{joint}^H$$

Here $W_l$ is a $P_{CSIRS} \times N_3 N_4$ matrix whose columns are precoding vectors for a total of $N_3 N_4$ units, $N_3$ FD units and $N_4$ DD/TD units, $W_1$ is a $P_{CSIRS} \times 2L$ or $P_{CSIRS} \times L$ SD basis matrix (similar to Rel. 16 enhanced Type II codebook), $\tilde{W}_2$ is a $2L \times M_v$ coefficients matrix, and $W_{joint}$ is a $N_3 N_4 \times M_v$ basis matrix comprising $M_v$ joint (FD, DD/TD) basis vectors. The k-th column of $W_{joint}$ is a vector $v_{k,l}$ that is a KP of two vectors $g_{k,l}$ and $h_{k,l}$, where $(g_{k,l}, h_{k,l})$ is the k-th joint (FD, DD/TD) basis vectors, and k=0, 1, ..., $M_v$−1.

In one example, $v_{k,l} = [g_{k,l} \phi_{0,l}^{(k)} \; g_{k,l} \phi_{1,l}^{(k)} \; \ldots \; g_{k,l} \phi_{N_4-1,l}^{(k)}]^T$, the KP of $g_{k,l}$ and $h_{k,l}$.

In one example $v_{k,l} = [h_{k,l} y_{0,l}^{(k)} \; h_{k,l} y_{0,l}^{(k)} \; \ldots \; h_{k,l} y_{N_3-1,l}^{(k)}]^T$, the KP of $g_{k,l}$ and $h_{k,l}$. Here, $g_{k,l} = [y_{0,l}^{(k)} \; y_{1,l}^{(k)} \; \ldots \; y_{N_3-1,l}^{(k)}]$ and $h_{k,l} = [\phi_{0,l}^{(k)} \; \phi_{1,l}^{(k)} \; \ldots \; \phi_{N_4-1,l}^{(k)}]$.

At least one of the following examples is used/configured regarding the reporting of the two bases.

In one example, both bases are reported by the UE, e.g., via a component or more than one component of the PMI.

In one example, one of the two bases is reported, and the other basis is either fixed, or configured (e.g., via RRC, MAC CE, or DCI).

In one example, the reported basis corresponds to the SD basis, and the other basis corresponds to the joint (FD, DD/TD) basis.

In one example, the reported basis corresponds to the joint (FD, DD/TD) basis, and the other basis corresponds to the SD basis.

At least one of the following examples is used/configured regarding the three basis matrices.

In one example, the SD basis $W_1$ is as described in one or more examples described above. The $M_v$ joint (FD, DD/TD) basis vectors $v_{k,l} = [y_{0,l}^{(k)} \; y_{1,l}^{(k)} \; \ldots \; y_{N_3 N_4-1,l}^{(k)}]$, k=0, 1, ..., $M_v$−1, are determined based on the $M_v$ (FD, DD/TD) basis vector pairs, $(g_{f,l}(k), h_{d,l}(k))$, and are identified by $n_{joint,l}$ (l=1, ..., v) where $$n_{joint,l} = [n_{joint,l}^{(0)}, \ldots, n_{joint,l}^{(M_v-1)}]$$

$$n_{joint,l}^{(k)} \in \{0, 1, \ldots, N_3 N_4 - 1\}$$

In one example, the $M_v$ joint (FD, DD/TD) vectors are reported jointly, similar to L basis reporting for $W_1$ (cf. Section 5.2.2.2.3, REF 8). For instance, the $M_v$ vectors can be identified by the indices $i_{joint,1}$ and $i_{joint,2}$, where $$i_{joint,1} = [q_3 q_4]$$

$$q_3 \in \{0, 1, \ldots, O_3 - 1\}$$

$$q_4 \in \{0, 1, \ldots, O_4 - 1\}$$

$$i_{joint,2} \in \left\{ 0, 1, \ldots, \binom{N_3 N_4}{M_v} - 1 \right\}$$

if all $M_v$ vectors are selected, or, $$i_{joint,2} \in \left\{ 0, 1, \ldots, \binom{N_3 N_4 - 1}{M_v - 1} - 1 \right\}$$

if $M_v$−1 vectors are selected (e.g., $n_{joint,l}^{(k)} \in \{1, \ldots, N_3 N_4 - 1\}$) and one vector is fixed (e.g., $n_{joint,l}^{(k)} = 0$).

Let $n_{joint,l}^{(k)}$ corresponds (maps) to $(n_{3,l}^{(k)}, n_{4,l}^{(k)})$.

$$n_{3,l} = [n_{3,l}^{(0)}, \ldots, n_{3,l}^{(M_v-1)}]$$

$$n_{4,l} = [n_{4,l}^{(0)}, \ldots, n_{4,l}^{(M_v-1)}]$$

$$n_{3,l}^{(k)} \in \{0, 1, \ldots, N_3 - 1\}$$

$$n_{4,l}^{(k)} \in \{0, 1, \ldots, N_4 - 1\}$$

and $$C(x, y) = \begin{cases} \binom{x}{y} & x \geq y \\ 0 & x < y \end{cases}$$

where the values of $C(x, y)$ are given in Table 5.2.2.2.3-1 (REF 8).

Then the elements of $n_{3,l}$ and $n_{4,l}$ are found from $i_{joint,2}$ using the algorithm:

```
s_{-1} = 0
for k = 0, ..., M_v - 1
    Find the largest x* ∈ {M_v - 1 - k, ..., N_3 N_4 - 1 - k} in Table
    5.2.2.2.3-1 (REF 8) such that i_{joint,2} - s_{k-1} ≥ C(x*, M_v - k)
    e_k = C(x*, M_v - k)
    s_k = s_{k-1} + e_k
    n^{(k)} = N_3 N_4 - 1 - x*
    n_3^{(k)} = n^{(k)} mod N_3
    n_4^{(k)} = (n^{(k)} - n_3^{(k)}) / N_3
```

When $n_{3,l}$ and $n_{4,l}$ are known, $i_{joint,2}$ is found using: $n_{joint,l}^{(k)} = N_3 n_4^{(k)} + n_3^{(k)}$ where the indices k=0, 1, ..., $M_v$−1 are assigned such that $n_{joint,l}^{(k)}$ increases as k increases $i_{joint,2} = \Sigma_{k=0}^{M_v-1} C(N_3 N_4 - 1 - n_{joint,l}^{(k)}, M_v - k)$, where C(x, y) is given in Table 5.2.2.2.3-1 (REF 8).

The vector $y_{t,l} = [y_{t,l}^{(0)} \; y_{t,l}^{(1)} \; \ldots \; y_{t,l}^{(M_v-1)}]$ comprises entries of joint (FD, DD/TD) basis vectors with index t={0, 1, ..., $N_3 N_4$−1}, which is a joint (FD, DD/TD) index associated with the precoding matrix.

In one example, the joint (FD, DD/TD) basis vectors are orthogonal DFT vectors, and $v_{t,l}^{(k)} = y_{t,l}^{(k)} \phi_{2,l}^{(k)}$ where $$y_{t_1,l}^{(k)} = e^{j \frac{2\pi t_1 n_{3,l}^{(k)}}{N_3}} \text{ and } \phi_{t_2,l}^{(k)} = e^{j \frac{2\pi t_2 n_{4,l}^{(k)}}{N_4}},$$

($t_1$, $t_2$) is determined based on t and vice versa as:
In one example, $t_1$=t mod $N_3$ and $$t_2 = \frac{t - t_1}{N_3},$$

where $t \in \{0, 1, \ldots, N_3N_4\}$. Here, $t = N_3 t_2 + t_1$.
In one example, $t_2$=t mod $N_4$ and $$t_1 = \frac{t - t_2}{N_4}.$$

Here, $t = N_4 t_1 + t_2$.

In one example, the joint (FD, DD/TD) basis vectors are oversampled (or rotated) orthogonal DFT vectors with the oversampling (rotation) factor $O_3$ and $O_4$, and $$y_{t_1,l}^{(k)} = e^{j\frac{2\pi t_1 n_{3,l}^{(k)}}{O_3 N_3}}$$

and $$\phi_{t_2,l}^{(k)} = e^{j\frac{2\pi t_2 n_{4,l}^{(k)}}{O_4 N_4}},$$

and the $M_v$ joint (FD, DD/TD) basis vectors are also identified by the rotation indices $q_{3,l} \in \{0, 1, \ldots, O_3-1\}$ and $q_{4,l} \in \{0, 1, \ldots, O_4-1\}$. In one example, $O_3$ is fixed (e.g., 4), or configured (e.g., via RRC), or reported by the UE. In one example, $O_4$ is fixed (e.g., 4), or configured (e.g., via RRC), or reported by the UE. In one example, the rotation factor is layer-common (one value for all layers), i.e., $q_{3,l}=q_3$ or $q_{4,l}=q_4$.

The precoders for $v$ layers are then given by $$W_{\ldots,t}^l = \frac{1}{\sqrt{N_1 N_2 \gamma_{t,l}}} \begin{bmatrix} \sum_{i=0}^{L-1} v_{m_1^{(i)}, m_2^{(i)}} \sum_{k=0}^{M_v-1} y_{t,l}^{(f)} x_{l,i,k} \\ \sum_{i=0}^{L-1} v_{m_1^{(i)}, m_2^{(i)}} \sum_{k=0}^{M_v-1} y_{t,l}^{(f)} x_{l,i+L,k} \end{bmatrix}, l = 1, \ldots, v,$$

$$\gamma_{t,l} = \sum_{i=0}^{2L-1} \left| \sum_{k=0}^{M_v-1} y_{t,l}^{(k)} x_{l,i,k} \right|^2,$$

where $x_{l,i,k}$ is the coefficient (an element of $\tilde{W}_2$) associated with codebook indices (l, i, k), where i is a row index of $\tilde{W}_2$ and k is the column index of $\tilde{W}_2$.

In one example, $$x_{l,i,k} = p_{l,\lfloor \frac{i}{L} \rfloor}^{(1)} p_{l,i,k}^{(2)} \varphi_{l,i,k}$$

similar to Rel. 16 enhanced Type II codebook (cf. Section 5.2.2.2.5, REF 8). Then, $$W_{\ldots,t}^l = \frac{1}{\sqrt{N_1 N_2 \gamma_{t,l}}} \begin{bmatrix} \sum_{i=0}^{L-1} v_{m_1^{(i)}, m_2^{(i)}} p_{l,0}^{(1)} \sum_{k=0}^{M_v-1} y_{t,l}^{(k)} p_{l,i,k}^{(2)} \varphi_{l,i,k} \\ \sum_{i=0}^{L-1} v_{m_1^{(i)}, m_2^{(i)}} p_{l,1}^{(1)} \sum_{k=0}^{M_v-1} y_{t,l}^{(f)} p_{l,i+L,k}^{(2)} \varphi_{l,i+L,k} \end{bmatrix}, l = 1, \ldots, v,$$

$$\gamma_{t,l} = \sum_{i=0}^{2L-1} \left( p_{l,\lfloor \frac{i}{L} \rfloor}^{(1)} \right)^2 \left| \sum_{k=0}^{M_v-1} y_{t,l}^{(k)} p_{l,i,k}^{(2)} \varphi_{l,i,k} \right|^2,$$

and the quantities $\varphi_{l,i,k}$ and $p_{l,0}^{(1)}$, $p_{l,1}^{(1)}$, $p_{l,i,k}^{(2)}$ correspond to $\varphi_{l,i,f}$ and $p_{l,0}^{(1)}$, $p_{l,1}^{(1)}$, $p_{l,i,f}^{(2)}$, respectively, as described in 5.2.2.2.5 of [REF 8].

In a variation, when $W_1$ is a $P_{CSIRS} \times L$, and is not common for two antenna polarizations, the precoders for $v$ layers are then given by $$W_{\ldots,t}^l = \frac{1}{\sqrt{N_1 N_2 \gamma_{t,l}}} \left[ \sum_{i=0}^{L-1} v_{m_1^{(i)}, m_2^{(i)}} \sum_{k=0}^{M_v-1} y_{t,l}^{(k)} x_{l,i,k} \right], l = 1, \ldots, v,$$

$$\gamma_{t,l} = \sum_{i=0}^{L-1} \left| \sum_{k=0}^{M_v-1} y_{t,l}^{(k)} x_{l,i,k} \right|^2,$$

Where $v_{m_1^{(i)}, m_2^{(i)}}$ is a $P_{CSIRS} \times 1$ or $2N_1 N_2 \times 1$ FD basis vector.

In one example, the same as one or more examples described above except that the SD basis is replaced with a port selection (PS) basis, i.e., the 2L antenna ports vectors are selected from the $P_{CSIRS}$ CSIRS ports. The rest of the details about the PS are the same as in one or more examples described above.

In one embodiment, the UE is configured to report a CSI determined based on a codebook comprising components: (A) two basis matrices, basis $W_1$ for SD, and a joint basis $W_{joint}$ for joint FD and DD/TD compression, and (B) coefficients $\tilde{W}_2$. In particular, the precoder for layer l is given by $$W_l = A_l C_l B_l^H = W_1 \tilde{W}_2 W_{joint}^H$$

Here $W_l$ is a $P_{CSIRS} \times N_3 N_4$ matrix whose columns are precoding vectors for a total of $N_3 N_4$ units, $N_3$ FD units and $N_4$ DD/TD units, $W_1$ is a $P_{CSIRS} \times 2L$ or $P_{CSIRS} \times L$ SD basis matrix (similar to Rel. 16 enhanced Type II codebook), $\tilde{W}_2$ is a $2L \times M_v$ coefficients matrix, and $W_{joint}$ is a $N_3 N_4 \times M_v$ basis matrix comprising $M_v$ joint (FD, DD/TD) basis vectors. The k-th column of $W_{joint}$ is a vector $v_{k,l}$ whose length is $N_3 N_4$, and which is the k-th joint (FD, DD/TD) basis vectors, and k=0, 1, . . . , $M_v$-1.

In one example, $v_{k,l} = [m_{0,l}, m_{1,l}, \ldots m_{N_3 N_4, l}]^T$.

In one example, $v_{k,l}$ is the k-th DFT vector on length $N_3 N_4$, i.e., $$v_{k,l} = \left[ 1, e^{j\frac{2\pi k \cdot 1}{N_3 N_4}}, e^{j\frac{2\pi k \cdot 2}{N_3 N_4}}, \ldots, e^{j\frac{2\pi k \cdot (N_3 N_4 - 1)}{N_3 N_4}} \right] \text{ and } m_{x,l} = e^{j\frac{2\pi k \cdot x}{N_3 N_4}}.$$

In one example, $v_{k,l}$ is the k-th oversampled DFT vector on length $N_3 N_4$, i.e., $$v_{k,l} = \left[ 1, e^{j\frac{2\pi k \cdot 1}{O N_3 N_4}}, e^{j\frac{2\pi k \cdot 2}{O N_3 N_4}}, \ldots, e^{j\frac{2\pi k \cdot (N_3 N_4 - 1)}{O N_3 N_4}} \right] \text{ and } m_{x,l} = e^{j\frac{2\pi k \cdot x}{N_3 N_4}}.$$

Here, O is the oversampling factor. In one example, O is fixed (e.g., 4). In one example, O is configured (e.g., via RRC).

In one embodiment, the UE is configured to report a CSI determined based on a codebook comprising components: (A) two basis matrices, basis $W_{d,1}$ or $W_{1,d}$ for joint SD and DD/TD compression, and a basis $W_f$ for FD compression, and (B) coefficients $\tilde{W}_2$. In particular, the precoder for layer l is given by $$W_l = A_l C_l B_l^H = W_{d,1} \tilde{W}_2 W_f^H \text{ or } W_{1,d} \tilde{W}_2 W_f^H$$

Here $W_l$ is a $P_{CSIRS}N_4 \times N_3$ matrix whose each column (f) comprises precoding vectors for $N_4$ DD/TD units and a given FD unit f, $W_1$ is a $P_{CSIRS} \times 2L$ or $P_{CSIRS} \times L$ SD basis matrix (similar to Rel. 16 enhanced Type II codebook), $W_f$ is a $N_3 \times M_v$ FD basis matrix (similar to Rel. 16 enhanced Type II codebook) and $W_d$ is a $N_4 \times N$ DD/TD basis matrix. The columns of $W_{d,1}$ comprises vectors $v_{d,1,l}$ that are Kronecker products (KPs) of vectors $e_{1,l}$ and $h_{d,l}$, columns of $W_1$ and $W_d$, respectively, i.e., $W_{d,1} = \text{kron}(W_d, W_1)$, is $(P_{CSIRS}N_4) \times (2LN)$. The columns of $W_{1,d}$ comprises vectors $v_{1,d,l}$ that are Kronecker products (KPs) of vectors $h_{d,l}$ and $e_{1,l}$, columns of $W_d$ and $W_1$, respectively, i.e., $W_{1,d} = \text{kron}(W_1, W_d)$, is $(P_{CSIRS}N_4) \times (2LN)$. The $\tilde{W}_2$ is $(2LN) \times (M_v)$ coefficient matrix.

For FD unit $n_3 \in \{1, \ldots, N_3\}$ and DD/TD unit $n_4 \in \{1, \ldots, N_4\}$, the precoder for layer 1 is given by $W_l(I, n_3)$ when $W_l = W_{d,1}\tilde{W}_2 W_f^H$, where $I = \{(n_4-1)*P_{CSIRS}+i:i=1, \ldots, P_{CSIRS}\}$ or $W_l(J, n_3)$ when $W_l = W_{1,d}\tilde{W}_2 W_f^H$, where $J = \{n_4 + i \times P_{CSIRS}: i=1, \ldots P_{CSIRS}\}$.

In one embodiment, the UE is configured to report a CSI determined based on a codebook comprising components: (A) two basis matrices, basis $W_{f,1}$ or $W_{1,f}$ for joint SD and FD compression, and a basis $W_d$ for DD/TD compression, and (B) coefficients $\tilde{W}_2$. In particular, the precoder for layer 1 is given by $$W_l = A_l C_l B_l^H = W_{f,1} \tilde{W}_2 W_d^H \text{ or } W_{1,f} \tilde{W}_2 W_d^H$$

Here $W_l$ is a $P_{CSIRS}N_3 \times N_4$ matrix whose each column (d) comprises precoding vectors for $N_3$ FD units and a given DD/TD unit d, $W_1$ is a $P_{CSIRS} \times 2L$ or $P_{CSIRS} \times L$ SD basis matrix (similar to Rel. 16 enhanced Type II codebook), $W_f$ is a $N_3 \times M_v$ FD basis matrix (similar to Rel. 16 enhanced Type II codebook) and $W_d$ is a $N_4 \times N$ DD/TD basis matrix. The columns of $W_{f,1}$ comprises vectors $v_{f,1,l}$ that are Kronecker products (KPs) of vectors $e_{1,l}$ and $g_{f,l}$, columns of $W_1$ and $W_f$, respectively, i.e., $W_{f,1} = \text{kron}(W_f, W_1)$, is $(P_{CSIRS}N_3) \times (2LM_v)$. The columns of $W_{1,f}$ comprises vectors $v_{1,f,l}$ that are Kronecker products (KPs) of vectors $g_{f,l}$ and $e_{1,l}$, columns of $W_f$ and $W_1$, respectively, i.e., $W_{1,f} = \text{kron}(W_1, W_f)$, is $(P_{CSIRS}N_3) \times (2LM_v)$. The $\tilde{W}_2$ is $(2LM_v) \times (N)$ coefficient matrix.

For FD unit $n_3 \in \{1, \ldots, N_3\}$ and DD/TD unit $n_4 \in \{1, \ldots, N_4\}$, the precoder for layer 1 is given by $W_l(:, n_4)$ when $W_l = W_{f,1}\tilde{W}_2 W_d^H$, where $I = \{(n_3-1)*P_{CSIRS}+i:i=1, \ldots, P_{CSIRS}\}$ or $W_l(J, n_4)$ when $W_l = W_{1,f}\tilde{W}_2 W_d^H$, where $J = \{n_3 + i \times P_{CSIRS}: i=1, \ldots, P_{CSIRS}\}$.

In one embodiment, the UE is configured to report a CSI determined based on a codebook comprising components: (A) three separate basis matrices $W_1$, $W_f$, and $W_d$ for SD, FD, and DD/TD compression, respectively, and (B) coefficients $\tilde{W}_2$. The details of the components are as explained in embodiment I.1 except that only 2 out of the 3 basis matrices are used for dimension reduction or compression, and the third basis is either fixed (e.g., 1 or identity matrix) or turned OFF (e.g., via explicit or implicit higher layer or MAC CE or DCI based signalling).

For all the components associated with the 3$^{rd}$ dimension, the CSI (or PMI) reporting can correspond to only one value (similar to WB PMI reporting format) or multiple values (similar to SB PMI reporting format). In one example, this reporting is fixed (e.g., to one value) or configurable (e.g., via RRC) or reported by the UE (e.g., as part of UE capability or CSI reporting).

Also, the component $W_1$ can correspond to regular (e.g., DFT based similar to Rel. enhanced Type II codebook) or port selection (e.g., similar to Rel. 16 enhanced port selection Type II codebook).

In one example, the 2 bases used for dimension reduction or compression correspond to SD and FD bases, and the 3$^{rd}$ basis corresponds to the DD/TD basis. The precoder for layer 1 is given by $W_l = A_l C_l B_l^H = W_1 \tilde{W}_2 W_{f,d}^H$ (with $W_d$) where $W_d$ is fixed (e.g., to 1 or an identity matrix). Alternatively, $W_l = W_1 \tilde{W}_2 W_f^H$ (without $W_d$).

In one example, the 2 bases used for dimension reduction or compression correspond to SD and DD/TD bases, and the 3$^{rd}$ basis corresponds to the FD basis. The precoder for layer 1 is given by $W_l = A_l C_l B_l^H = W_1 \tilde{W}_2 W_d^H$ (with $W_f$) where $W_f$ is fixed (e.g., to 1 or an identity matrix). Alternatively, $W_l = W_1 \tilde{W}_2 W_d^H$ (without $W_f$).

In one example, the 2 bases used for dimension reduction or compression correspond to FD and DD/TD bases, and the 3$^{rd}$ basis corresponds to the SD basis. The precoder for layer 1 is given by $W_l = A_l C_l B_l^H = W_1 \tilde{W}_2 W_{f,d}^H$ (with $W_1$) where $W_1$ is fixed (e.g., to 1 or an identity matrix). Alternatively, $W_1 = \tilde{W}_2 W_f^H$ (without $W_1$).

In one embodiment, the UE is configured to report a CSI determined based on a codebook comprising components: (A) two basis matrices, basis $W_1$ for SD, and a joint basis $W_{joint}$ for joint FD and DD/TD compression, and (B) coefficients $\tilde{W}_2$. The details of the components are as explained above except that only $W_{joint}$ is used for dimension reduction or compression, and the $W_1$ basis is either fixed (e.g., 1 or identity matrix) or turned OFF (e.g., via explicit or implicit higher layer or MAC CE or DCI based signalling).

The precoder for layer 1 is given by $W_l = A_l C_l B_l^H = W_1 \tilde{W}_2 W_{joint}^H$ (with $W_1$) where $W_d$ is fixed (e.g., to 1 or an identity matrix). Alternatively, $W_1 = \tilde{W}_2 W_{joint}^H$ (without $W_1$).

In one embodiment, the UE is configured to report a CSI determined based on a codebook comprising components: (A) three separate basis matrices $W_1$, $W_f$, and $W_d$ for SD, FD, and DD/TD compression, respectively, and (B) coefficients $\tilde{W}_2$. The details of the components are as explained in embodiment I.1 except that only 1 out of the 3 basis matrices is used for dimension reduction or compression, and one or both of the other two bases is either fixed (e.g., 1 or identity matrix) or turned OFF (e.g., via explicit or implicit higher layer or MAC CE or DCI based signalling).

For all the components associated with the other two dimensions, the CSI (or PMI) reporting can correspond to only one value (similar to WB PMI reporting format) or multiple values (similar to SB PMI reporting format). In one example, this reporting is fixed (e.g., to one value) or configurable (e.g., via RRC) or reported by the UE (e.g., as part of UE capability or CSI reporting).

Also, the component $W_1$ can correspond to regular (e.g., DFT based similar to Rel. enhanced Type II codebook) or port selection (e.g., similar to Rel. 16 enhanced port selection Type II codebook).

In one example, the one basis used for dimension reduction or compression corresponds to SD, and the other two bases correspond to the FD and DD/TD basis. The precoder for layer 1 is given by $W_l = A_l C_l B_l^H = W_1 \tilde{W}_2 W_{f,d}^H$ (with $W_f$ and $W_d$) where $W_f$ and $W_d$ are fixed (e.g., to 1 or an identity matrix). Alternatively, $W_l = W_1 \tilde{W}_2$ (without $W_f$ and $W_d$).

In one example, the one basis used for dimension reduction or compression corresponds to FD, and the other two bases correspond to the SD and DD/TD basis. The precoder for layer 1 is given by $W_l = A_l C_l B_l^H = W_1 \tilde{W}_2 W_{f,d}^H$ (with $W_1$ and $W_d$) where $W_1$ and $W_d$ are fixed (e.g., to 1 or an identity matrix). Alternatively, $W_l = \tilde{W}_2 W_f^H$ (without $W_1$ and $W_d$).

In one example, the one basis used for dimension reduction or compression corresponds to DD/TD, and the other two bases correspond to the SD and FD basis. The precoder for layer l is given by $W_l = A_l C_l B_l^H = W_1 \tilde{W}_2 W_{f,d}^H$ (with $W_1$ and $W_f$) where $W_1$ and $W_f$ are fixed (e.g., to 1 or an identity matrix). Alternatively, $W_l = \tilde{W}_2 W_d^H$ (without $W_1$ and $W_d$).

Any of the above variation embodiments can be utilized independently or in combination with at least one other variation embodiment.

Figure 16:
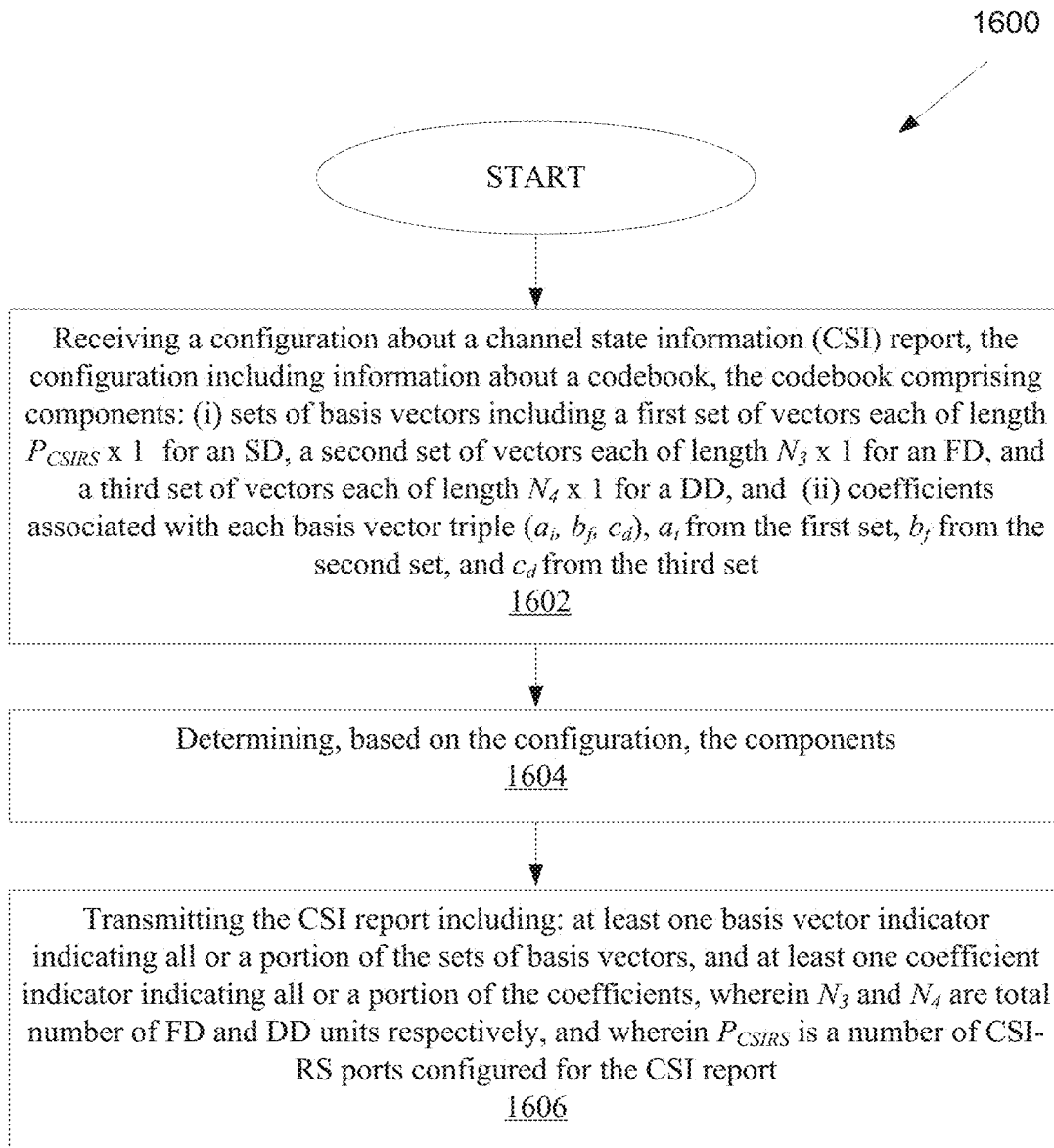
FIG. 16 illustrates a flow chart of a method for operating a UE according to embodiments of the present disclosure.

FIG. 16 illustrates a flow chart of a method 1600 for operating a UE, as may be performed by a UE such as UE 116, according to embodiments of the present disclosure. The embodiment of the method 1600 illustrated in FIG. 16 is for illustration only. FIG. 16 does not limit the scope of this disclosure to any particular implementation.

As illustrated in FIG. 16, the method 1600 begins at step 1602. In step 1602, the UE (e.g., 111-116 as illustrated in FIG. 1) receives a configuration about a CSI report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple ($a_i$, $b_f$, $c_d$), $a_i$ from the first set, $b_f$ from the second set, and $c_d$ from the third set.

In step 1604, the UE determines, based on the configuration, the components.

In step 1606, the UE transmits the CSI report including: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

In one embodiment, for each FD unit among the total of $N_3$ FD units and for each DD unit among the total of $N_4$ DD units, a precoding vector of length $P_{CSIRS} \times 1$ for a layer $l \in \{1, \ldots, v\}$ is based on: a first sum over the first set of SD basis vectors, a second sum over the second set of FD vectors, and a third sum over the third set DD vectors, where the precoding vector is given by:

$$W^l = \frac{1}{\sqrt{\gamma}} \begin{bmatrix} \sum_{i=0}^{L-1} v_{m_1^{(i)}, m_2^{(i)}} \sum_{f=0}^{M_v-1} \sum_{d=0}^{N-1} y_{t,l}^{(i,f)} \phi_{u,l}^{(i,d)} x_{l,i,f,d} \\ \sum_{i=0}^{L-1} v_{m_1^{(i)}, m_2^{(i)}} \sum_{f=0}^{M_v-1} \sum_{d=0}^{N-1} y_{t,l}^{(i,f)} \phi_{u,l}^{(i,d)} x_{l,i+L,f,d} \end{bmatrix},$$

wherein:

L is a number of basis vectors in the first set,
$M_v$ is a number of basis vectors in the second set,
N is a number of basis vectors in the third set,
$v_{m_1^{(i)}, m_2^{(i)}}$ is a vector of length $$\frac{P_{CSIRS}}{2} \times 1 \text{ and } \begin{bmatrix} v_{m_1^{(i)}, m_2^{(i)}} \\ v_{m_1^{(i)}, m_2^{(i)}} \end{bmatrix}$$

is an i-th SD basis vector in the first set,
$y_{t,l}^{(i,f)}$ is a t-th element of an f-th FD basis vector of length $N_3 \times 1$ in the second set, $\phi_{u,l}^{(i,d)}$ is a u-th element of a d-th DD basis vector of length $N_4 \times 1$ in the third set, $\gamma$ is a normalization factor, and v is a number of layers.

In one embodiment, the first and the second sets of basis vectors for SD and FD respectively are independent, and the third set of basis vectors comprises a set of DD basis vectors $\{c_d^{(i,f)}\}$ for each (SD, FD) basis vector pair ($a_i$, $b_f$).

In one embodiment, the first and the second sets of basis vectors for SD and FD respectively are independent, and the third set of basis vectors comprises a set of DD basis vectors $\{c_d^{(i)}\}$ for each SD basis vector $a_i$.

In one embodiment, the first set of basis vectors for SD is independent, the second set of basis vectors comprises a set of FD basis vectors $\{b_f^{(i)}\}$ for each SD basis vector $a_i$, and the third set of basis vectors comprises a set of DD basis vectors $\{c_d^{(i)}\}$ for each SD basis vector $a_i$.

In one embodiment, the first set of basis vectors for SD is independent, and the second and the third sets of basis vectors comprise sets $\{b_f^{(i)}\}$ and $\{c_d^{(i)}\}$ for each SD basis vector $a_i$, where $\{b_f^{(i)}\}$ and $\{c_d^{(i)}\}$ are vectors from a joint set of FD and DD basis vector pairs $\{b_f^{(i)}, c_d^{(i)})\}$.

In one embodiment, one of the sets of basis vectors is set to an identity matrix.

In one embodiment, the first set of SD basis vectors comprises either DFT vectors or port selection vectors, the second set of FD basis vectors comprises DFT vectors, and the third set of DD basis vectors comprises DFT vectors.

Figure 17:
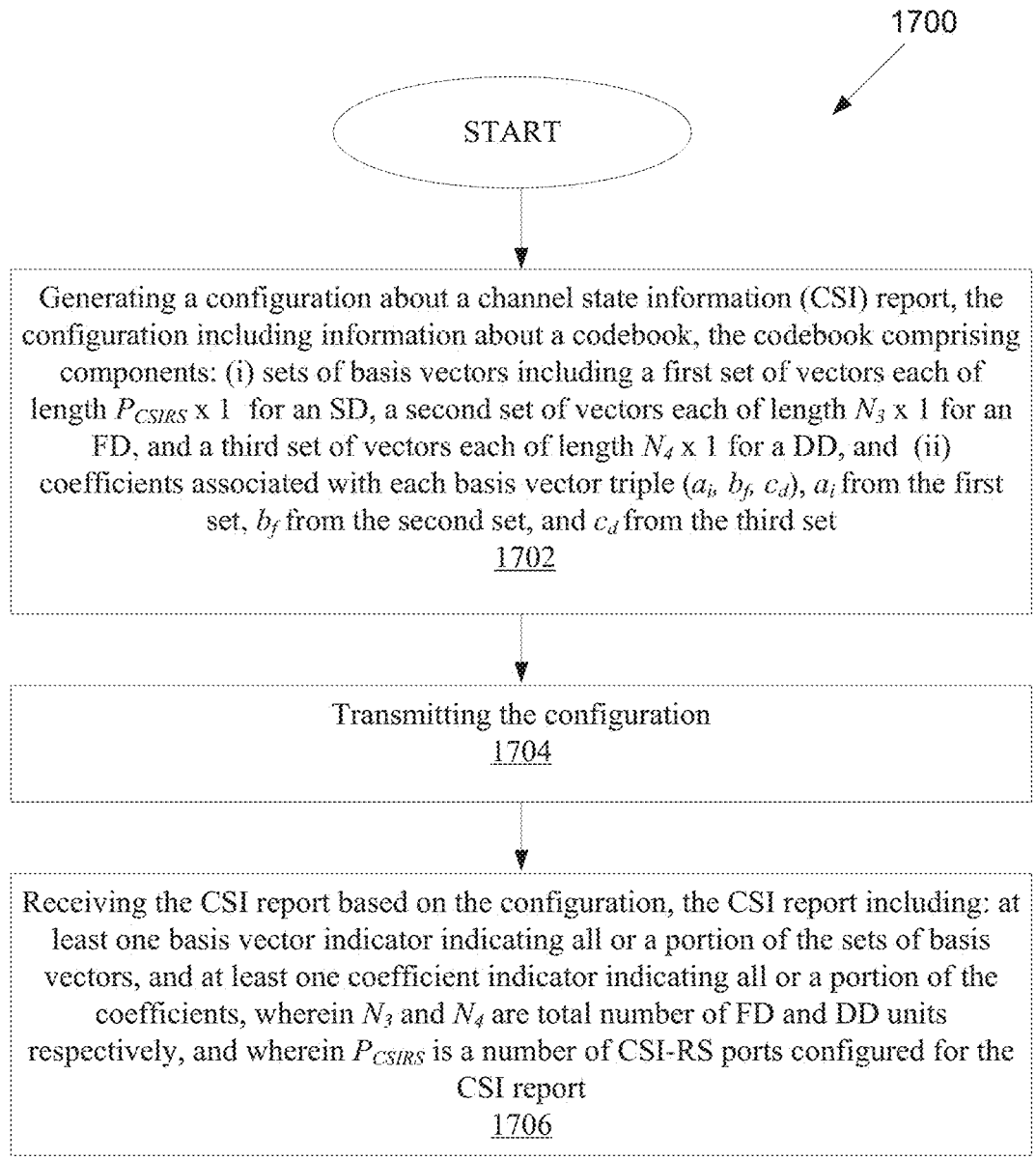
FIG. 17 illustrates a flow chart of a method for operating a BS according to embodiments of the present disclosure.

FIG. 17 illustrates a flow chart of another method 1700, as may be performed by a base station (BS) such as BS 102, according to embodiments of the present disclosure. The embodiment of the method 1700 illustrated in FIG. 17 is for illustration only. FIG. 17 does not limit the scope of this disclosure to any particular implementation.

As illustrated in FIG. 17, the method 1700 begins at step 1702. In step 1702, the BS (e.g., 101-103 as illustrated in FIG. 1), generates a configuration about a channel state information (CSI) report, the configuration including information about a codebook, the codebook comprising components: (i) sets of basis vectors including a first set of vectors each of length $P_{CSIRS} \times 1$ for a SD, a second set of vectors each of length $N_3 \times 1$ for a FD, and a third set of vectors each of length $N_4 \times 1$ for a DD, and (ii) coefficients associated with each basis vector triple ($a_i$, $b_f$, $c_d$), $a_i$ from the first set, $b_f$ from the second set, and $c_d$ from the third set.

In step 1704, the BS transmits the configuration.

In step 1706, the BS receives the CSI report based on the configuration, wherein the CSI report includes: at least one basis vector indicator indicating all or a portion of the sets of basis vectors, and at least one coefficient indicator indicating all or a portion of the coefficients, wherein $N_3$ and $N_4$ are total number of FD and DD units respectively, and wherein $P_{CSIRS}$ is a number of CSI-RS ports configured for the CSI report.

In one embodiment, for each FD unit among the total of $N_3$ FD units and for each DD unit among the total of $N_4$ DD units, a precoding vector of length $P_{CSIRS} \times 1$ for a layer $l \in \{1, \ldots, v\}$ is based on: a first sum over the first set of SD basis vectors, a second sum over the second set of FD vectors, and a third sum over the third set DD vectors, where the precoding vector is given by:

$$W^l = \frac{1}{\sqrt{\gamma}} \begin{bmatrix} \sum_{i=0}^{L-1} v_{m_1^{(i)},m_2^{(i)}} \sum_{f=0}^{M_v-1} \sum_{d=0}^{N-1} y_{t,l}^{(i,f)} \phi_{u,l}^{(i,d)} x_{l,i,f,d} \\ \sum_{i=0}^{L-1} v_{m_1^{(i)},m_2^{(i)}} \sum_{f=0}^{M_v-1} \sum_{d=0}^{N-1} y_{t,l}^{(i,f)} \phi_{u,l}^{(i,d)} x_{l,i+L,f,d} \end{bmatrix},$$

wherein:

L is a number of basis vectors in the first set,
$M_v$ is a number of basis vectors in the second set,
N is a number of basis vectors in the third set,
$v_{m_1^{(i)} m_2^{(i)}}$ is a vector of length $$1 \frac{P_{CSIRS}}{2} \times 1 \text{ and } \begin{bmatrix} v_{m_1^{(i)},m_2^{(i)}} \\ v_{m_1^{(i)},m_2^{(i)}} \end{bmatrix}$$

is an i-th SD basis vector in the first set,
$y_{t,l}^{(i,f)}$ is a t-th element of an f-th FD basis vector of length $N_3 \times 1$ in the second set,
$\phi_{u,l}^{(i,d)}$ is a u-th element of a d-th DD basis vector of length $N_4 \times 1$ in the third set,
$\gamma$ is a normalization factor, and
$v$ is a number of layers.

In one embodiment, the first and the second sets of basis vectors for SD and FD respectively are independent, and the third set of basis vectors comprises a set of DD basis vectors $\{c_d^{(i,f)}\}$ for each (SD, FD) basis vector pair $(a_i, b_f)$.

In one embodiment, the first and the second sets of basis vectors for SD and FD respectively are independent, and the third set of basis vectors comprises a set of DD basis vectors $\{c_d^{(i)}\}$ for each SD basis vector $a_i$.

In one embodiment, the first set of basis vectors for SD is independent, the second set of basis vectors comprises a set of FD basis vectors $\{b_f^{(i)}\}$ for each SD basis vector $a_i$, and the third set of basis vectors comprises a set of DD basis vectors $\{c_d^{(i)}\}$ for each SD basis vector $a_i$.

In one embodiment, the first set of basis vectors for SD is independent, and the second and the third sets of basis vectors comprise sets $\{b_f^{(i)}\}$ and $\{c_d^{(i)}\}$ for each SD basis vector $a_i$, where $\{b_f^{(i)}\}$ and $\{c_d^{(i)}\}$ are vectors from a joint set of FD and DD basis vector pairs $\{(b_f^{(i)}, c_d^{(i)})\}$.

In one embodiment, one of the sets of basis vectors is set to an identity matrix.

In one embodiment, the first set of SD basis vectors comprises either DFT vectors or port selection vectors, the second set of FD basis vectors comprises DFT vectors, and the third set of DD basis vectors comprises DFT vectors.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to receive a configuration associated with a codebook for a channel state information (CSI) report based on a codebook; and
   a processor operably coupled to the transceiver, the processor, based on the configuration, configured to determine $N_3 N_4$ precoding matrices, $N_3$ precoding matrices in a frequency domain (FD) for each of $N_4$ consecutive time intervals, based on at least four components: (i) L vectors, each of length $$\frac{P_{CSIRS}}{2},$$

(ii) $M_v$ vectors, each of length $N_3$, (iii) N vectors, each of length $N_4$, and (iv) $2LM_vN$ coefficients, $LM_vN$ coefficients associated with each of two halves of $P_{CSIRS}$ ports,
   wherein the transceiver is further configured to transmit the CSI report including a first indicator indicating the L vectors, a second indicator indicating the $M_v$ vectors, a third indicator indicating the N vectors, and a fourth indicator indicating amplitude and phase of $K^{NZ}$ coefficients that are non-zero,
   where $N_3 > 1$, $N_4 > 1$, $K^{NZ} \leq 2LM_vN$, and $P_{CSIRS}$ is a number of CSI reference signal (CSI-RS) ports configured for the CSI report.

2. The UE of claim 1, wherein for $t \in \{0, 1, \ldots, N_3-1\}$ and for $u \in \{0, 1, \ldots, N_4-1\}$, a (t, f)-th of the $N_3 N_4$ precoding matrices is $$W = \frac{1}{\sqrt{v}} [W^1 \ldots W^v],$$

where $W^l$ is given by:

$$W^l = \frac{1}{\sqrt{\gamma}} \begin{bmatrix} \sum_{i=0}^{L-1} v_{f^{(i)}} \sum_{f=0}^{M_v-1} \sum_{d=0}^{N-1} y_{t,l}^{(f)} \phi_{u,l}^{(d)} x_{l,i,f,d} \\ \sum_{i=0}^{L-1} v_{f^{(i)}} \sum_{f=0}^{M_v-1} \sum_{d=0}^{N-1} y_{t,l}^{(f)} \phi_{u,l}^{(d)} x_{l,i+L,f,d} \end{bmatrix},$$

wherein:
the L vectors are $v_{f^{(i)}}$, $i=0, 1, \ldots, L-1$,
the $M_v$ vectors are $g_{f,l} = [y_{0,l}^{(f)} \, y_{1,l}^{(f)} \ldots y_{N_3-1,l}^{(f)}]$, $f=0, 1, \ldots, M_v-1$,
the N vectors are $h_{d,l} = [\phi_{0,l}^{(d)} \, \phi_{0,l}^{(d)} \ldots \phi_{N_4-1,l}^{(d)}]$, $d=0, 1, \ldots, N-1$,
the $2LM_vN$ coefficients are $x_{l,i,f,d}$, $i=0, 1, \ldots, 2L-1$, $f=0, 1, \ldots, M_v-1$, and $d=0, 1, \ldots, N-1$, $$\gamma = \frac{P_{CSIRS}}{2} \gamma_{t,u,l}$$

is a normalization factor where $\gamma_{t,u,l}=$ $$\sum_{i=0}^{2L-1}\left|\sum_{f=0}^{M_v-1}\sum_{d=0}^{N-1}y_{t,l}^{(f)}\phi_{u,l}^{(d)}x_{l,i,f,d}\right|^2,$$

and

ν is a number of layers.

3. The UE of claim 2, wherein:

$l^{(i)}=(m_1^{(i)}, m_2^{(i)})$, $v_{m_1^{(i)}, m_2^{(i)}}$ is a two dimensional discrete Fourier transform (2D DFT) vector, $m_1^{(i)}$ and $m_2^{(i)}$ are indices of DFT vectors in a first and a second dimensions, respectively, $m_1^{(i)} \in \{0, 1, \ldots, N_1-1\}$ and $m_2^{(i)} \in \{0, 1, \ldots, N_2-1\}$, $P_{CSIRS}=2N_1N_2$, and the first indicator indicates indices $(m_1^{(i)}, m_2^{(i)})$, i=0, 1, ..., L−1, of the L vectors.

4. The UE of claim 2, wherein:

$l^{(i)}=m^{(i)}$, $v_{m^{(i)}}$ is a $P_{CSI\text{-}RS}/2$-element port selection vector containing a value of 1 in element ($m^{(i)}$ mod $P_{CSI\text{-}RS}/2$) and zeros elsewhere, where a first element is element 0, and the first indicator indicates indices $m^{(i)}$, i=0, 1, ..., L−1, of the L vectors.

5. The UE of claim 2, wherein:

a coefficient $$x_{l,i,f,d} = p_{l,\lfloor \frac{i}{L} \rfloor}^{(1)} p_{l,i,f,d}^{(2)} \varphi_{l,i,f,d},$$

$p_{l,\lfloor \frac{i}{L} \rfloor}^{(1)}$ is a reference value, $p_{l,i,f,d}^{(2)}$ is an amplitude of the coefficient $x_{l,i,f,d}$ with respect to the reference value, $\varphi_{l,i,f,d}$ is a phase of the coefficient $x_{l,i,f,d}$, the fourth indicator indicates values of $p_{l,\lfloor \frac{i}{L} \rfloor}^{(1)} p_{l,i,f,d}^{(2)}$, and $\varphi_{l,i,f,d}$ for the $K^{NZ}$ coefficients, and $$\gamma_{t,u,l} = \sum_{i=0}^{2L-1}\left(p_{l,\lfloor \frac{i}{L} \rfloor}^{(1)}\right)^2\left|\sum_{f=0}^{M_v-1}\sum_{d=0}^{N-1}y_{t,l}^{(f)}\phi_{u,l}^{(d)}p_{l,i,f,d}^{(2)}\varphi_{l,i,f,d}\right|^2.$$

6. The UE of claim 1, wherein:

the second indicator identifies indices of the $M_v$ vectors $n_{3,l}$ (l=1, ..., ν) where:

$n_{3,l} = [n_{3,l}^{(0)}, \ldots, n_{3,l}^{(M_v-1)}]$, $n_{3,l}^{(f)} \in \{0, 1, \ldots, N_3-1\}$, and $y_{t,l}^{(f)} = e^{j\frac{2\pi t n_{3,l}^{(f)}}{N_3}}$, and the third indicator identifies indices of the N vectors $n_{4,l}$ (l=1, ..., ν) where:

$n_{4,l} = [n_{4,l}^{(0)}, \ldots, n_{4,l}^{(N-1)}]$, $n_{4,l}^{(f)} \in \{0, 1, \ldots, N_4-1\}$, and $\phi_{u,l}^{(d)} = e^{j\frac{2\pi u n_{4,l}^{(d)}}{N_4}}$.

7. The UE of claim 1, wherein the N vectors is turned OFF and replaced with a value 1 based on higher layer signaling.

8. A base station (BS) comprising:

a processor configured to generate a configuration associated with a codebook for a channel state information (CSI) report based on a codebook; and a transceiver operably coupled to the processor, the transceiver configured to:

transmit the configuration; and receive the CSI report, the CSI report based on a determination of $N_3N_4$ precoding matrices, $N_3$ precoding matrices in a frequency domain (FD) for each of $N_4$ consecutive time intervals, based on at least four components: (i) L vectors, each of length $$\frac{P_{CSIRS}}{2},$$

(ii) $M_v$ vectors, each of length $N_3$, (iii) N vectors, each of length $N_4$, and (iv) $2LM_vN$ coefficients, $LM_vN$ coefficients associated with each of two halves of $P_{CSIRS}$ ports, wherein the CSI report includes a first indicator indicating the L vectors, a second indicator indicating the $M_v$ vectors, a third indicator indicating the N vectors, and a fourth indicator indicating amplitude and phase of $K^{NZ}$ coefficients that are non-zero, where $N_3>1$, $N_4>1$, $K^{NZ} \leq 2LM_vN$, and $P_{CSIRS}$ is a number of CSI reference signal (CSI-RS) ports configured for the CSI report.

9. The BS of claim 8, wherein for t∈ {0, 1, ..., $N_3-1$} and for u∈ {0, 1, ..., $N_4-1$}, a (t, f)-th of the $N_3N_4$ precoding matrices is $$W = \frac{1}{\sqrt{\upsilon}}[W^1 \ldots W^\upsilon],$$

where $W^l$ is given by:

$$W^l = \frac{1}{\sqrt{\gamma}}\begin{bmatrix} \sum_{i=0}^{L-1}v_{f^{(i)}}\sum_{f=0}^{M_v-1}\sum_{d=0}^{N-1}y_{t,l}^{(f)}\phi_{u,l}^{(d)}x_{l,i,f,d} \\ \sum_{i=0}^{L-1}v_{f^{(i)}}\sum_{f=0}^{M_v-1}\sum_{d=0}^{N-1}y_{t,l}^{(f)}\phi_{u,l}^{(d)}x_{l,i+L,f,d} \end{bmatrix},$$

wherein:

the L vectors are $v_{f^{(i)}}$, i=0, 1, ..., L−1, the $M_v$ vectors are $g_{f,l}=[y_{0,l}^{(f)}\ y_{1,l}^{(f)} \ldots y_{N_3-1,l}^{(f)}]$, f=0, 1, ..., $M_v-1$, the N vectors are $h_{d,l}=[\phi_{0,l}^{(d)}\ \phi_{0,l}^{(d)} \ldots \phi_{N_4-1,l}^{(d)}]$, d=0, 1, ..., N−1, the $2LM_vN$ coefficients are $x_{l,i,f,d}$, $i=0, 1, \ldots, 2L-1$, $f=0, 1, \ldots, M_v-1$, and $d=0, 1, \ldots, N-1$, $$\gamma = \frac{P_{CSIRS}}{2}\gamma_{t,u,l}$$

is a normalization factor where $\gamma_{t,u,l} = \sum_{i=0}^{2L-1}|\sum_{f=0}^{M_v-1}\sum_{d=0}^{N-1}y_{t,l}^{(f)}\phi_{u,l}^{(d)}x_{l,i,f,d}|^2$, and
$\nu$ is a number of layers.

10. The BS of claim 9, wherein:
$l^{(i)} = (m_1^{(i)}, m_2^{(i)})$,
$v_{m_1^{(i)}, m_2^{(i)}}$ is a two dimensional discrete Fourier transform (2D DFT) vector, $m_1^{(i)}$ and $m_2^{(i)}$ are indices of DFT vectors in a first and a second dimensions, respectively, $m_1^{(i)} \in \{0, 1, \ldots, N_1-1\}$ and $m_2^{(i)} \in \{0, 1, \ldots, N_2-1\}$, $P_{CSIRS} = 2N_1N_2$, and
the first indicator indicates indices $(m_1^{(i)}, m_2^{(i)})$, $i=0, 1, \ldots, L-1$, of the L vectors.

11. The BS of claim 9, wherein:
$l^{(i)} = m^{(i)}$,
$v_{m^{(i)}}$ is a $P_{CSI-RS}/2$-element port selection vector containing a value of 1 in element ($m^{(i)}$ mod $P_{CSI-RS}/2$) and zeros elsewhere, where a first element is element 0, and
the first indicator indicates indices $m^{(i)}$, $i=0, 1, \ldots, L-1$, of the L vectors.

12. The BS of claim 9 wherein:
a coefficient $$x_{l,i,f,d} = p_{l,\lfloor\frac{i}{L}\rfloor}^{(1)} p_{l,i,f,d}^{(2)} \varphi_{l,i,f,d},$$

$$p_{l,\lfloor\frac{i}{L}\rfloor}^{(1)}$$

is a reference value,
$p_{l,i,f,d}^{(2)}$ is an amplitude of the coefficient $x_{l,i,f,d}$ with respect to the reference value,
$\varphi_{l,i,f,d}$ is a phase of the coefficient $x_{l,i,f,d}$,
the fourth indicator indicates values of $$p_{l,\lfloor\frac{i}{L}\rfloor}^{(1)}, p_{l,i,f,d}^{(2)},$$

and $\varphi_{l,i,f,d}$ for the $K^{NZ}$-coefficients, and $$\gamma_{t,u,l} = \sum_{i=0}^{2L-1} \left(p_{l,\lfloor\frac{i}{L}\rfloor}^{(1)}\right)^2 \left|\sum_{f=0}^{M_v-1}\sum_{d=0}^{N-1} y_{t,l}^{(f)} \phi_{u,l}^{(d)} p_{l,i,f,d}^{(2)} \varphi_{l,i,f,d}\right|^2.$$

13. The BS of claim 8, wherein:
the second indicator identifies indices of the $M_v$ vectors $n_{3,l}$ ($l=1, \ldots, \nu$) where:

$$n_{3,l} = \left[n_{3,l}^{(0)}, \ldots, n_{3,l}^{(M_v-1)}\right],$$

$n_{3,l}^{(f)} \in \{0, 1, \ldots, N_3-1\}$, and $$y_{t,l}^{(f)} = e^{j\frac{2\pi t n_{3,l}^{(f)}}{N_3}},$$

and
the third indicator identifies indices of the N vectors $n_{4,l}$ ($l=1, \ldots, \nu$) where:

$$n_{4,l} = \left[n_{4,l}^{(0)}, \ldots, n_{4,l}^{(N-1)}\right],$$

$n_{4,l}^{(d)} \in \{0, 1, \ldots, N_4-1\}$, and $$\phi_{u,l}^{(d)} = e^{j\frac{2\pi u n_{4,l}^{(d)}}{N_4}}.$$

14. The BS of claim 8, wherein the N vectors is turned OFF and replaced with a value 1 based on higher layer signaling.

15. A method performed by a user equipment (UE), the method comprising:
receiving a configuration associated with a codebook for a channel state information (CSI) report based on a codebook;
determining $N_3N_4$ precoding matrices, $N_3$ precoding matrices in a frequency domain (FD) for each of $N_4$ consecutive time intervals, based on at least four components: (i) L vectors, each of length $$\frac{P_{CSIRS}}{2},$$

(ii) $M_v$ vectors, each of length $N_3$, (iii) N vectors, each of length $N_4$, and (iv) $2LM_vN$ coefficients, $LM_vN$ coefficients associated with each of two halves of $P_{CSIRS}$ ports; and
transmitting the CSI report including a first indicator indicating the L vectors, a second indicator indicating the $M_v$ vectors, a third indicator indicating the N vectors, and a fourth indicator indicating amplitude and phase of $K^{NZ}$ coefficients that are non-zero,
where $N_3 > 1$, $N_4 > 1$, $K^{NZ} \leq 2LM_vN$, and $P_{CSIRS}$ is a number of CSI reference signal (CSI-RS) ports configured for the CSI report.

16. The method of claim 15, wherein for $t \in \{0, 1, \ldots, N_3-1\}$ and for $u \in \{0, 1, \ldots, N_4-1\}$, a (t, f)-th of the $N_3N_4$ precoding matrices is $$W = \frac{1}{\sqrt{\nu}}[W^1 \ldots W^\nu],$$

where $W^l$ is given by:

$$W^l = \frac{1}{\sqrt{\gamma}} \begin{bmatrix} \sum_{i=0}^{L-1} v_l(i) \sum_{f=0}^{M_v-1} \sum_{d=0}^{N-1} y_{t,l}^{(f)} \phi_{u,l}^{(d)} x_{l,i,f,d} \\ \sum_{i=0}^{L-1} v_l(i) \sum_{f=0}^{M_v-1} \sum_{d=0}^{N-1} y_{t,l}^{(f)} \phi_{u,l}^{(d)} x_{l,i+L,f,d} \end{bmatrix},$$

wherein:
the L vectors are $v_l(i)$, $i=0, 1, \ldots, L-1$,
the $M_v$ vectors are $g_{f,l} = [y_{0,l}^{(f)} \; y_{1,l}^{(f)} \; \ldots \; y_{N_3-1,l}^{(f)}]$, $f=0, 1, \ldots, M_v-1$,
the N vectors are $h_{d,l} = [\phi_{0,l}^{(d)} \; \phi_{0,l}^{(d)} \; \ldots \; \phi_{N_4-1,l}^{(d)}]$, $d=0, 1, \ldots, N-1$,
the $2LM_vN$ coefficients are $x_{l,i,f,d}$, $i=0, 1, \ldots, 2L-1$, $f=0, 1, \ldots, M_v-1$, and $d=0, 1, \ldots, N-1$, $$\gamma = \frac{P_{CSIRS}}{2}\gamma_{t,u,l}$$

is a normalization factor where $\gamma_{t,u,l} = \sum_{i=0}^{2L-1} |\sum_{f=0}^{M_v-1} \sum_{d=0}^{N-1} y_{t,l}^{(f)} \phi_{u,l}^{(d)} x_{l,i,f,d}|^2$, and
v is a number of layers.

17. The method of claim 16, wherein:
$I^{(i)} = (m_1^{(i)}, m_2^{(i)})$,
$v_{m_1^{(i)}, m_2^{(i)}}$ is a two dimensional discrete Fourier transform (2D DFT) vector, $m_1^{(i)}$ and $m_2^{(i)}$ are indices of DFT vectors in a first and a second dimensions, respectively, $m_1^{(i)} \in \{0, 1, \ldots, N_1-1\}$ and $m_2^{(i)} \in \{0, 1, \ldots, N_2-1\}$, $P_{CSIRS} = 2N_1 N_2$, and
the first indicator indicates indices $(m_1^{(i)}, m_2^{(i)})$, $i=0, 1, \ldots, L-1$, of the L vectors.

18. The method of claim 16, wherein:
$I^{(i)} = m^{(i)}$,
$v_{m^{(i)}}$ is a $P_{CSI-RS}/2$-element port selection vector containing a value of 1 in element ($m^{(i)}$ mod $P_{CSI-RS}/2$) and zeros elsewhere, where a first element is element 0, and
the first indicator indicates indices $m^{(i)}$, $i=0, 1, \ldots, L-1$, of the L vectors.

19. The method of claim 16, wherein:
a coefficient $$x_{l,i,f,d} = p_{l,\lfloor \frac{i}{L} \rfloor}^{(1)} p_{l,i,f,d}^{(2)} \varphi_{l,i,f,d},$$

$$p_{l,\lfloor \frac{i}{L} \rfloor}^{(1)}$$

is a reference value,
$p_{l,i,f,d}^{(2)}$ is an amplitude of the coefficient $x_{l,i,f,d}$ with respect to the reference value, $\varphi_{l,i,f,d}$ is a phase of the coefficient $x_{l,i,f,d}$,
the fourth indicator indicates values of $$p_{l,\lfloor \frac{i}{L} \rfloor}^{(1)}, p_{l,i,f,d}^{(2)},$$

and $\varphi_{l,i,f,d}$ for the $K^{NZ}$ coefficients, and $$\gamma_{t,u,l} = \sum_{i=0}^{2L-1} \left( p_{l,\lfloor \frac{i}{L} \rfloor}^{(1)} \right)^2 \left| \sum_{f=0}^{M_v-1} \sum_{d=0}^{N-1} y_{t,l}^{(f)} \phi_{u,l}^{(d)} p_{l,i,f,d}^{(2)} \varphi_{l,i,f,d} \right|^2.$$

20. The method of claim 15, wherein:
the second indicator identifies indices of the $M_v$ vectors $n_{3,l}$ (l=1, ..., v) where:

$$n_{3,l} = [n_{3,l}^{(0)}, \ldots, n_{3,l}^{(M_v-1)}],$$

$n_{3,l}^{(f)} \in \{0, 1, \ldots, N_3 - 1\}$, and $$y_{t,l}^{(f)} = e^{j\frac{2\pi t n_{3,l}^{(f)}}{N_3}},$$

and
the third indicator identifies indices of the N vectors $n_{4,l}$ (l=1, ..., v) where:

$$n_{4,l} = [n_{4,l}^{(0)}, \ldots, n_{4,l}^{(N-1)}],$$

$n_{4,l}^{(d)} \in \{0, 1, \ldots, N_4 - 1\}$, and $$\phi_{u,l}^{(d)} = e^{j\frac{2\pi u n_{4,l}^{(d)}}{N_4}}.$$

* * * * *